(12) United States Patent
Brown et al.

(10) Patent No.: US 6,263,912 B1
(45) Date of Patent: *Jul. 24, 2001

(54) FLUID FLOW CONTROL VALVE

(75) Inventors: Joseph P. Brown, Valley Center; Christopher J. Gyben, Escondido; Edward M. Norum, Fresno, all of CA (US)

(73) Assignee: Whetstone Group International, Inc., Escondido, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,106

(22) Filed: Jun. 30, 1999

Related U.S. Application Data

(63) Continuation-in-part of application No. 09/162,343, filed on Sep. 28, 1998, which is a continuation-in-part of application No. 09/151,618, filed on Sep. 11, 1998, which is a continuation-in-part of application No. 09/081,960, filed on May 19, 1998.
(60) Provisional application No. 60/068,575, filed on Feb. 23, 1997.

(51) Int. Cl.⁷ ..................................................... F16K 17/34
(52) U.S. Cl. ..................... 137/519.5; 137/71; 137/513.7; 239/204; 239/272
(58) Field of Search .................................... 239/203, 204, 239/205, 206, 533.15, 569, 570, 571, 572; 137/68.11, 71, 513.5, 513.7, 517, 519, 519.5, 533.13, 533.15

(56) References Cited

U.S. PATENT DOCUMENTS

| | | | |
|---|---|---|---|
| 369,032 | 8/1887 | Richards | 137/519.5 |
| 387,961 | 8/1888 | Ryan | 137/519.5 |
| 692,808 | 2/1902 | Wemmer. | |

(List continued on next page.)

FOREIGN PATENT DOCUMENTS

| | | |
|---|---|---|
| 20 01 071 | 7/1970 | (DE). |
| 16 53 630 U | 1/1971 | (DE). |
| 2919070 | 11/1979 | (DE). |

(List continued on next page.)

Primary Examiner—John Rivell
Assistant Examiner—Meredith H. Schoenfeld
(74) Attorney, Agent, or Firm—Knobbe, Martens, Olson & Bear, LLP

(57) ABSTRACT

A fluid flow control valve within a pop-up sprinkler arrests fluid flow through a riser of the pop-up sprinkler under abnormal flow conditions, such as when the riser is broken or a sprinkler head is removed from the riser. The riser, which is movable relative to a housing of the pop-up sprinkler, is attached to a sprinkler head which distributes water to the surrounding area. A valve seat device is disposed within the riser. A stopper is positioned within a valve passageway defined by the valve seat device. The stopper selectively engages the valve seat to inhibit water flow through the riser under abnormal flow conditions. A biasing device prevents the stopper from engaging with the valve seat under normal flow conditions.

A fluid flow control valve assembly within a swing joint of an irrigation system includes a first within a first elbow fitting and a second valve within a second elbow fitting. The first and second elbow fittings are movable relative to each other and together form the swing joint. Each valve includes a valve seat device and a stopper positioned within a valve passageway defined by the valve seat device. A biasing device positioned between the stoppers of the first and second valves prevents the second stopper from seating against the second valve seat under normal flow conditions.

32 Claims, 40 Drawing Sheets

U.S. PATENT DOCUMENTS

| | | |
|---|---|---|
| 733,372 | 7/1903 | Colwell .................................. 127/71 |
| 954,178 | 4/1910 | Fowler . |
| 1,032,352 | 7/1912 | House . |
| 1,139,647 | 5/1915 | Dehn .............................. 137/519.5 X |
| 1,589,252 | 6/1926 | Sherman . |
| 1,786,963 | 12/1930 | Schoenberger . |
| 2,179,460 | 6/1939 | White . |
| 2,201,065 | 5/1940 | Toolan . |
| 2,372,456 | 9/1945 | Stewart ........................ 137/513.5 X |
| 2,607,225 | 8/1952 | Biscoe .............................. 137/71 X |
| 2,607,226 | 8/1952 | Biscoe .............................. 137/71 X |
| 2,829,719 | 4/1958 | Clark ............................ 137/68.11 X |
| 2,845,089 | 7/1958 | Nickols . |
| 2,990,120 | 6/1961 | Reynolds . |
| 3,002,696 | 10/1961 | Jenkins . |
| 3,127,110 | 3/1964 | Reynolds . |
| 3,154,530 | 10/1964 | Mullen . |
| 3,534,767 | 10/1970 | Swinney . |
| 3,727,635 | 4/1973 | Todd .............................. 137/533.15 |
| 3,841,349 | 10/1974 | Todd ............................ 137/519.5 X |
| 3,861,415 | 1/1975 | Larsen . |
| 3,894,688 * | 7/1975 | Reeder et al. ....................... 239/11 |
| 3,941,145 | 3/1976 | Morain et al. . |
| 4,479,611 | 10/1984 | Galvis . |
| 4,562,962 | 1/1986 | Hartman . |
| 4,638,835 | 1/1987 | Chuang . |
| 4,762,140 | 8/1988 | Davis . |
| 4,825,897 | 5/1989 | Shade . |
| 4,852,602 | 8/1989 | McKinnon .................... 127/513.5 X |
| 4,867,603 | 9/1989 | Chang . |
| 4,913,352 | 4/1990 | Witty et al. . |
| 4,944,327 | 7/1990 | Gyben . |
| 5,004,157 * | 4/1991 | Martell ................................ 239/205 |
| 5,103,853 | 4/1992 | McGushion et al. ......... 137/68.11 X |
| 5,174,500 | 12/1992 | Yianilos . |
| 5,335,857 | 8/1994 | Hagon . |
| 5,372,306 | 12/1994 | Yianilos . |
| 5,411,049 | 5/1995 | Colvard .................................. 137/71 |
| 5,465,752 | 11/1995 | Higgins . |
| 5,524,824 * | 6/1996 | Frimmer ................................ 239/71 |
| 5,609,179 | 3/1997 | Knapp . |
| 5,749,394 | 5/1998 | Boehmer et al. ............... 137/533.15 |
| 6,000,632 * | 12/1999 | Wallace ................................ 239/204 |

FOREIGN PATENT DOCUMENTS

| | | |
|---|---|---|
| 20 30477 | 11/1970 | (FR) . |
| WO 91/05193 | 4/1991 | (WO) . |
| WO 93/03301 | 2/1993 | (WO) . |
| WO 94/16255 | 7/1994 | (WO) . |

* cited by examiner

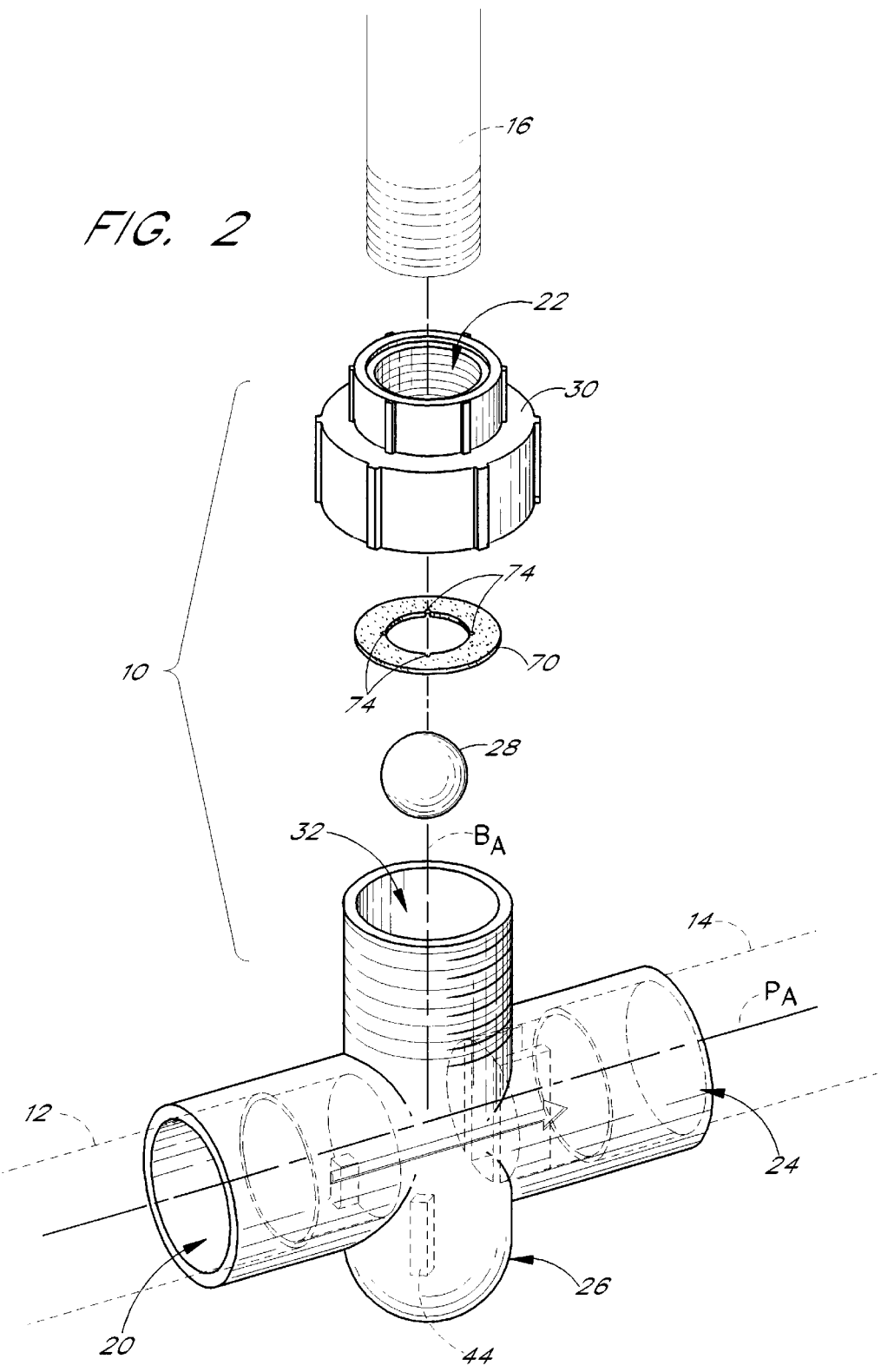

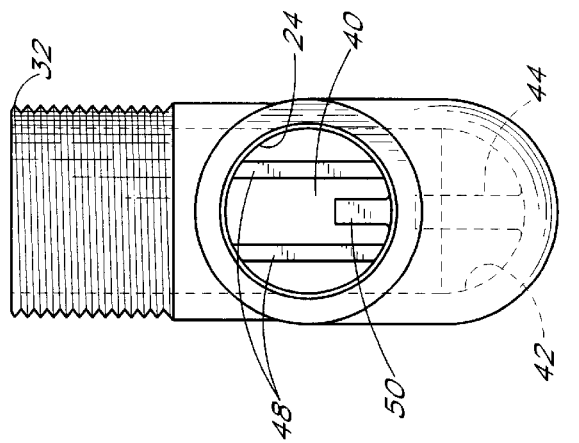
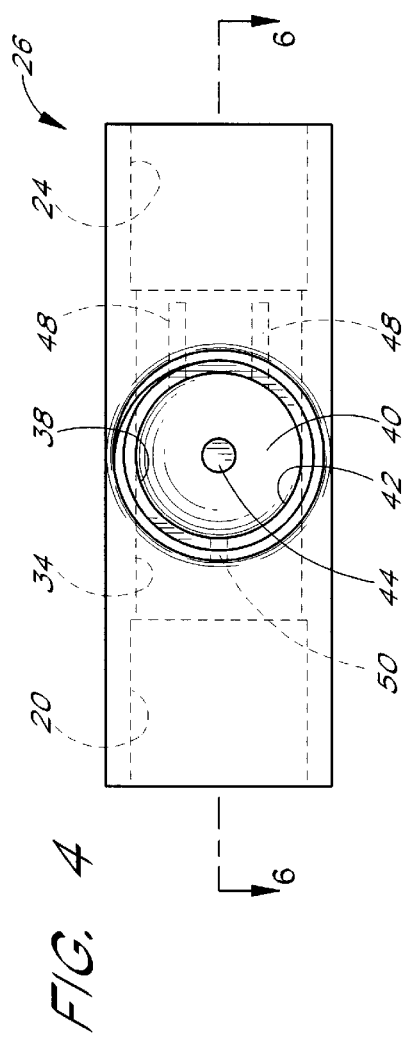
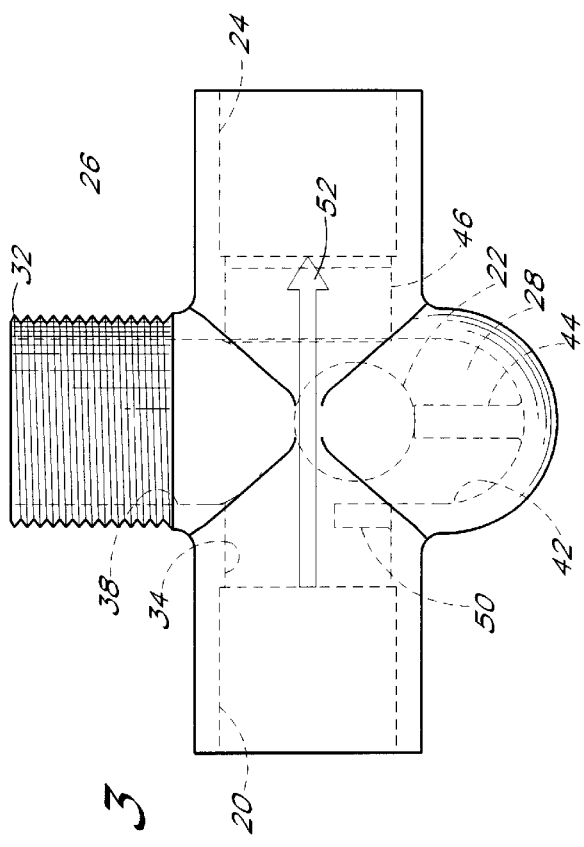

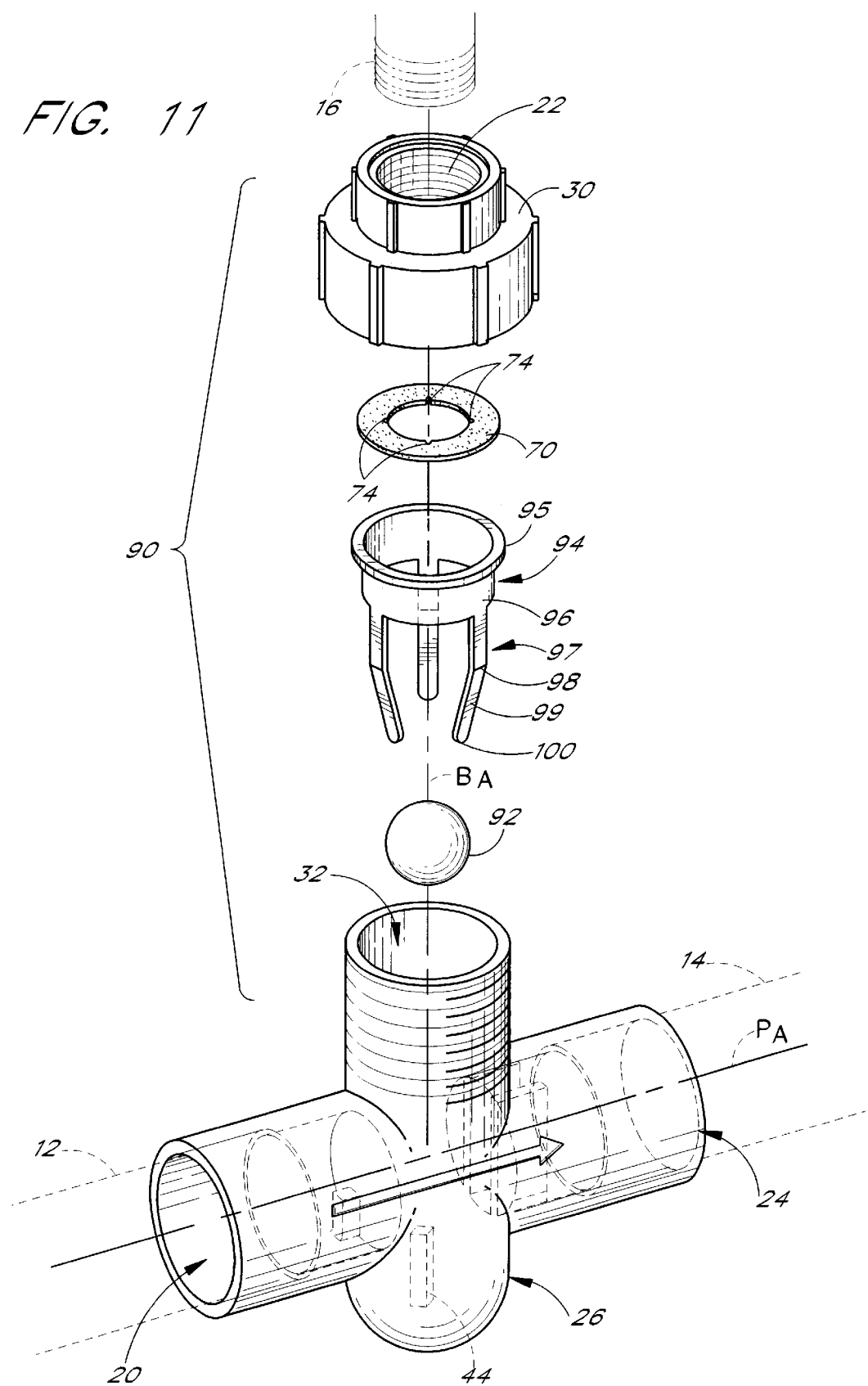

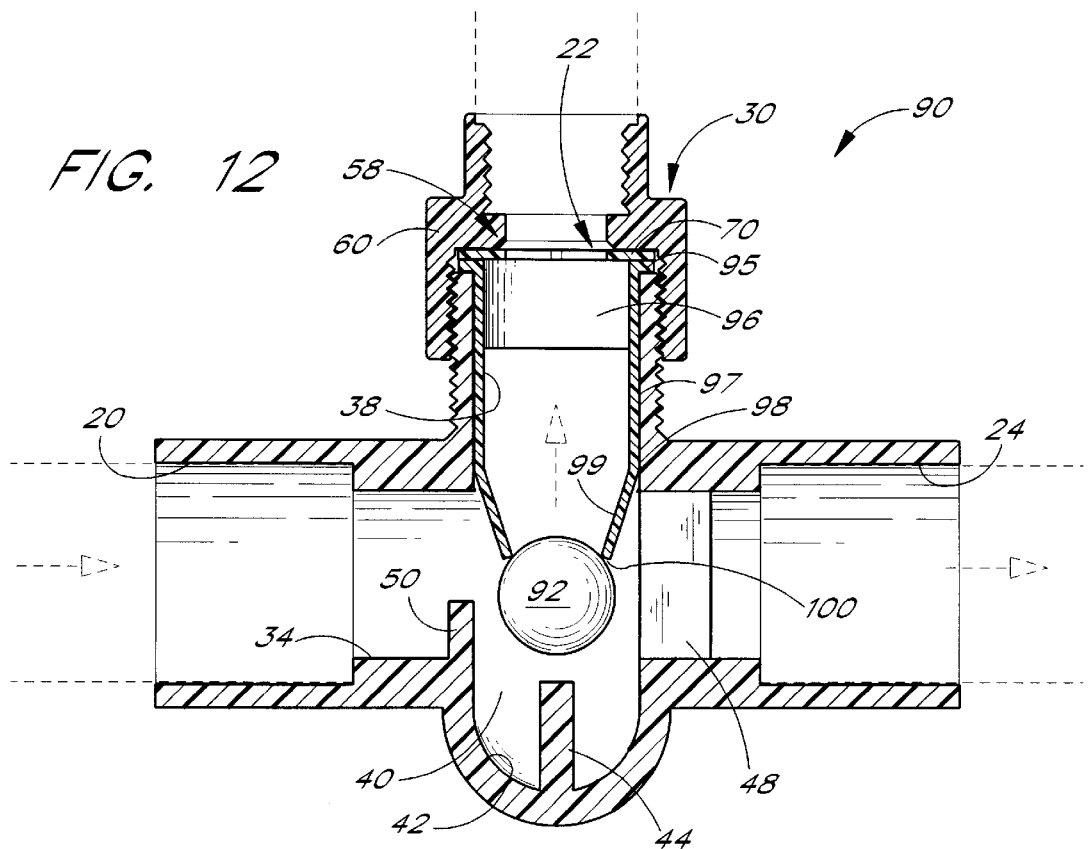
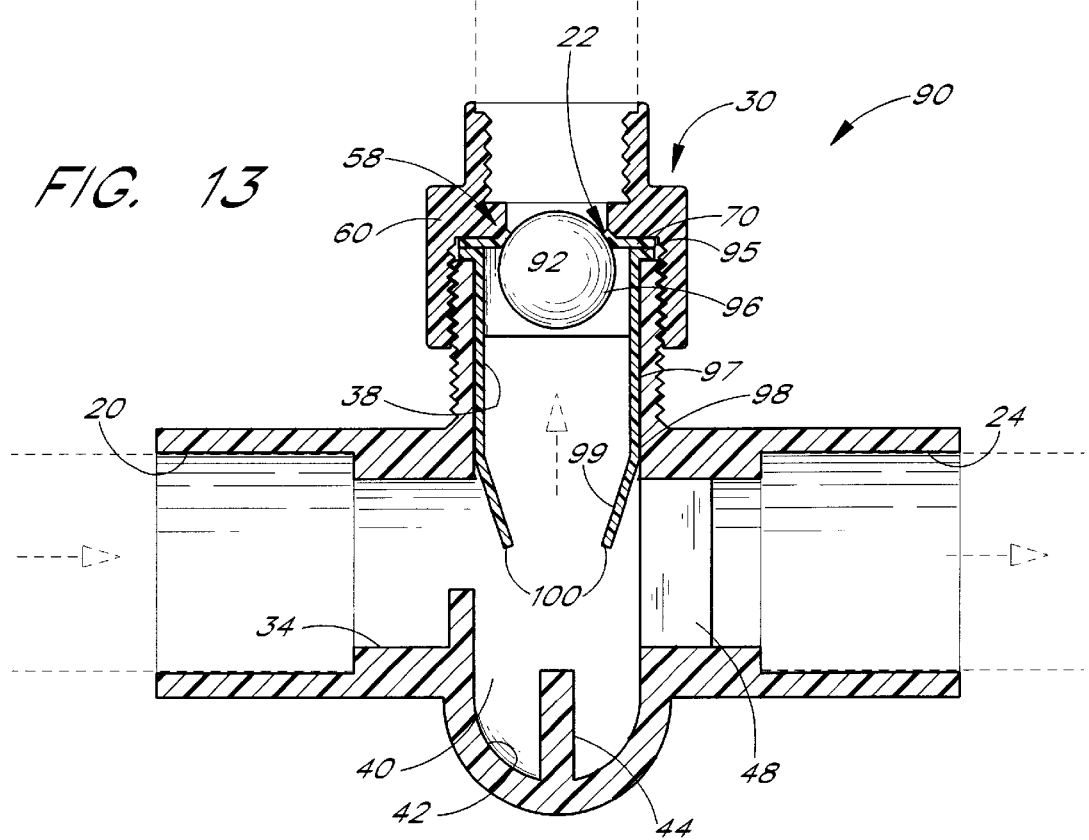

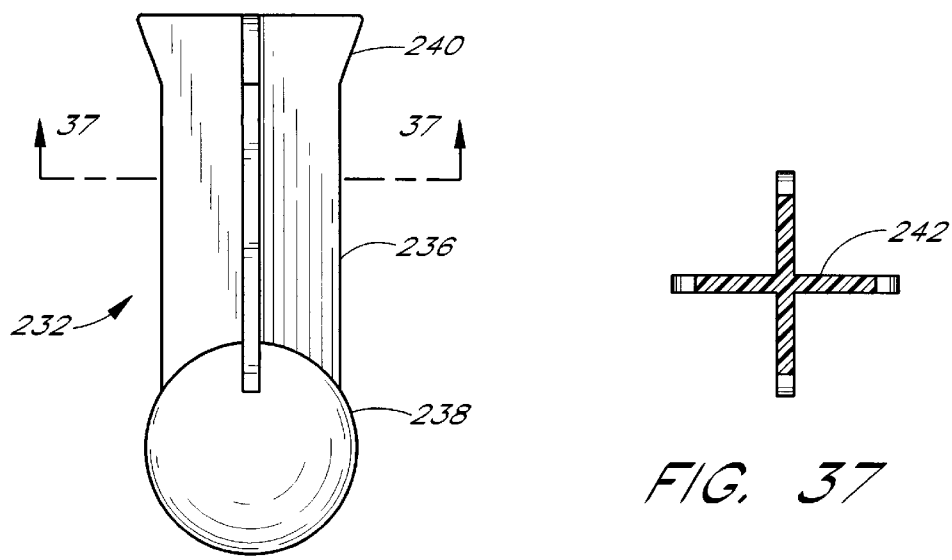
FIG. 36
FIG. 37
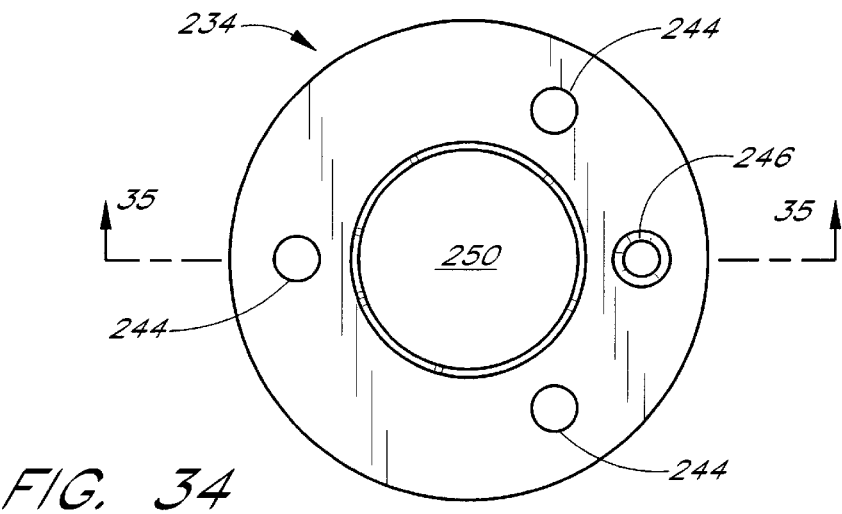
FIG. 34
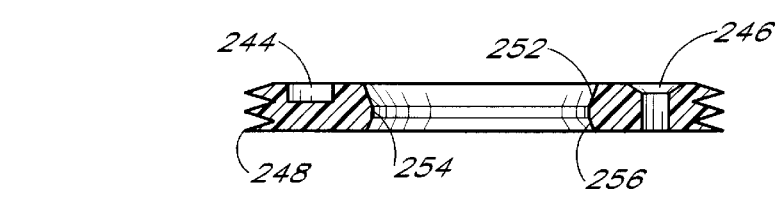
FIG. 35

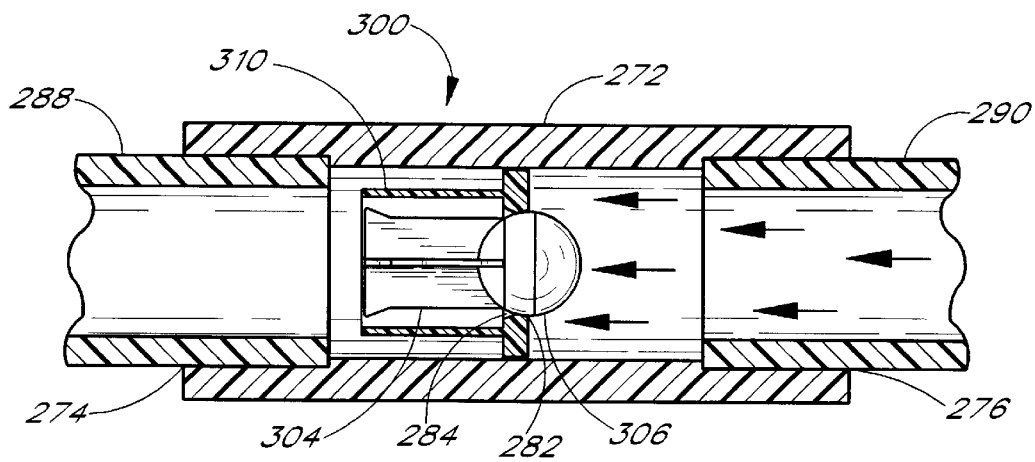
FIG. 42
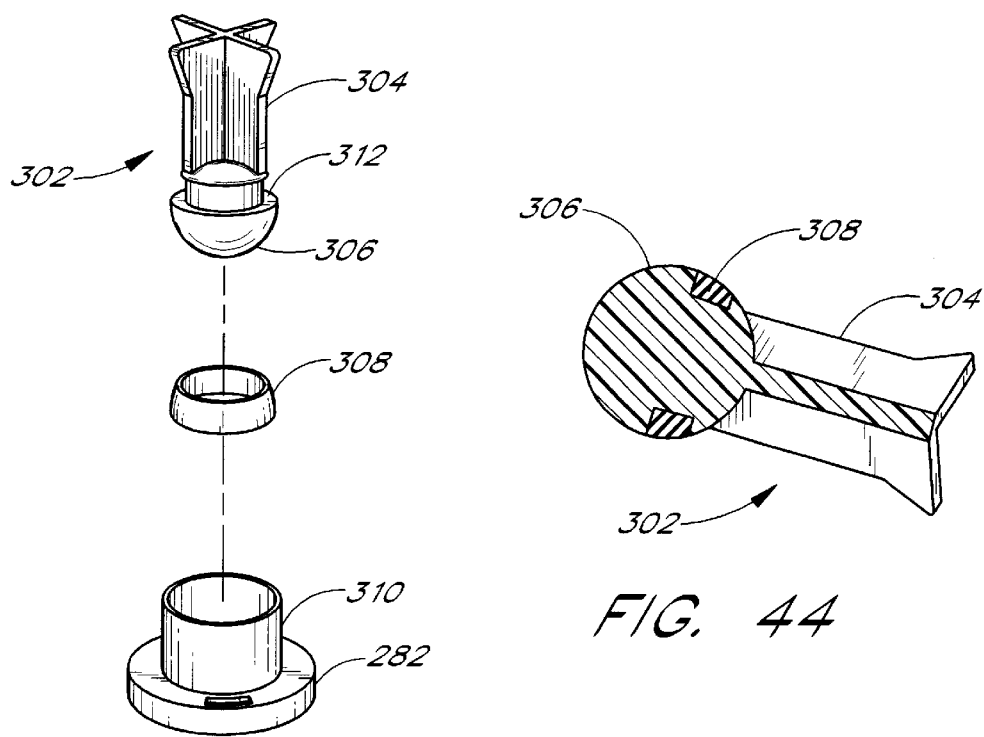
FIG. 43
FIG. 44

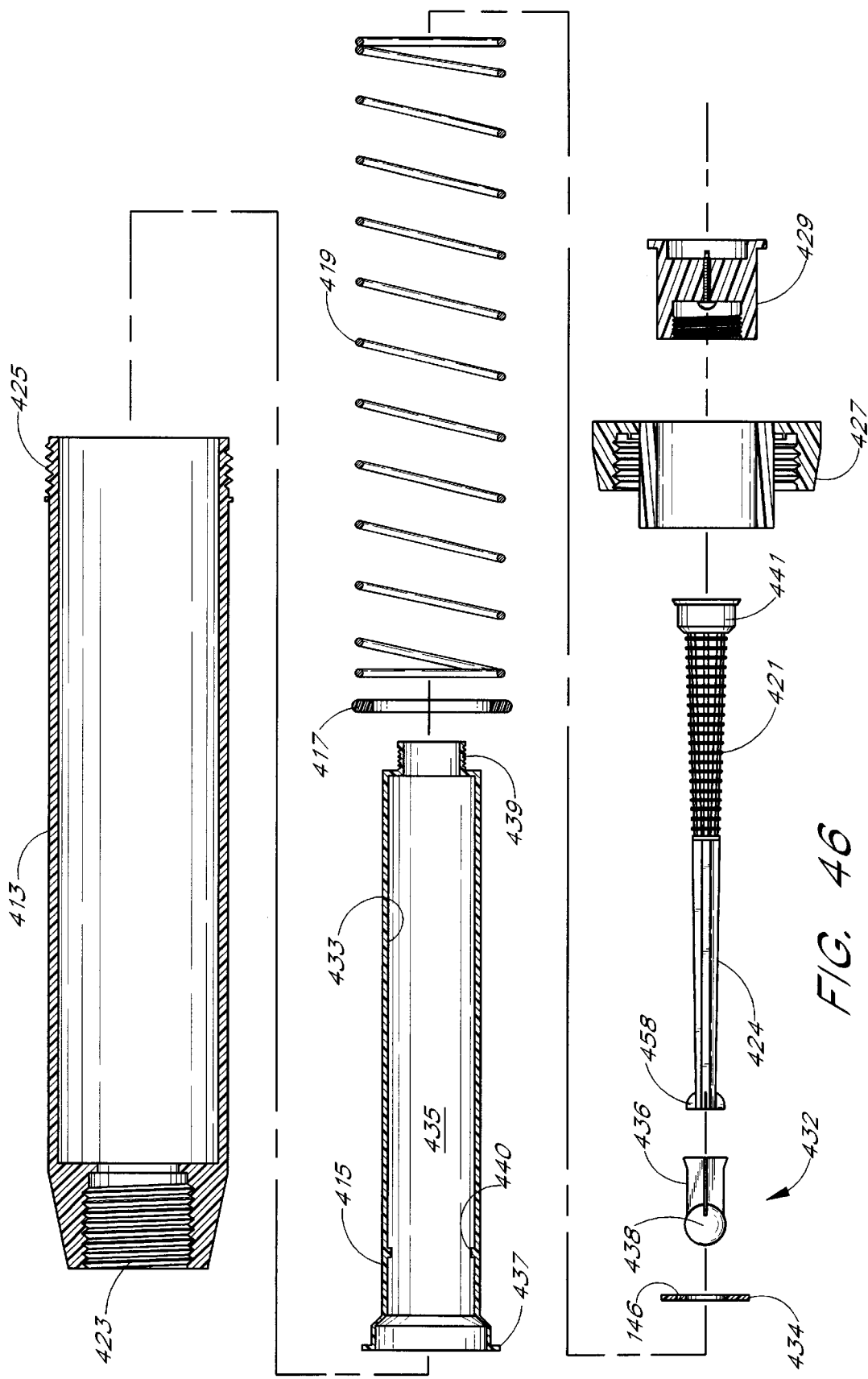

FLUID FLOW CONTROL VALVE

RELATED CASE

This application is a continuation-in-part application of pending U.S. application Ser. No. 09/162,343, filed Sep. 28, 1998, which is a continuation-in-part of U.S. application Ser. No. 09/151,618, filed Sep. 11, 1998, which is a continuation-in-part of U.S. application Ser. No. 09/081,960, filed May 19, 1998, which claims the benefit of priority under 35 U.S.C. § 119(e) of provisional U.S. application Ser. No. 60/068,575, filed on Dec. 23, 1997.

BACKGROUND OF THE INVENTION

1. Field of the Invention

The present invention relates to a fluid control system, and in particular to a fluid flow control valve. In one application, the fluid flow control valve can check the free flow of water from a broken or damaged riser of an overhead irrigation system.

2. Description of Related Art

Overhead irrigation systems often incorporate water spray devices (e.g., sprinkler heads) mounted on risers. Risers can either be fixed or movable, e.g., pop-up type sprinklers. A riser supports a sprinkler some distance above the ground, e.g., a few inches to several feet high. At this elevated position, the sprinkler has an enlarged spray pattern and irrigates a larger area than if the sprinkler were positioned closer to the ground. Riser mounted sprinklers also accommodate crops of varying heights.

Risers are pipes or conduits, typically made of plastic such as polyvinylchloride ("PVC"), copper, brass, or galvanized steel. In many irrigation systems, the riser extends upward from a fitting of the irrigation system, such as from a "T" or an elbow juncture, located under ground. In such an arrangement, water flows from a subterranean irrigation pipe through the riser to the sprinkler. In a pop-up type sprinkler, a movable riser extends from a housing when the sprinkler is in use. This enables a sprinkler head attached to an end of the riser to rise to a predetermined height to deliver fluid to the surrounding area.

While the use of a riser-mounted sprinkler head enlarges the area irrigated by the sprinkler, the riser is susceptible to mechanical damage because it extends above ground in an exposed position. Because typically no external structure braces or buttresses the riser, the riser can be broken (e.g., severed) or otherwise damaged (e.g., theft, vandalism, etc.), resulting most often in an open, free-flowing outlet. In addition, if the sprinkler head is removed from the riser, fluid will flow freely from the riser.

When a riser is broken or the sprinkler head is removed, water cannot be properly distributed through the sprinkler head. The rate of water flow increases without the restricting back pressure provided by the sprinkler, such that a large stream of water projects above the broken riser. The resulting water geyser impacts against a relatively small ground surface. Serious flooding and erosion consequently results in a small area, while the remainder of the area normally irrigated by the sprinkler goes unwatered. A significant amount of water is wasted as the result of the unrestricted flow through the broken riser, and substantial soil erosion can occur.

In addition, the water fountain gushing from the broken riser also can pose a serious highway problem if the water sprays onto highway lanes, or if the resulting water and soil run-off flows onto the highway. Numerous automobile accidents occur each year due to broken irrigation system risers.

While valves exist in the prior art for control of fluid flow in general, many such valves are inappropriate for restricting the flow of irrigation water through a riser with a free-flowing outlet, e.g. a broken or damaged riser, or a riser without a sprinkler head. Additionally, high volume farm irrigation systems introduce special needs for flow control. Prior valves are overly complicated and expensive for application to farm irrigation systems, which utilize hundreds of riser-mounted sprinklers. Some devices which have been implemented for stanching the unrestricted flow of irrigation water have proven unreliable, often failing to stop or even slow the rate of water flow when a riser breaks or other failure occurs. Other prior devices are too sensitive, shutting down water flow to undamaged risers.

In addition, when prior devices do function to stop the flow of water through a broken riser, the broken sprinkler often remains undetected for days, leaving the area surrounding the broken sprinkler unwatered. This danger is especially true of farm irrigation, where a single broken riser in a large field with many sprinklers could easily escape notice for many days, damaging crops in the vicinity.

Further deficiencies in prior devices include an inability of these devices to cope with transient flow conditions. For instance, the prior devices may prematurely shut off the valve in response to the combination of air and water in the system that often occurs when the system is first turned on. In addition, prior devices often include improperly restrained components which vibrate and wear under normal flow conditions.

Prior devices also have close fitting parts which are subject to corrosion. As a result, the small space between the parts cannot be maintained as corrosion, scale, debris, etc., often fill the space between the closely fit parts, and the device is likely to malfunction. For example, in a prior valve, a disc or poppet is shaped and sized to have a close fit with the valve seat in order to arrest fluid flow under abnormal flow conditions. Upon corrosion, however, the disc or poppet will not properly seal the valve seat, thereby allowing fluid flow within the valve. Under some conditions, such corrosion, scale formation, or like collected debris will prevent the valve disc or poppet from moving at all.

A need therefore exists for a simple, inexpensive yet reliable irrigation control valve which allows water to flow to an operational sprinkler, but restricts the water flow through a free-flowing outlet of the riser. Ideally, such a valve should allow detection of the broken riser or missing sprinkler head, even when the flow through the riser is essentially shut off

SUMMARY OF THE INVENTION

The present fluid flow control valve is simply structured yet reacts only to the presence of an abnormal flow condition through the system which is indicative of a mechanical system failure (e.g., an open pipe, a removed or stolen sprinkler head, a broken riser, etc.). Under normal flow conditions, the valve remains open. This is true for both steady-state and transient flow conditions. Thus, during transient flow, which occurs when the system is initiated, the valve stays open even though the flow rate through the valve may momentarily exceed a flow rate which is indicative of an abnormal condition. The valve does not prematurely close.

In one mode, the fluid flow control device includes a valve seat defining the passageway therethrough and a movable stopper that selectively cooperates with the valve seat to at least substantially close the passageway. A rod is positioned at least in part between the stopper and the valve seat, and is movable relative to the stopper. The rod prevents the stopper from seating against the valve during both steady-state and transient normal flow conditions. Therefore, even during transient normal flow conditions, the rod prevents the stopper from seating against the valve seat.

The fluid flow control valve does not have any close fitting parts, thereby reducing the likelihood of valve malfunction. In addition, fluid can flow through the support to spin or agitate the stopper. Agitation of the stopper prevents build up beneath the stopper of sediment and debris.

In accordance with another aspect of the present invention, a fluid flow device includes a fitting having a first port and a second port. A first passageway extends from the first port and a second passageway extends from the second port. Between the first and second passageways is a valve seat, which defines a valve passageway. A stopper is positioned within the valve passageway, and is movable between an open position relative to the valve seat when fluid flows in a direction from the first port toward the second port, and a closed position when fluid flows in a direction from the second port toward the first port. The stopper includes a compressible sealing member, which is positioned around a portion of the stopper, to seat against the valve seat when the stopper is in the closed position. Additionally, the stopper includes a valve element which is located away from the valve seat when the stopper is in the open position and which seats against the valve seat when the stopper is in the closed position. The sealing member is located around a portion of the valve element.

In accordance with a further aspect of the present invention, a fluid flow control device includes a valve seat device having a valve seat and a stopper positioning device disposed to one side of the valve seat. A stopper, which includes a valve element and a stem, cooperates with the valve seat. The stopper is located relative to the valve seat device such that a flared portion of the stem of the stopper is located on one side of the valve seat and the valve element is located on the other side of the valve seat. The stopper is movable between an open position in which the valve element is located away from the valve seat and a closed position in which the valve element is seated against the valve seat.

An additional aspect of the present invention includes a pop-up sprinkler having a housing, a pop-up riser at least partially disposed within the housing and movable relative to the housing. A valve seat is within the riser. A stopper cooperates with the valve seat and has a valve element. The stopper is movable between a first position and a second position in which the valve element seats against the valve seat. A biasing device prevents the valve element from seating against the valve seat under normal flow conditions. In addition, the pop-up sprinkler includes a sprinkler head attached to the riser. A filter between the sprinkler head and the valve seat can be unitary with the biasing device.

In accordance with yet another aspect of the present invention, a fluid flow device for a pop-up sprinkler having a housing and a riser disposed at least partially within the housing and movable relative to the housing, includes a valve seat defining a valve passageway, and a stopper positioned within the valve passageway. The valve seat device is sized and shaped to fit within the riser. The stopper is movable between an open position and a closed position. A biasing device biases the stopper in the open position and prevents the stopper from seating against the valve seat under normal flow conditions. The biasing device can be attached to a filter of the pop-up sprinkler, which is positioned within the riser.

In accordance with an additional aspect of the present invention, a fluid flow control valve assembly includes a first fitting and a second fitting. The first and second fittings cooperate with and are movable relative to one another. Each fitting has a valve within the fitting. The valve includes a valve seat positioned within the fitting and a stopper which is movable between an open position and a closed position. A biasing device is positioned between the stopper of the first fitting and the stopper of the second fitting. The biasing device biases at least one of the stoppers in an open position under normal flow conditions.

A further aspect of the present invention involves a fluid flow control valve within a swing joint of an irrigation system having a first valve seat device, a second valve seat device, a first stopper and a second stopper. Each valve seat device includes a valve seat. The first stopper cooperates with the first valve seat and the second stopper cooperates with the second valve seat. Each stopper includes a valve element and a stem, which had a flared portion. The first stopper is located relative to the first valve seat device such that the flared portion of the stem is located on one side of the valve seat and the first valve element is located on the other side of the valve seat. The second stopper is located relative to the second valve seat device such that the flared portion of the stem is located on one side of the valve seat and the second valve element is located on the other side of the valve seat. A first biasing device prevents the first valve element from seating against the first valve seat under normal flow conditions, and a second biasing device prevents the second valve element from seating against the second valve seat under normal flow conditions.

In accordance with another aspect of the present invention, a fluid flow control device includes a housing having a first portion adapted to cooperate with a fitting of a fluid delivery system and a second portion adapted to cooperate with a branch section of the fluid delivery system. A valve seat is located within the first portion of the housing. A stopper, which is positioned a distance away from the valve seat, is movable between a first position, in which the stopper is located a distance away from the valve seat, and a second position, in which the stopper seats against the valve seat. Because the valve seat is located within the first portion of the housing, the fluid flow control valve of this design can continue to function even if the housing is severed between the first and second portions.

An additional aspect of the present invention involves a fluid flow control valve that includes a fitting having an influent port and an effluent port. A main passageway extends from the influent port and a branch passageway extends from the effluent port. In one embodiment, the main passageway and branch passageway may be normal to one another. In other embodiments, the main and branch passageways may intersect at other angles. In addition, the main passageway can terminate at the intersection between the main and branch passageways, such as an elbow fitting, or it may continue past the intersection such as a T-fitting.

A support is fixed to a housing having a valve seat with a stopper being positioned between the support and the valve seat. Because the support is fixed to the housing, system shock can be absorbed and transferred by the support to the housing.

In addition, at least a portion of the support and stopper are positioned generally within the main passageway under normal flow conditions. Placement of the support and stopper within the main passageway minimizes head loss within the branch passageway. The stopper is movable between an open position in which the stopper is located a distance away from the valve seat under normal flow conditions and a closed position in which the stopper seats against the valve seat under abnormal flow conditions.

In accordance with an additional aspect of the present invention, a fluid flow control device includes a housing having a valve seat and a stopper within the housing. The stopper is movable between an open position in which the stopper is located a distance away from the valve seat and a closed position in which the stopper seats against the valve seat. The housing is adapted to fit within a fitting of a fluid delivery system.

The housing includes a valve seat member which contains the valve seat and which is adapted to cooperate with the fitting of the fluid delivery system. The housing further includes a support fixed to the valve seat member. The stopper is positioned between the valve seat member and the support.

In accordance with a further aspect of the present invention, a fluid flow control valve is disclosed for controlling flow through a fluid delivery section and a fluid delivery device of a fluid delivery system. The valve includes a housing connected to a first end of the fluid delivery section of the fluid delivery system. A valve seat is located within the housing between a first receptacle and a second receptacle. A keeper is positioned downstream from a stopper, which is movable between a first position located a distance away from the valve seat and a second position seated against the valve seat. The keeper, which can vary in length, has a first end positioned in close proximity to the stopper and a second end positioned in close proximity to the fluid delivery device. The keeper can comprise a plurality of rods stacked lengthwise within the fluid delivery system. Grooves spaced longitudinally along the rod can facilitate in sizing the rod to fit within a fluid delivery section having a length less than the length of the rod.

In accordance with yet another aspect of the present invention, a method for controlling fluid flow through a fluid delivery system involves providing a valve between a primary line and a secondary line of the fluid delivery system. The valve includes a movable stopper which selectively engages a valve seat to inhibit fluid flow through the secondary line. The stopper is positioned within the fluid flow through the primary line in a normal location under normal flow conditions. In this normal location, the stopper ties near the valve seat and in a position in which fluid flows on a side of the stopper opposite the secondary line. The stopper is maintained in the normal location under normal flow conditions. However, under abnormal flow conditions, the stopper is moved to a closed position. The stopper is seated against the valve seat when in a closed position to inhibit fluid flow through the secondary line under abnormal flow conditions. A fine stream of fluid can be projected from the valve to indicate that the valve is closed. This fine stream of fluid signals that a fault condition has occurred and facilitates in identifying the location of the closed valve.

In accordance with a further aspect of the invention, a method for controlling fluid flow through a delivery system involves providing a valve between a source of fluid and an effluent port of the fluid delivery system. The valve includes a movable stopper which selectively engages a valve seat to inhibit fluid flow through the effluent port. A stopper is positioned in an open position near the valve seat between the source of fluid and the valve seat in a position which allows fluid to flow through a passageway defined by the valve seat. A biasing device is positioned at least partially between the stopper and the valve seat and generally in contact with the stopper during normal flow conditions such that there is relative movement between the biasing device and the stopper. The stopper is maintained in the open position under normal flow conditions. The stopper is moved to a closed position under abnormal flow conditions such that the stopper seats against the valve seat when in the closed position to inhibit fluid flow through the effluent port under abnormal flow conditions. The biasing device can be sized to correspond with the effective length between a fluid delivery device of the fluid delivery system and the stopper, when the stopper is in the open position. The valve of this design can be used in a number of systems of various sizes because the biasing device can be easily sized to fit within the fluid delivery device and stopper.

An additional aspect of the present invention involves a valve assembly kit including a housing having a valve seat, a stopper adapted to cooperate with the valve seat and a plurality of rods adapted to be sized to fit within a portion of the housing and a branch section of a fluid delivery system. A cap which is releasably attachable to at least one of the rods and configured to allow fluid to flow through the cap may also be included in the valve assembly kit. Each rod may have a plurality of grooves spaced longitudinally along the rod whereby the grooves facilitate in breaking off a portion of the rod to size the rod to fit within the branch section of the fluid delivery system. Additionally, the plurality of rods can include at least two rods which differ in length from one another.

In accordance with another aspect of the present invention, a valve includes a fitting having an influent, at least one effluent port, a valve seat and a stopper. A main passageway extends from the influent port and a branch passageway extends from the main passageway to the effluent port. The valve seat is located within the branch passageway. The stopper is movable between an open position relative to the valve seat under normal flow conditions and a closed position relative to the valve seat. Further, at least a portion of the stopper is supported and positioned generally within the main passageway of the fitting under normal flow conditions.

In addition, the stopper includes a stem portion and a valve element. The valve element of the stopper is located away from the valve seat when the stopper is in the open position and is seated against the valve seat when the stopper is in the closed position.

In accordance with yet another aspect of the present invention, a fluid flow control device includes a valve seat device having a valve seat and a stopper, which is not attached to the valve seat device. The stopper includes a valve element which is movable between a first position and a second position. In the first position, the valve element is located a distance away from the valve seat, and in the second position, the valve element seats against the valve seat. The valve element is prevented from seating against the valve seat under normal flow conditions by a biasing. In some instances, the biasing device will comprise a rod.

A further aspect of the present invention involves a fluid flow control device including a valve seat device having a valve seat and a stopper unattached to the valve seat. The stopper includes a valve element and a stem with a flared portion. The stopper is located relative to the valve seat device such that the flared portion of the stem is located on one side of the valve seat and the valve element is located on the other side of the valve seat. The stopper is movable between an open position in which the valve element is located away from the valve seat and a closed position in which the valve element is seated against the valve seat.

In accordance with an additional aspect of the present invention, a method for manufacturing a fluid flow device involves molding a valve seat device to have an inner passage and also molding a stopper to have a valve element which is larger than the inner passage. While at least the valve seat device is at a temperature above ambient, the valve element is passed through the inner passage, and the valve seat device is cooled.

In accordance with still another aspect of the present invention, a fluid flow control device includes a fitting having a first port and a second port. A first passageway extends from the first port and second passageway extends from the second port. Between the first and second passageways is a valve seat. A stopper is positioned within the valve seat. The stopper is movable between an open position relative to the valve seat when fluid flows in a direction from the first port toward the second port and a closed position when fluid flows in a direction from the second port toward the first port. A portion of the stopper is within the valve passageway when the stopper is in the open position.

Various features of the above noted aspects of the invention can also be interchanged, as will be readily apparent to those skilled in the art. In addition, further aspects, features, and advantages of the present invention will become apparent from the detailed description of the preferred embodiments which follow.

BRIEF DESCRIPTION OF THE DRAWINGS

These and other features of the invention will now be described with reference to the drawings of several embodiments of the present fluid flow control valve, which are intended to illustrate, but not to limit the invention. The drawings contain the following figures:

FIG. 2 is an exploded, perspective view of the fluid flow control valve of FIG. 1;

FIG. 3 is a left side elevational view of a fitting of the fluid flow control valve of FIG. 2;

FIG. 4 is a top plan view of the fitting of FIG. 3;

FIG. 5 is a front elevational view of the fitting of FIG. 3;

FIG. 11 is an exploded, perspective view of a fluid flow control valve in accordance with another preferred embodiment;

FIG. 12 is a cross-sectional view of the fluid flow control valve of FIG. 11 under normal flow conditions;

FIG. 13 is a cross-sectional view of the fluid flow control valve of FIG. 11 after it has reacted to abnormal flow conditions;

FIG. 34 is a top plan view of the valve seat device of the fluid flow control valve of FIG. 32;

FIG. 35 is a cross-sectional view of the valve seat device of FIG. 34 taken along line 35—35 of FIG. 34;

FIG. 36 is a side view of the stopper of the fluid flow control valve of FIG. 32;

FIG. 37 is a cross-sectional view of a stem of the stopper of FIG. 36 taken along line 37—37 of FIG. 36;

FIG. 42 is cross-sectional view of another embodiment of a fluid flow control valve assembly under abnormal flow conditions with the valve being in a closed position;

FIG. 43 is an exploded, perspective view of the fluid flow control valve assembly of FIG. 42;

FIG. 44 is an enlarged, perspective cross-sectional view of the stopper of the fluid flow control valve of FIG. 42;

FIG. 46 is an exploded, cross-sectional view of the pop-up sprinkler and fluid flow control valve of FIG. 45;

DETAILED DESCRIPTION OF THE PREFERRED EMBODIMENTS

The present invention relates generally to fluid flow control valves for restricting fluid flow rates. Those skilled in the art will readily appreciate that the present invention may have application in a variety of fluid delivery systems where fluid flow through a particular branch of the system should be maintained below a predetermined flow rate or should be arrested if a mechanical failure occurs in a downstream section of the branch. While the following embodiments are described in the context of irrigation systems, it will be understood that the structures, methods and principles described herein are readily applicable to the restriction of fluid flow in other contexts. The irrigation context, therefore, is merely an exemplary field of use.

FIGS. 1–10 illustrate a fluid control valve 10 configured in accordance with a preferred embodiment of the present invention. The valve 10 can be integrated into any of a variety of junctures. For example, but without limitation, the valve 10 can take the form of the illustrated T-joint, an elbow joint, a comer joint, or a swing joint (as illustrated in FIGS. 52–55 and described below). In this manner, the valve 10 can be employed throughout an irrigation or other fluid delivery system.

Figure 1:
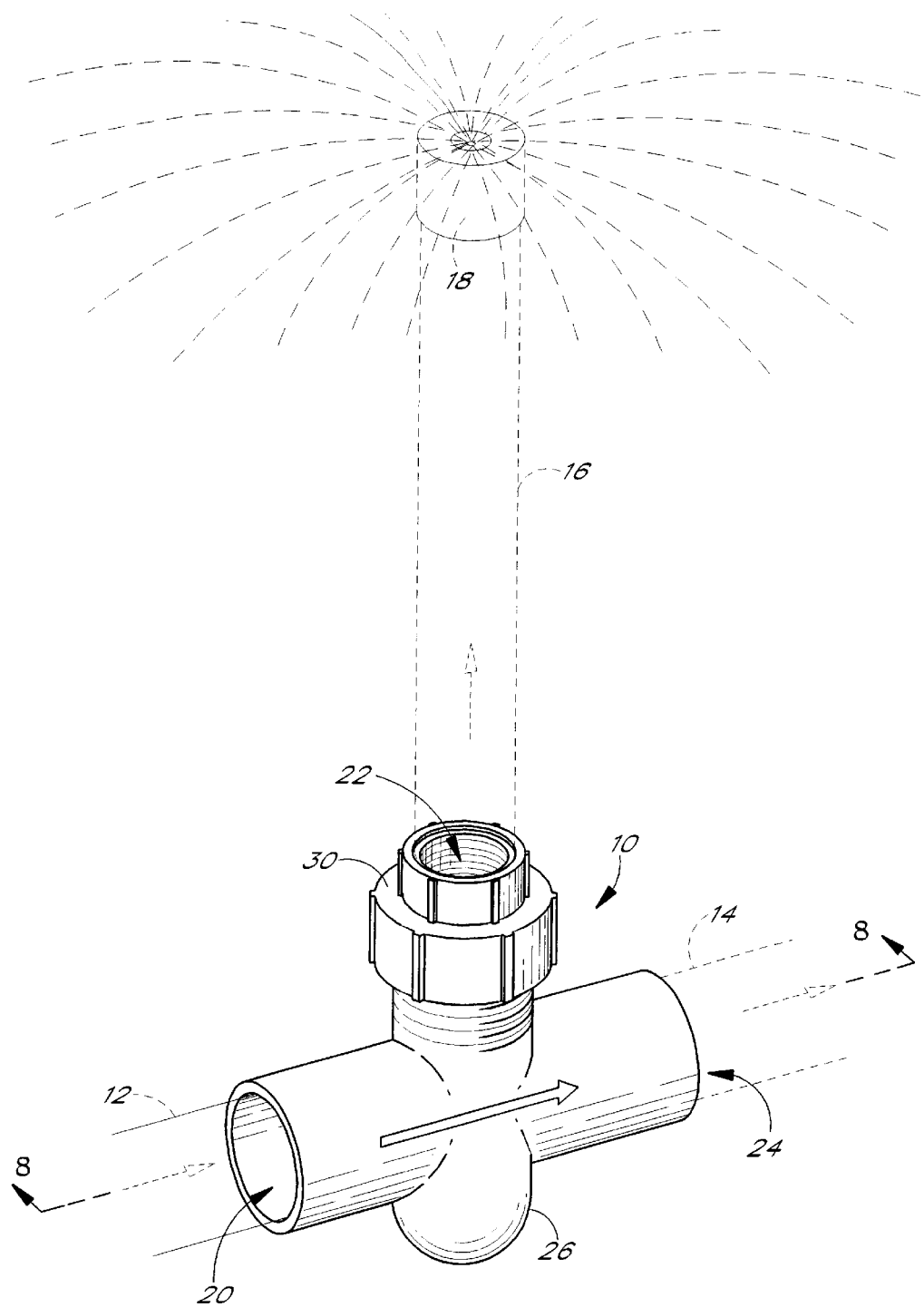
FIG. 1 is a perspective view of a fluid flow control valve configured in accordance with an embodiment of the present invention.

With initial reference to FIG. 1, the control valve 10 is inserted between a pair of irrigation pipes 12, 14, which form a part of a larger irrigation system. The irrigation pipes 12, 14 can connect together multiple control valves to form at least a portion of the irrigation system.

A riser 16 desirably extends upwardly from the control valve 10 to support a sprinkler head 18 in an elevated position. As noted in the "Background" section above, the sprinkler provides diffuse distribution to irrigate a large area from its elevated position.

The valve 10 includes at least one influent port and at least one effluent port. In the illustrated embodiment, the valve 10 forms a T-junction with one influent port 20 in communication with an upstream irrigation pipe 12, a first effluent port 22 communicating with the riser 16, and a second effluent port 24 communicating with a downstream irrigation pipe 14.

As best seen in FIGS. 1 and 2, the valve 10 includes a fitting 26 which is positioned between adjacent ends of the aligned irrigation pipes 12, 14. A stopper or plug 28 operates within the fitting 26 to selectively arrest flow through the first effluent port 22 in the manner described below.

In the illustrated embodiment, a cap 30 is attached to an upper end 32 of the fitting 26 and defines, in part, the first effluent port 22. The cap 30 also at least partially secures the stopper 28 within the fitting 26. Together the fitting 26 and cap 30 define a valve housing.

Figure 24:
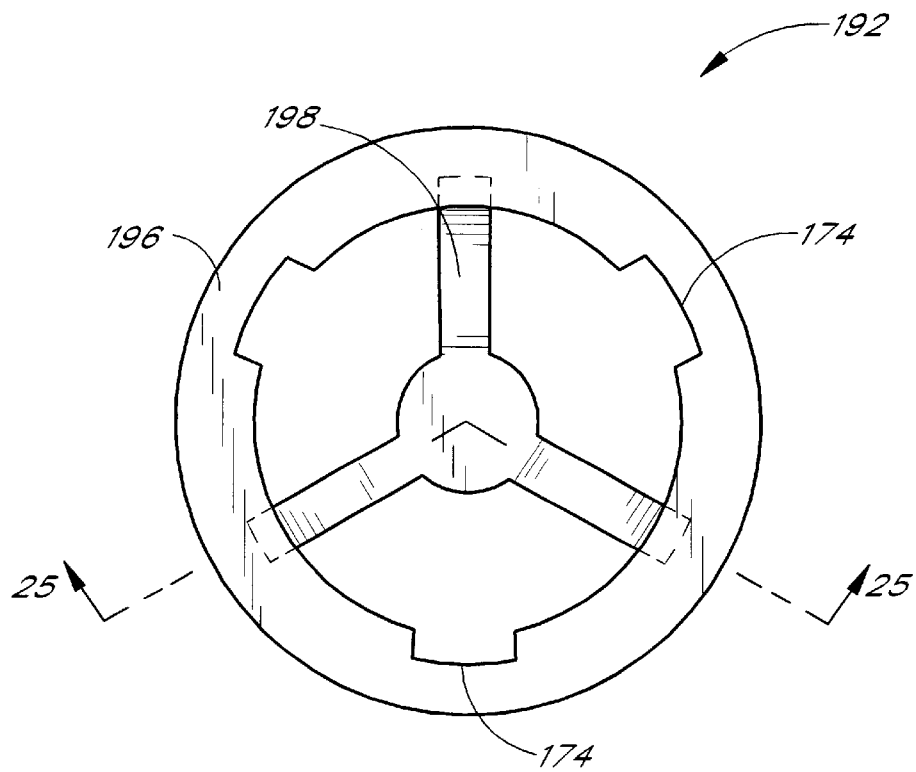
FIG. 24 is a bottom plan view of the basket of the fluid flow control valve of FIG. 21.

Though in the illustrated embodiment the valve housing includes a two piece construction—a fitting 26 and a cap 30—it is understood that the valve 10 can comprise a unitary housing that includes the first effluent port as well as the influent port (as illustrated in FIG. 24). The unitary housing can take the form of a single molded piece, or of two molded pieces fused or welded together, e.g., by sonic welding. For such an arrangement, a separate cap, such as that in the illustrated embodiment, would not be necessary.

The individual components of the valve 10 will now be described in detail. The valve 10 will be described in terms of the illustrated arrangement within the irrigation system with a water flow in a horizontal direction between the influent port 20 and the second effluent port 24, and a water flow in the vertical direction through the first effluent port 22. The terms "horizontal" and "vertical," of course, depend on the chosen orientation of the valve 10 and are used here to simplify the description. Likewise, terms of orientation, such as "above", "below", "upper" and "lower", are used in the context of the illustrated embodiment; however, because other orientations are possible, the present invention should not be limited to the illustrated orientation. Those skilled in the art will appreciate that other orientations of the valve 10 also are possible.

With reference to FIGS. 3–6, the fitting 26 defines the influent port 20 and the second effluent port 24. The fitting 26 desirably comprises a one-piece, molded PVC part. The influent port 20 is defined at an upstream end of the fitting 26, while the second effluent port 24 is defined at an opposite downstream end of the fitting 26. In the illustrated embodiment, each of the ports 20, 24 has a generally circular cross-sectional shape which is sized to receive an end of the corresponding irrigation pipe 12, 14 (see FIG. 1) in a slip fit manner. It is understood, however, that the cross-sectional shape of the ports 20, 24 can have any of a variety of shapes and sizes, and methods of joining the pipes, depending upon the shape of the conduits to be received.

A conventional bonding agent, such as, for example, a solvent-based cement for PVC material, can be used to attached the fitting 26 onto the ends of the irrigation pipes 12, 14 in a known manner. The ends of the fitting 26, however, can also include coupling structure that interconnects the fitting 26 to the irrigation pipes 12, 14. For example, the fitting 26 can be coupled to the pipes by a threaded connection.

As seen in FIGS. 3–6, a primary passage 34 extends horizontally between the ports 20, 24. The influent port 20, the second effluent port 24 and the primary passage 34 desirably are aligned along a common primary flow axis $P_A$. As illustrated in FIG. 3, the inner diameters of the fitting 26 at the influent port 20 and the second effluent port 24 are slightly larger than the inner diameter in the primary passage 34. A step 36 (FIG. 6) in diameter between the primary passage 34 and each port 20, 24 provides a seat against which the irrigation pipes 12, 14 (FIG. 1) abut when completely slipped into the fitting 26.

The diameter of the inner surfaces of the irrigation pipes 12, 14 and the primary passage 34 desirably match for a smooth transition between the valve 10 and the pipes 12, 14. This construction reduces the pressure drop across the valve 10.

A branch or secondary passage 38 extends from the primary passage 34. In the illustrated embodiment, the branch passage 38 extends generally normal to the primary flow axis $P_A$ and defines a branch flow axis $B_A$ therealong. The branch passage 38 terminates at the upper end 32.

In the illustrated embodiment, an external thread extends about the upper end 32 of the fitting 26. The external thread is sized to cooperate with an internal thread of the cap to secure the cap 30 to the fitting 26, as described below.

Figure 6:
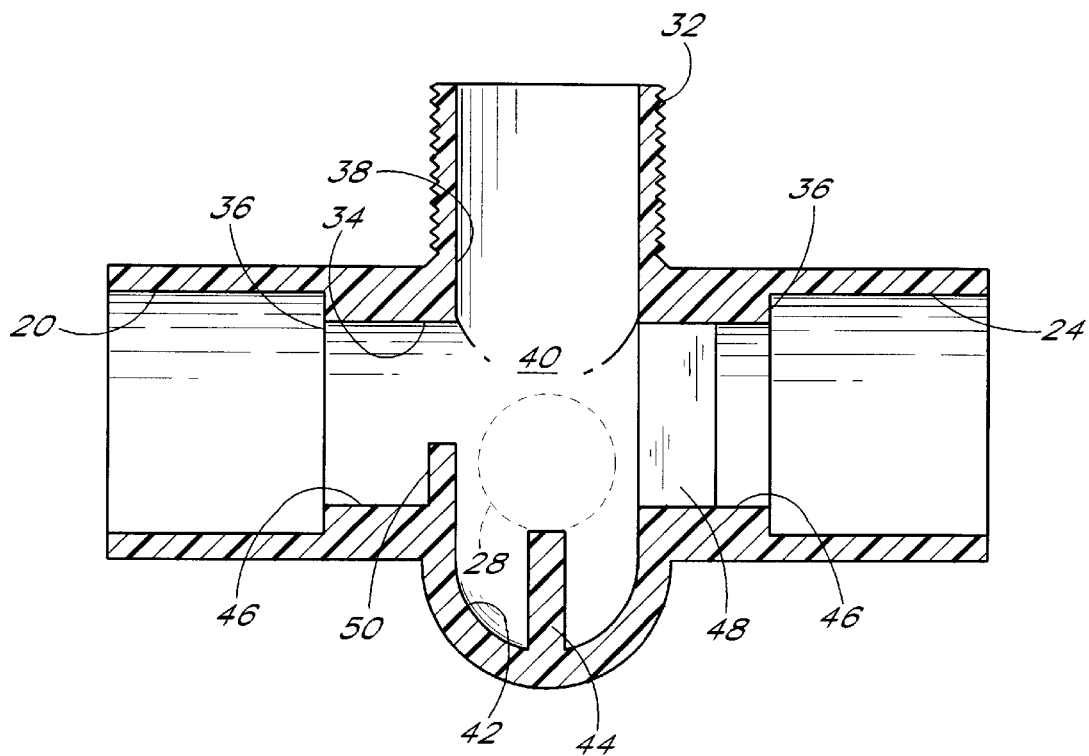
FIG. 6 is a cross-sectional view of the fitting of FIG. 3 taken along line 6—6 of FIG. 4.

As best seen in FIGS. 3 and 6, the primary and branch passages 34, 38 together define an internal cavity 40 within the fitting 26. The cavity 40 is defined in part by a recess 42 that is formed in the fitting 26 on the opposite side of the primary flow axis $P_A$ from the branch passage 38.

The recess 42 defines an extension of the cavity 40 below the primary flow passage 34. The recess 42 desirably comprises a smoothly curved surface to minimize resistance to fluid flow, and is sized to accommodate a substantial portion of fluid flow during normal flow conditions, as will be further defined below. In the illustrated embodiment, the recess 42 has hemispherical shape with an inner diameter generally matching the inner diameter of the cylindrical primary passage 34.

Desirably, the valve 10 includes a support for maintaining the stopper 28 within the cavity 40. In particular, the support maintains the stopper 28 within a fluid flow path under normal flow conditions. Fluid thus flows around the stopper 28, as will be understood from the description below.

In the illustrated embodiment, a post 44 extends from roughly the center of the recess 42 upwardly into the cavity 40, as best seen from FIG. 6. This post serves to support the stopper 28 within the cavity 40. The upper end of the post 44 desirably terminates at even level or slightly below a bottom surface portion 46 of the primary passage 34.

One or more straightening vanes 48 extend into the primary passage 34 downstream of the recess 42. At least one vane 48 advantageously extends completely across the primary passage 34 and is arranged substantially parallel to the primary flow axis $P_A$.

In the illustrated embodiment, a pair of vanes 48 lie parallel to each other. The vanes 48 extend across the primary passage 34 in the vertical direction and are spaced relative to each other and to the sides of the passage 34 to prevent the stopper 28 from escaping through the effluent port 24. The vanes 48 desirably present a thin profile to the water flow, as seen in FIG. 5, but have a sufficient length (i.e., in a direction parallel to the primary flow axis $P_A$) to provide a flow straightening effect of fluid flow passing through the vanes 48, as seen in FIGS. 3 and 6.

On the upstream side of the recess 42, an extension 50 extends at least partway into the primary passage 34 and is located between the influent port 20 and the recess 42. In the illustrated embodiment, the extension 50 extends in the vertical direction from the bottom portion surface 46 of the primary passage 34 toward the flow axis $P_A$, and lies at an upstream edge of the recess 42. The vertical length of the extension 50 advantageously is sufficient to prevent the stopper 28 from migrating toward the influent port 20. In the illustrated embodiment, the extension 50 extends only partway across the primary passage 34. By such an arrangement, the extension 50 impedes only a portion of the fluid flowing through the lower half of the passage 34.

Although not illustrated, at least one straightening vane can be used in the place of the extension 50. If a second pair of straightening vanes were used and were configured and arranged within the passage 34 in accordance with the above-description, but on the upstream side of the branch passage 38, the valve 10 would be bidirectional. That is, either end of the fitting 26 could function as the influent port or the second effluent port. It would not matter which direction the valve 10 were installed.

The illustrated embodiment of the valve 10, however, is orientation sensitive and has a distinct influent port 20 and a distinct second effluent port 24. For this reason, the valve 10 desirably includes indicia that indicates the designed direction of fluid flow though the primary passage 34 of the valve 10. In the illustrated embodiment, an arrow 52 (FIG. 3) on the surface of the fitting 26 indicates this desirable direction of flow through the primary passage 34 during normal operation; however, other indicia, such as the designations "in" and "out" at the influent port 20 and the second effluent port 24, respectively, can be used as well.

Figure 7:
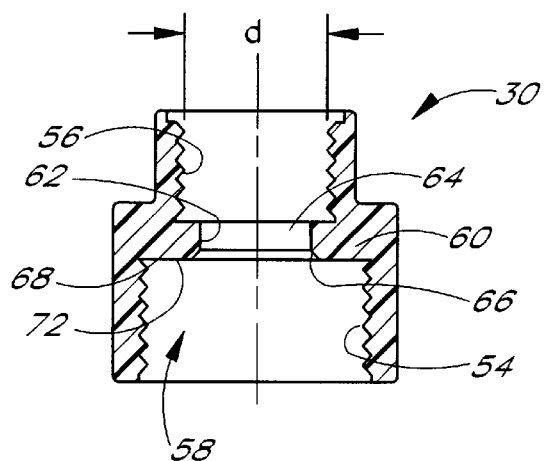
FIG. 7 is a cross-sectional view of a cap of the fluid flow control valve of FIG. 2.

The cap 30 is attached to the upper end 32 of the fitting 26 at the terminal end of the branch passage 38 to complete in principal the first effluent port 22. With reference to FIG. 7, a cross-section of the cap 30 is shown. As with the primary and secondary passages 34, 38 of the fitting 26, the cap 30 desirably has a generally cylindrical shape for aesthetic purposes.

The cap 30 includes a lower receptacle 54 that engages with the fitting 26. The lower receptacle 54 includes an internal thread that is sized to cooperate with the external threads of the fitting upper end 32.

The cap 30 also includes an upper receptacle 56, which desirably is threaded and is sized to engage a corresponding riser 16. In the illustrated embodiment, the diameter d of the upper receptacle 56 is smaller than the diameter of the branch passage 38 (FIG. 6); however, the diameter of the upper receptacle 56 can match that of the lower receptacle 54 or can be larger than the diameter of the lower section 54, depending upon the size of the riser 16.

Figure 8:
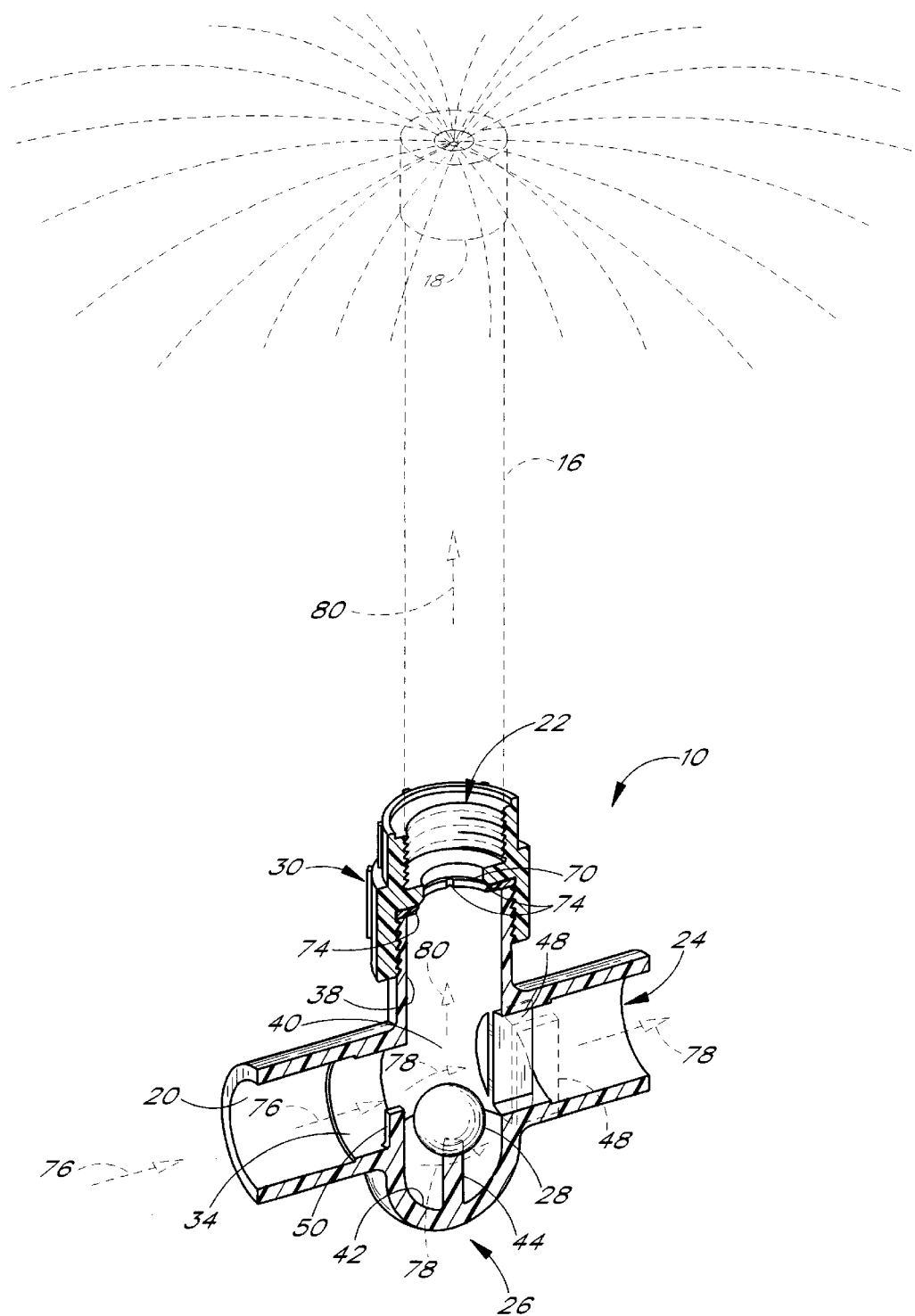
FIG. 8 is a perspective, cross-sectional view of the fluid flow control valve of FIG. 1 operating under normal flow conditions.

In the illustrated embodiment, a valve seat 58 lies between the upper and lower receptacles 54, 56 within the valve cap 30. In this position, the valve seat 58 is located near the first effluent port 22 in the assembled valve 10, as described below. It is possible, however, for the valve seat 58 to lie at other locations within the valve 10. For instance, the valve seat 58 can be arranged to lie at the intersection between primary passage 34 and the branch passage 38, as well as at any intermediate position within the branch passage 38, rather than at the upper end of the branch passage 38 as illustrated in FIG. 8.

As best seen in FIG. 7, the valve seat 58 comprises an annular ridge 60 interposed between the upper receptacle 56 and the lower receptacle 54. The ridge 60 includes an annular inner face 62. The inner face 62 defines a valve throat 64 between the upper and lower receptacles 54, 56.

The valve throat 64 has a smaller diameter than the stopper 28. In the assembled valve 10, the valve throat 64 defines in part the first effluent port 32 of the fitting 26.

The ridge 60 desirably comprises a chamfer or facet 66 on the inlet side of the valve throat 64 that forms a beveled transitions between the inner face 62 and a lower face 68 of the ridge 60.

As best understood from FIGS. 2 and 7 together, the valve seat 58 also includes a gasket 70 that is interposed between the upper end 32 of the fitting 26 and the cap 30. The gasket 70 seats flush against the lower face 68 of the ridge 60 within the assembled valve 10.

The gasket 70 desirably has an annular configuration with an outer diameter larger than the diameter of the branch passage 38 and smaller than an inner diameter of the cap's lower receptacle 54. In this manner, the peripheral edge of the gasket 70 is captured between the upper end 32 of the fitting 26 and the lower face 68 of the ridge 60 to secure the gasket 70 in this interposed position.

The inner diameter of the gasket 70 desirably is larger than the diameter of the valve throat 64 and smaller than a diameter of an annular ridge 72 (FIG. 7) defined at the intersection between the chamfer 66 and the lower face 68 of the ridge 60. In this manner, the inner periphery of the gasket 70 is sized to extend at least partially below the facet 66 of the valve seat 58.

The gasket 70 advantageously is made of a resilient material capable of elastically deforming around a portion of the stopper's surface. Appropriate materials for the gasket 70 include rubber and polyethylene, such as are typically used for washers in plumbing and irrigation pipe sealing applications.

The valve 10 also desirably comprises at least one telltale port located at or near the first effluent port 22 for allowing a small stream of fluid to pass through the effluent port 22 when the valve 10 is closed during abnormal flow conditions. In the illustrated embodiment, as best seen in FIG. 2, the valve 10 includes a plurality of telltale ports which take the form of slots or notches 74 formed along the inner periphery 60 of the gasket 70. Each notch 74 exposes a portion of the facet 66. The notches 74 are evenly disposed about the inner periphery of the gasket 74, being spaced apart by 90° in the illustrated embodiment; however, the notches can be spaced apart at other intervals. For instance, twelve notches can be spaced apart by 30°, or eight notches can be spaced a part by 45°.

The telltale port can also take other forms. For instance, the telltale port can comprise an auxiliary passage which extends either through or adjacent to the first effluent port 22, independent of the valve throat 64. In this arrangement, the auxiliary passage would communicate with the branch passage 38 at a location not sealed by the stopper 28 under abnormal flow conditions.

As understood from FIG. 2, the stopper 28 in the illustrated embodiment is a free-floating spherically-shaped ball; however, other shapes and degrees of freedom of the stopper are also possible. For instance, the stopper can be valve plate which moves along a defined travel path between a normally open position—with the stopper supported within the cavity 40—and a closed position seated against the valve seat 58.

In the illustrated embodiment, the stopper 28 has a diameter larger than that of the valve throat 64, but sufficiently smaller than the cavity 40, and particularly smaller than the diameter of the branch passage 38, so as to move freely into and through the branch passage 38. More particularly, the stopper 28 is sized so as to freely move from its illustrated position on top the post 44 to a position seated against the valve seat 58 (see FIG. 10) in response to abnormal flow conditions.

The stopper 28 desirably is sufficiently heavy to counteract any lifting forces inherent within the turbulent flow through the cavity 40 under normal operating conditions, but sufficiently light to be seated by a resultant pressure differential occurring on opposite sides of the stopper 28 under abnormal flow conditions, as described below.

The stopper 28 desirably is made of glass and takes a form similar to a marble. For normal operating water pressures within the range from about 5 pounds per square inch (psi) ($34.5 \times 10^3$ Pa) to 90 psi ($620.6 \times 10^3$ Pa), glass has a suitable density to meet the weight and size requirements discussed above. Glass also resists algae growth and does not rust, which are particularly advantageous characteristics for use in irrigation applications. Other materials also are possible, however. For example, but without limitation, the stopper 28 can be made of rubber or steel. These materials, however, are less preferable because rubber deforms under pressure, and steel, under high-pressure operating conditions, can crack the cap 28 when the stopper 28 seats against the valve seat due to its high density of steel.

FIG. 8 illustrates the stopper 28 within the assembled valve 10. The stopper 28 is placed in the fitting 20 within the cavity 40, and is retained by the post 44, the extension 50, the vanes 48 and the valve seat 58. The gasket 70 is placed within the cap 30 against the lower face 68 of the annular ridge 60, and the cap 30 is threaded over the upper end 32 of the fitting 26.

The stopper 28 can be arranged within the valve 10 to operate at a variety of locations within the valve housing, however. For instance, the stopper can operate within a space defined between the primary and branch passages (as illustrated in FIG. 6, for example) or can operate entirely within the primary passage (as would be the case if the valve seat were positioned at the intersection between the primary passage and the branch passage). The illustrated arrangement of stopper and valve seat within the valve housing therefore is merely exemplary.

The valve's passages and ports can of course be configured in a variety of sizes and shapes in order to suit various sized and shaped pipes with which the valve is used. An exemplary one-inch fitting is provided below.

In the exemplary embodiment, the branch passage 38 has an inner diameter of 1.0 inch (2.54 cm) and the valve throat 64 has a diameter of 0.625 inch (1.59 cm). The stopper 28 desirably has a diameter of about 0.75 inch (1.91 cm). Other exemplary dimensions for the one-inch fluid flow control valve 10 include inner diameters of 1.0 inch (2.54 cm) for the primary passage 34, the branch passage 38, and the hemispherical recess 42 (i.e., the recess has a radius of 0.5 inch (1.27 cm)).

The extension 50 extends a height of 0.34 inch (0.86 cm) from the floor 46 of the primary passage 34, leaving 0.66 inch (1.68 cm) clear, which is insufficient for the stopper 28 (0.75 inch) to escape. A length (in the direction of the primary axis $P_A$) and a width of 0.15 inch (0.38 cm) provides sufficient strength to allow the extension 50 to perform its intended function. The vanes 48 extend vertically across the primary passage 38, and are symmetrically spaced about 0.2 inch (0.51 cm) to either side of a vertical center-plane that bisects the primary passage 34. The vanes 48 in this position lie 0.4 inch (1.02 cm) apart from each other. The vanes desirably have a thickness of about 0.1 inch (0.25 cm) and a length along the primary passage 34 of about 0.5 inch (1.27 cm). Such dimensions and arrangement within the primary passage 34 aid in preventing the stopper 28 from escaping through the second effluent port 24, while providing a flow straightening effect to the flow downstream of the recess 42 and consequently increasing the head downstream of the valve 10.

The post 44 in the illustrated embodiment extends upwardly to a height of about 0.66 inch (1.68 cm) from the floor of the recess 42, and terminates approximately 0.19 inch (0.48 cm) below the bottom surface 46 of the primary passage 34. When the stopper 28 rests on the post 44 (see FIG. 6), it extends just over half way into the primary passage 34, leaving a clearance of about 0.45 inch (1.14 cm) between the stopper 28 and the intersection between the primary passage 34 and the branch passage 38.

It will be understood that the above-noted dimensions are merely exemplary. The dimensions each depend upon one another, upon the density and shape of the stopper, the desired normal flow conditions, and the predetermined flow rate through the branch passage at which the valve is to close. It is understood that one of skill in the art can readily vary the dimensions to adapt the valve for a particular application through routine experimentation, in view of the disclosure herein.

The operation of the control valve 10 will now be described in detail.

With reference again to FIG. 8, the control valve 10 is illustrated in cross-section during normal flow conditions with the stopper 28 in a first position. The valve 10 is arranged within the irrigation system such that water flows through the primary passage 34 from the influent port 20 to the second effluent port 24. The straightening vanes 48 are positioned downstream of the branch passage 38 and the extension 50 is arranged upstream of the branch passage 38.

Water flows from the upstream irrigation pipe 12 into the influent port 20 and primary passage 34 of the valve 10, as schematically indicated by the in-flowing arrow 76 shown in FIG. 8. A portion of this water flow (schematically illustrated by arrows 78) flows through the primary passage 34 past the branch passage 38, through the downstream side of the primary passage 34, and out the second effluent port 24 into the downstream irrigation pipe 14 for delivery to a subsequent valve or fitting. The balance of the water flow through the valve 10, as schematically illustrated by flow directional arrows 80, flows upwardly into the branch passage 38 to the first effluent port 22 and thence to the riser 16 (shown in phantom).

As illustrated in FIG. 8, water flowing into the branch passage 38 is relatively unrestricted by the extension 50, which is situated on the opposite side of the primary passage 34 from the branch passage 38. The flow split created by the intersection between the passages 34, 38 tends to create turbulence, which has an adverse effect on the head downstream of the second effluent port 24. The straightening vanes 48, however, tend to smooth the turbulence within the water flow downstream of the intersection to improve head downstream of the valve 10.

During normal operation, water flow through the branch passage 38 into the riser 16 is restricted by the sprinkler head 17. Accordingly, the rate of flow through the branch passage 38 is relatively low. For example, flow rate through a typical sprinkler head is between about 5 gallons/minute (18.9 liters/minute) and 25 gallons/minute (94.6 liters/minute).

A portion of the water passing through the cavity 40 flows over the upper surface of the stopper 28 closest to the branch passage 38; i.e., over the surface area of the spherical stopper 28 above the stopper's midsection. Under normal flow conditions, at least some water also flows over the opposite surface, furthest from the branch passage 38 (below the stopper 28 for the illustrated orientation). The post 44 spaces the stopper 28 from the surface of the recess 42 so as to allow flow below the stopper 28. Water below the stopper 28 flows around the extension 50 and the post 44, which present minimal resistance to flow while maintaining the stopper 28 in the desired position. The stopper 28 in this position is desirably offset downward from the central flow axis $P_A$ of the primary passage 34. In an exemplary embodiment, the stopper 28 normally lies about no more than 1.5 inches (3.81 cm) from the central axis. The stopper 28 advantageously is arranged relative to the recess 42 such that most of the water passing through the primary passage 34 flows over the stopper while a significant portion flows beneath the stopper 28. Thus, under normal flow conditions, water flows both under the stopper 28 and over the stopper 28.

Several forces act upon the stopper 28 when positioned within the water flow through the cavity 40. In particular, different flow rates above and below the stopper 28 cause a pressure differential which exerts a force upon the stopper 28. Flow characteristics within the recess 42 (e.g., eddies) also vary the pressure below the stopper 28. Gravity exerts a downward force upon the stopper 22, the magnitude of which depends upon the dimensions and density of the stopper 28. And buoyancy caused by the displacement of water exerts some degree of upward force upon the stopper 28, depending upon the dimensions or volume of the stopper 28. All of these forces influence the movement of the free-floating stopper 28, at least to some degree, within the cavity 40.

Under normal flow conditions, the forces desirably result in an overall downward force to bias the stopper 28 toward the post 44 and to prevent the stopper 28 from rising into the branch passage 38. As the flow rates are all determined by the chosen dimensions for the passages 34, 38, etc. of the valve 10, the density of the stopper 28 must be chosen such that the force of gravity at least balances against the other forces and the stopper 28 does not rise to or chatter against the valve seat 58 during normal flow. Additionally, minor fluctuations in flow rate such as may be expected during normal flow also can be overcome by the force of gravity to prevent premature closure of the valve 10 or chattering of the valve stopper 28.

A stopper made of too dense a material, however, can remain stationary (i.e., seated on the post 44) even during abnormal flow conditions within a low-pressure system, or the stopper can damage to the interior structures of the fitting 26. A glass stopper, as noted above, provides a sufficient weight to properly function within systems having line pressures ranging between 5 psi (34.5×10$^3$ Pa) and 90 psi (620.6×10$^3$ Pa).

Where the rate of flow above the stopper 28 exceeds that below the stopper 28, a low pressure zone is created above the stopper 28, which tends to create an upward force acting upon the stopper 28. Any such upward force during normal flow conditions is overcompensated by the force of gravity upon the stopper 28, such that the stopper 28 tends to remain within the cavity 40 below the valve seat 58. As flow below the stopper 28 tends to counter upward forces on the stopper 28 created by the flow above the stopper 28, any amount of flow below the stopper 28 is advantageous in preventing the stopper 28 from prematurely rising to block the branch passage 38 during normal flow conditions. Desirably, however, during normal operation the rate of water flow above the stopper 28 does not substantially exceed the rate of flow below the stopper 28, to ensure a stronger tendency for the stopper 28 to remain within the primary passage 34 and seated above the post 44.

Figure 9:
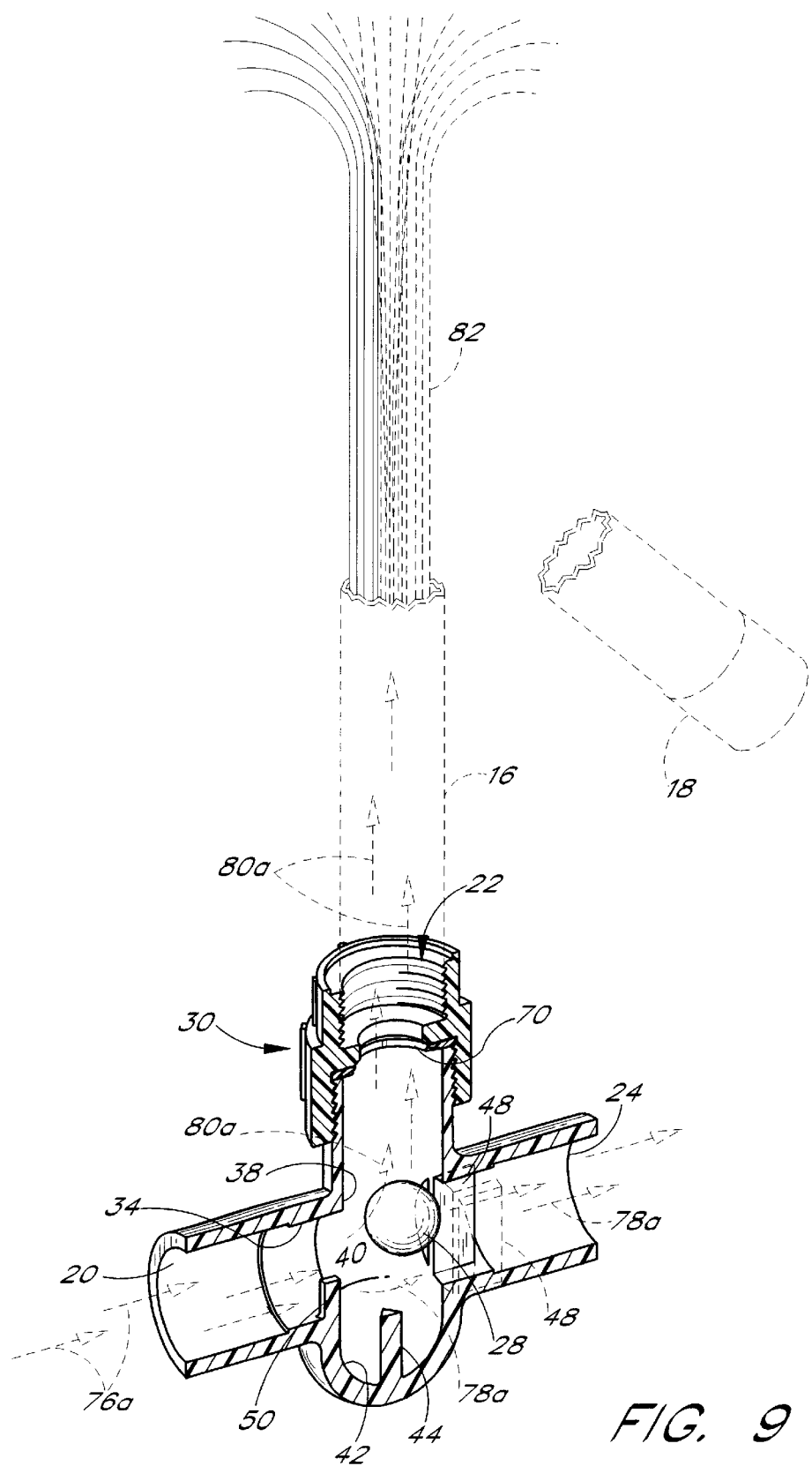
FIG. 9 is a perspective, cross-sectional view of the fluid flow control valve of FIG. 8 immediately after the riser is broken with water flowing through the fluid flow control valve under abnormal flow conditions.

With reference to FIG. 9, abnormal flow conditions are shown where the rate of flow through the branch passage 38 exceeds a predetermined rate. The predetermined rate is chosen to be between the rate of flow during normal operation, and the rate of flow under a fault condition. The control valve 10 is illustrated in FIG. 9 shortly after the riser 16 has been broken, such that the sprinkler head 18 no longer restricts water flow through the riser 16. As illustrated, a large stream of water 82 initially rushes through the branch passage 38 and out the broken riser 16. For example, water flow through a broken riser in an irrigation system normally of a head of 40 psi (275.8×10$^3$ Pa) to 60 psi (413.7×10$^3$ Pa), with a diameter of 1.0 inch (2.54 cm), typically ranges between about 20 gallons/minute and 60 gallons/minute. The dimensions and materials are thereby chosen to close the valve 10 when water flow through the branch passage 38 exceeds about 10 gallons/minute, a rate between that of normal operation and that of the broken riser 16.

The increased stream of water through the branch passage 38 after the riser 16 has been broken facilitates in moving the stopper 28 toward the valve seat 58. One or more of the following factors may contribute to or account for the stopper's movement toward the valve seat 58. As noted above, water flows both above and below the stopper 28 under normal flow conditions (FIG. 8). The stopper 28 is thus already positioned within the water flow under normal flow conditions. During abnormal flow conditions, such as created by the broken riser 16 shown in FIG. 9, the rate of water flow above the stopper 28 (schematically represented by flow directional arrows 80a in FIG. 9) increases when the riser 16 breaks, relative to the rate of flow under the stopper 28 (schematically illustrated by flow directional arrows 78a). The increased rate of fluid flow above the stopper 28 creates a fluid pressure differential above and below the stopper 28. The relatively higher fluid pressure in the fluid below the stopper 28 exerts an upward force on the stopper 22. The size and density of the stopper 28, the dimensions of the fitting 26 and cap 30, and the relative position of the stopper 28 within the fluid flow are all chosen such that the upward force is sufficiently strong to overcome the countering force of gravity, thereby lifting the stopper 28, only under the selected abnormal flow conditions. Friction, momentum and/or drag on the stopper 28 may also contribute to the stopper's movement toward the valve seat 58.

The straightening vanes 48 prevent the stopper 28 from travelling out through the second effluent port 24 as the stopper 24 rises.

Figure 10:
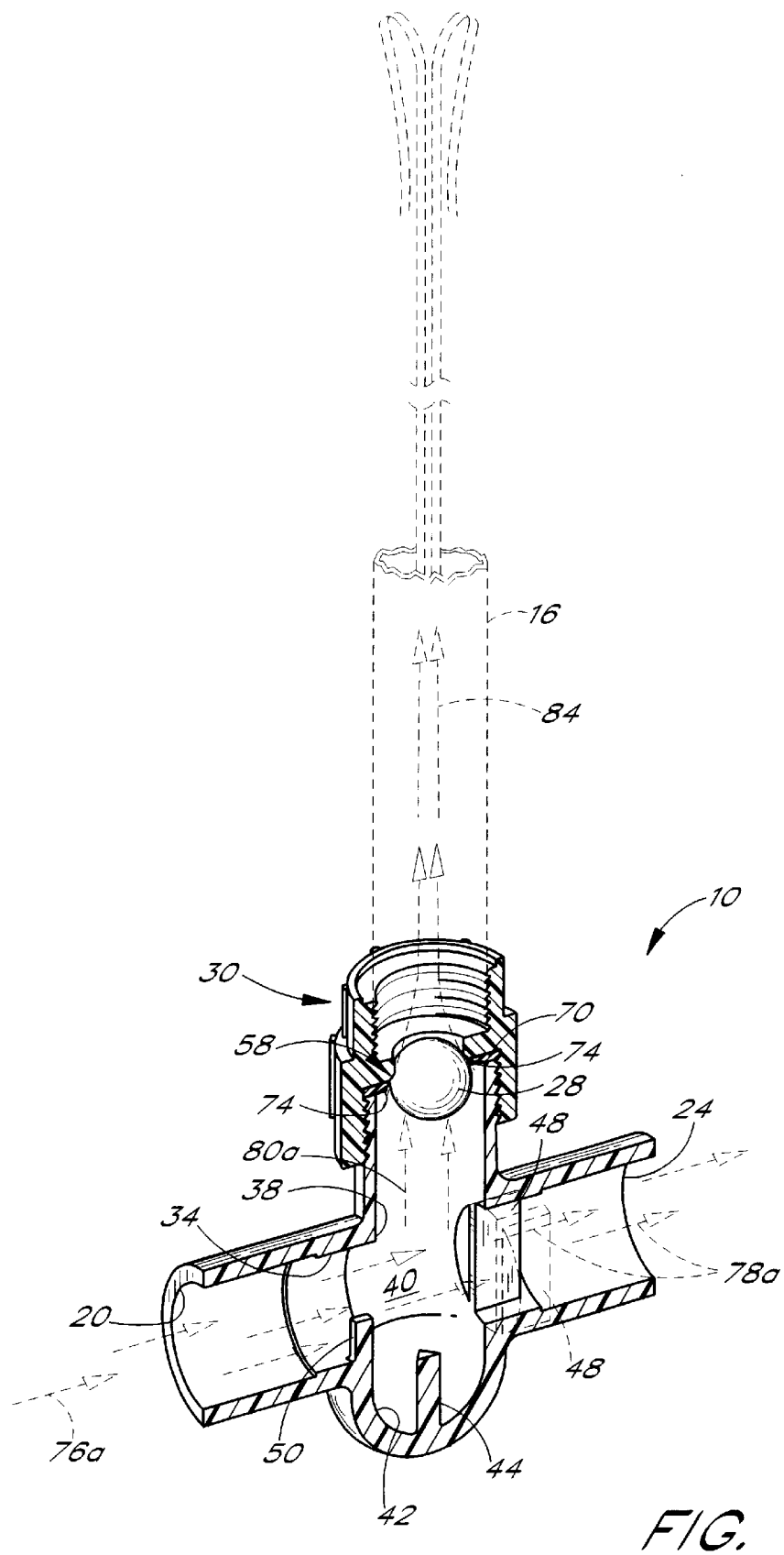
FIG. 10 is a perspective, cross-sectional view of the fluid flow control valve of FIG. 9 in a closed position.

With reference to FIG. 10, the control valve 10 is shown in the closed position under abnormal flow conditions, with the stopper 28 in a second position. Once flow through the branch passage 38 exceed the predetermined rate, the stopper 28 rises until it is entrained within the flow through the branch passage 38. The flow carries the stopper 28 and forces it to seat against the valve seat 58 of the cap 30. More particularly, the stopper 28 seats directly against a portion of the gasket 70 which projects below the facet 66 of the valve seat 58. The stopper 28 engages with the gasket 70 to at least substantially close off water flow to the riser 16. The stopper 28 tends to contact the gasket 70 about a section just below the edge intersection 72 on the annular ridge 60.

The deformable gasket 70 serves to both cushion impact from the stopper 28, preventing cracking or other damage to the cap 30, as well as to aid in substantially sealing the first effluent port 22. Water continues to flow through the primary passage 34, allowing water to continue to flow unobstructed to unbroken risers within the irrigation system, while fluid pressure within the branch passage 38 maintains the stopper 28 in its closed position, seated against the valve seat 58.

The movement of the stopper 28 between the first position (FIG. 8), under normal flow conditions, and the second position (FIG. 10), under abnormal flow conditions, defines a stopper axis which extends through opposite sides of the stopper 28. Note that, in the first position, water flows over both opposite sides (e.g., the upper and lower sides of the stopper 28). When abnormal flow conditions arise, the stopper 28 reliably rises to the valve seat 58 and inhibits fluid flow through the branch passage 38.

A telltale stream of fluid 84 desirably is allowed to bypass the stopper 28 while the stopper 28 is seated against the valve seat 58. In the illustrated embodiment, fluid escapes through the notches 74 of the gasket 70 which function as telltale ports in the illustrated embodiment. As the notches 74 are aligned with the facet 66 and extend outwardly beyond the intersection edge 72, the notches 74 form openings between the stopper 28 and the valve seat 58 to allow a small amount of water flow around the stopper 28, through the valve throat 64 and up through the broken riser 16.

Due to fluid pressure within the branch passage 38 and the small size of the telltale ports 74, a small volume of water escapes with high velocity, such that the telltale stream 84 produces a thin fountain of water that reaches considerable height. The telltale stream 84 is small enough to prevent flooding or erosion, yet large enough to serve as a visible indication that the flow control valve 10 has been tripped (i.e., closed). Other than the telltale stream 84, the first effluent port 22 remains substantially sealed under abnormal flow conditions. "Substantially sealed," refers to a condition in which the telltale stream 84, along with any other leakage at the first effluent port 22, flows at a rate less than about 30% of a restricted flow through the broken riser (such as represented by the large stream 82 of FIG. 9). The telltale stream 84 should flow at less than about 10% of a restricted flow, desirably between about 0.1% and 5%, and particularly between about 1% and 3% of a restricted flow. The telltale stream 84 may thus alert an irrigation technician to the existence of a broken riser, and the riser may be replaced or repaired.

The illustrated control valve 10 thus serves to arrest fluid flow through a branch passage 38 under abnormal flow conditions. Under normal flow conditions, fluid flows both above and below the stopper 28, minimizing the risk of over-sensitivity of the valve 10 to minor flow rate fluctuations, as well as improving the reliability of the valve when used in systems operating under various head (e.g., 5 psi (34.5×10³ Pa) to 90 psi (620.6×10³ Pa)).

Having described the above-noted aspects, features and advantages in the context of a preferred embodiment, it will be understood that many modifications and variations thereto are possible, all of which fall within the true spirit and scope of the invention. Thus, broadly speaking, the present fluid flow control valve comprises a housing that defines at least first and second conduits. The first and second conduits intersect within the housing. A seat is located at least partially within the second conduit, and a moving stopper selectively cooperates with the seat to at least substantially close the second conduit. The stopper is movable between a first position, where the stopper lies at least partially within the first conduit, and a second position where the stopper seats against the seat. The movement of the stopper between the first and second positions defines an axis which extends through opposite sides of the stopper. The stopper is arranged within the first conduit when in the first position such that fluid flows over opposite sides of the stopper.

Another aspect of the invention, which is apparent from the above-description, is a fluid flow control device that comprises an influent port which opens into a cavity. At least one effluent port also communicates with the cavity. A stopper seat is positioned between the effluent port and the cavity. A stopper operates within the cavity to selectively engage the seat and substantially seal the effluent port. A telltale port communicates with the cavity such that some fluid flows from the cavity through the telltale port with the plug seated against the plug seat.

An additional aspect of the invention involves an irrigation valve for use with a riser of an irrigation system. The valve includes a primary passage extending from a first end of the valve. The first end is intended to receive a portion of an irrigation pipe of the irrigation system. A branch passage extends normal to the primary passage in an upward direction and communicates with the primary passage. The branch passage terminates near an upper receptacle of the valve. The receptacle is intended to receive an end of the riser. A recess is formed on a side of the primary passage opposite the branch passage, with a support projecting from the recess toward the branch passage. A valve seat is located between the upper receptacle and the primary passage, and a movable stopper is located within the primary passage below the valve seat. The support is arranged to maintain the stopper within a water-flow stream through the primary passage and the recess under normal flow conditions. The stopper is movable relative to the primary passage under abnormal flow conditions to a position in which the stopper seats against the valve seat to inhibit water flow through the branch passage.

The present fluid flow control device can also be described as having a primary passage communicating with the secondary passage. A valve seat communicates with the secondary passage, and a movable stopper selectively cooperates with the valve seat to inhibit fluid flow through the secondary passage. At least one vane is positioned downstream of an intersection between the primary and secondary passages. The vane extends across the primary passage and is arranged parallel to a direction of fluid flow through the primary passage. The vane also is configured to provide a flow straightening effect within the fluid passing through the primary passage downstream of the intersection.

FIGS. 11–13 disclose another embodiment of the present fluid flow control valve which includes additional aspects, features and advantages of the invention. In general terms, the control valve includes a housing that defines a first passage extending from a first end. The first end defines an influent port and is intended to receive a portion of an inlet pipe. A second passage extends from and communicates with the first passage. The second passage terminates near a receptacle which is adapted to receive an end of an outlet pipe. A valve seat is located between the receptacle and the first passage. A biasing device is positioned between the valve seat and the influent port and biases a movable stopper which is located within the housing near the valve seat. At least a portion of the biasing device is movable within the housing to permit the stopper to seat against the valve seat under abnormal flow conditions.

With reference now to the specific embodiment illustrated in FIGS. 11–13, a fluid flow control valve 90 has a similar configuration to the valve illustrated in FIGS. 1–10, except for the inclusion of a biasing device 94 and possibly the construction of a stopper 92. The stopper 92, while desirably spherical like the stopper 28 described above, can have different characteristics from the stopper 28 of the previously discussed embodiment, for reasons which will be apparent from the discussion below. The balance of the valve 90, however, is structured in accordance with the above description. Similar features thus are ascribed the same reference numerals used for corresponding elements from the embodiment of FIGS. 1–10 for ease of description.

The biasing device 94 is provided for maintaining the position of the stopper 92 within the fluid flow path under normal flow conditions. In the illustrated embodiment, the biasing device takes the form of a spring retainer comprises of a material which exhibits a degree of flexibility, such as, for example, but without limitation, polyvinylchloride ("PVC").

The illustrated biasing device 94 includes an annular rim 95 which circumscribes a cylindrical wall 96 of the device 94. The outer surface of the wall 96 is desirably sized and shaped to slip fit into the branch passage 38, while the inner surface of the cylindrical wall 96 has a diameter larger than that of the stopper 92. At least one deflectable finger 97 depends from the wall 96, and desirably three or more fingers 97 depend from the wall 96.

The fingers 97 are each angled inwardly at an elbow 98, such that a lower segment 99 projects inwardly from the wall 96 into the cavity 40. This angled configuration is desirably achieved by integrally molding the entire finger 97 in the angled configuration. It will be understood that the angled configuration may be also be achieved by stamping and bending a part, or by gluing or welding finger segments together.

Desirably, the fingers 97 are deflectable with a resilient tendency to return to the illustrated shape. The illustrated fingers 97 thus serve as cantilever springs. It will be understood from the description below of the biasing device function that the biasing device may take other forms, such as, for example, a helical spring, in other arrangements.

In the illustrated embodiment, the biasing device 94 includes three depending fingers 97 which are spaced around the circumference of the wall 96 at 120° from one another. Desirably, each segment 99 terminates at a relatively smooth end 100. The ends 100 define an opening too small to allow the stopper 92 to pass upwardly toward the valve seat 58 during normal operation.

With reference to FIGS. 12 and 13, the valve 90 is shown assembled with the biasing device 94 secured therein. The biasing device 94 is inserted into the branch passage 38 of the fitting 26. The annular rim 95 sits atop the upper end of the fitting 26 to prevent the biasing device 94 from slipping further into the valve cavity 40. In the illustrated embodiment, the gasket 70 is fitted within the cap 30 to engage the lower face 68 of the ridge 60. The cap 30 is then threaded onto the fitting 26, such that the gasket 70 is retained against with the rim 95 of the biasing device 94. The rim 95 and the gasket 70 are thereby secured between the cap 30 and the fitting 26, as illustrated.

FIG. 12 illustrates the valve and the stopper under normal flow conditions. The biasing device 94 engages the stopper 92 and prevents the stopper 92 from rising to the valve seat 58. In particular, the ends 100 of the inwardly bent segments 99 can engage the spherical surface of the illustrated stopper 92.

It will be understood by one of skill in the art, therefore, that the stopper 92 may be less dense than the stopper 28 of the first embodiment, since the biasing device 94 aids gravity in preventing the stopper 92 from rising under normal flow conditions. In the illustrated embodiment, the stopper 92 is insufficiently dense to rest upon the post 44 under normal flow conditions, and is instead buoyed to engage the biasing device 94. The arrangement of the extension 50, the straightening vanes 48 and the walls of the fitting 26 about the cavity 40 ensure that the opening defined by the ends 100 of the fingers 97 provides the only stable position for the stopper 92 under normal flow conditions (both transient and steady-state). The arrangement of these components cause the stopper 92 to generally center between the three fingers of the biasing device 94. The upward forces acting on the stopper 92 under normal flow conditions are insufficient to overcome the spring force of the biasing device and force the fingers 97 open. Accordingly, the illustrated biasing device 94 serves to support the buoyant stopper 92 within the water flow, without allowing the stopper 92 to rise to the valve seat 58.

Thus, as illustrated by the embodiment discussed below, the post 44 may be unnecessary to keep the stopper 92 within the midst of the water flow. In other arrangements, however, the stopper 92 may be more dense and the post 44 would serve to support the stopper 92 under normal flow conditions. The post 44 also functions to initially support the stopper when flow begins through the fitting 26.

FIG. 13 illustrates the valve 90 under abnormal flow conditions, such as those created by a broken riser (see FIGS. 9 and 10) or other fault condition. As discussed above, the low pressure created above the stopper 92 by the surge of fluid through the branch passage 38, increases the upward force exerted upon the stopper 92. This upward force upon the stopper 92 is translated into an outward force upon the segments 99 through interaction of the stopper surface with the finger ends 100. Desirably, the surface of the stopper 92 is spherical, though other configurations may also accomplish the desired translation of upward force to outward force.

The geometry and material of the illustrated depending fingers 97 are chosen such as to permit outward deflection of the fingers 97, such as at the illustrated crease 98, under the force created by the abnormal flow conditions. The stopper 92 is thus permitted to rise to the valve seat 58 and maintained there by water pressure, substantially sealing the effluent port 22.

Desirably, the gasket 70 of this embodiment also includes telltale ports 74 to allow remote detection of a closed valve 90. While illustrated in conjunction with the extension tab 50 and vanes 48, the valve 90 may utilize other arrangements to prevent the stopper 92 from escaping through the influent or effluent ports 20, 24. The recess 42 and post 44 desirably ensure maintenance of the stopper 92 within the normal flow path of fluid.

In contrast to the embodiment of FIGS. 1–10, the valve 90 does not depend upon gravity to prevent the stopper 92 from prematurely shutting down water flow. Selection of a highly buoyant stopper 92 may be compensated by selection of a high spring constant for the particular biasing device 94 to prevent premature valve tripping, as will be understood by one of skill in this art in light of the disclosure herein.

FIGS. 14–19 illustrate a fluid flow control valve 120 in accordance with another preferred embodiment of the present invention. For ease of description, similar features are ascribed the same reference numeral used for corresponding elements from the embodiments of FIGS. 1–13.

The valve 120 comprises a valve cap or housing 122, a keeper or rod 124, a stopper 126 and a cage or basket 128. The top portion 130 of the basket is press fit or otherwise secured (e.g. by epoxy, ultrasonic welding, etc.) within the lower receptacle 134 of the valve cap 122. The bottom portion 132 of the basket supports the stopper 126 generally above the horizontal fluid flow within the fitting 140. The stopper 126 is further held in place by the rod 124 or biasing device, which is positioned within the riser 16 above the stopper 126, which acts as a biasing device. Thus, the stopper 126 is generally contained within the flow. During normal steady-state flow, the location of the stopper 126 does not significantly change, and thus movement by the stopper does not significantly contribute to vibration within the system.

Advantageously, the valve 120 can be integrated into any of a variety of types of junctures. In the embodiment illustrated in FIGS. 14 and 15, the fitting 140 does not include a recess on the opposite side of the branch passage, as in the embodiment illustrated in FIG. 1. In this manner, the valve 120 can be used, for example, with a pre-existing T-junction, elbow junction or corner junction in an irrigation system.

The individual components of the valve 120 will now be described in detail. The valve 120 will be described in terms of the illustrated arrangement within the irrigation system with a water flow in a horizontal direction between an influent port 121 and the second effluent port 125, and a water flow in the vertical direction through the first effluent port 123. It should be noted that the valve 120 of this embodiment is bidirectional and, thus, the labels of "influent" and "effluent" are merely exemplary terms used to aid in the description of the valve. Also, the terms "horizontal" and "vertical," of course, depend on the chosen orientation of the valve 120 and are used here to simplify the description. Likewise, terms of orientation, such as "above", "below", "upper" and "lower", are used in the context of the illustrated embodiment; however, because other orientations are possible, the present invention should not be limited to the illustrated orientation. Thus, terms of orientation, such as "horizontal", "vertical", "above", "below", "upper", "lower", etc., are used herein solely for purposes of illustration as those skilled in the art will appreciate that the valve of the present embodiment, as well as those described below, are not orientation-sensitive, and that other orientations of the valve 120 are possible.

Figure 15:
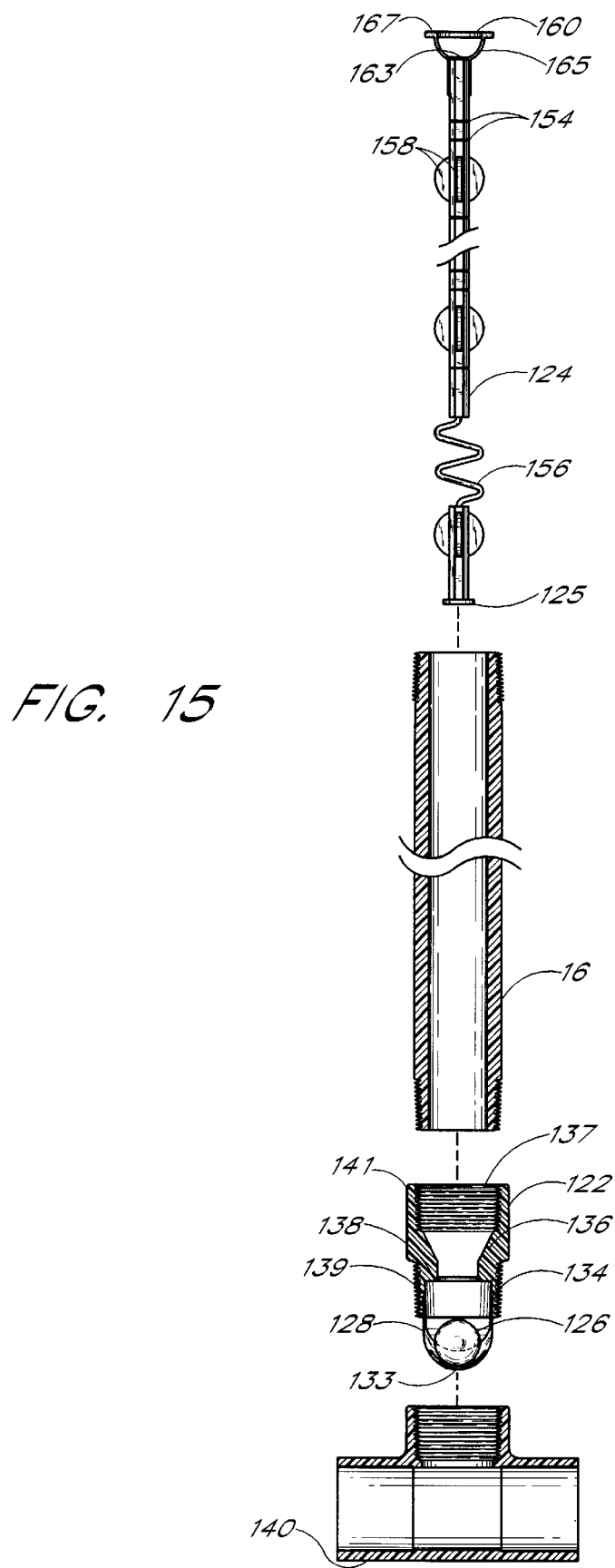
FIG. 15 is an exploded, cross-sectional view of the fluid flow control valve of FIG. 14.

The valve cap 122, which is positioned between the riser 16 and the fitting 140, has an inner and an outer surface. As best seen in FIG. 15, the outer surface of the valve cap 122 defines a first portion 139 sized to cooperate with the internal threads of the upper end of the fitting 140, and a second portion 141 having a larger outer diameter than the outer diameter of the first portion 139. In the illustrated embodiment, the first portion 139 is externally threaded.

Figure 14:
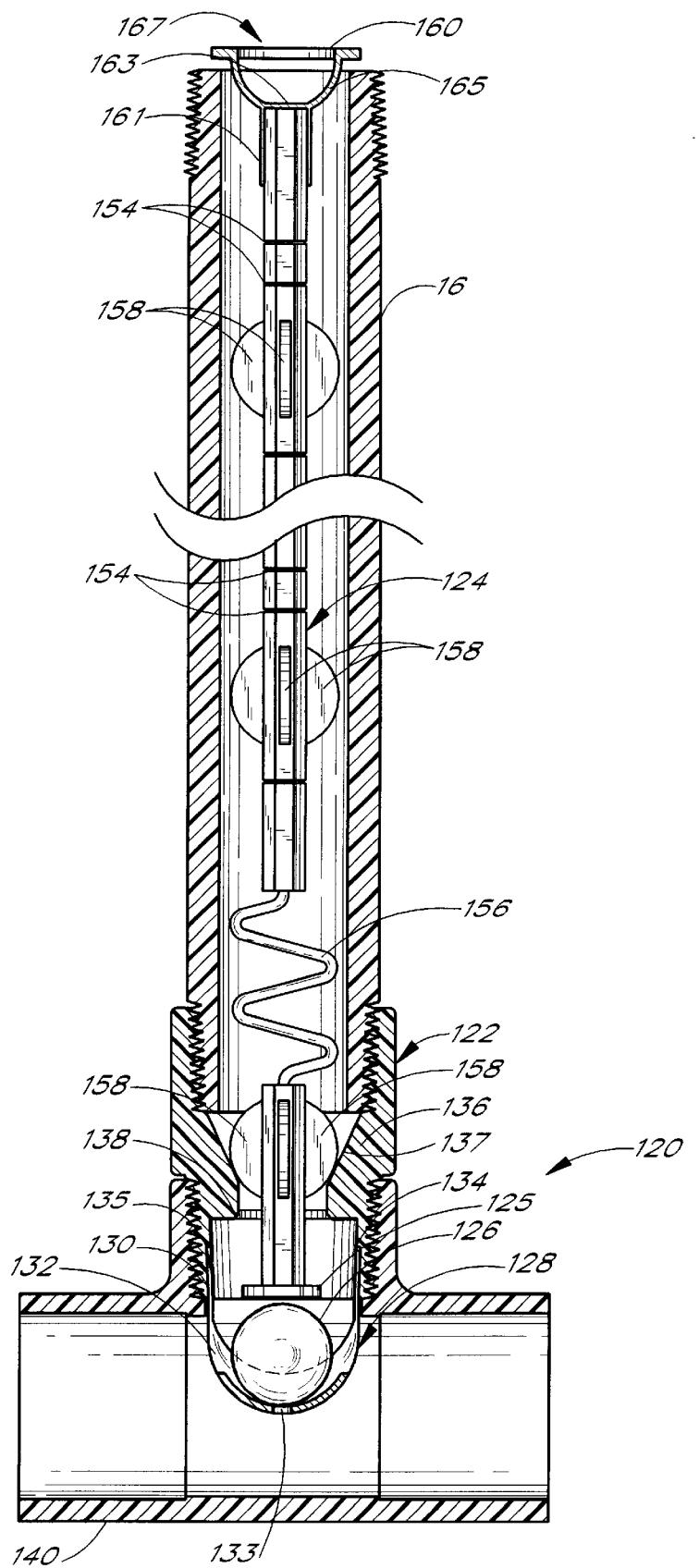
FIG. 14 is a cross-sectional view of a fluid flow control valve in accordance with another preferred embodiment.
Figure 16A:
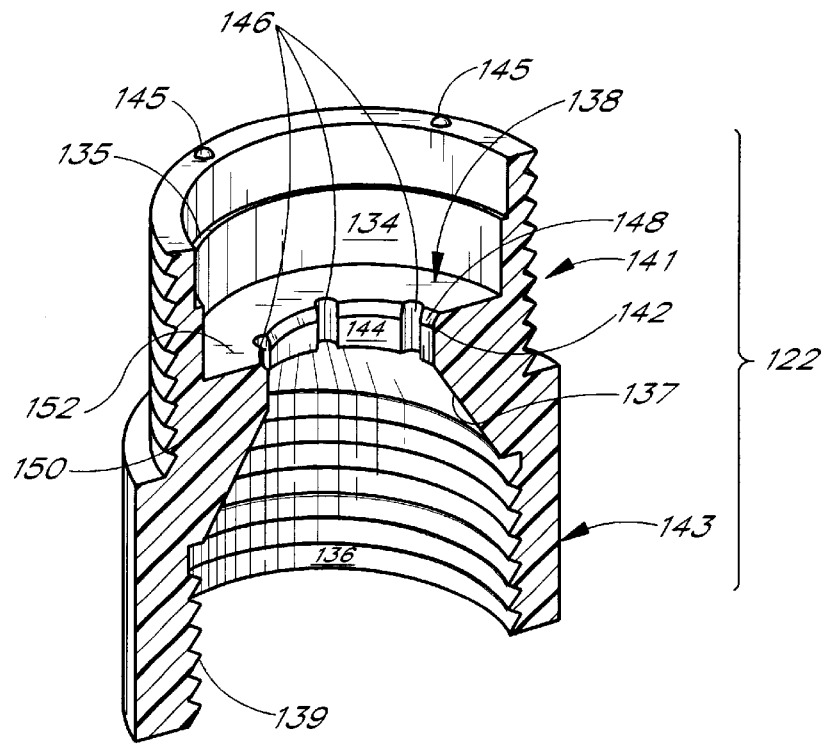
FIG. 16a is a perspective, cross-sectional view of the valve cap of the fluid flow control valve of FIG. 14 shown in an upside-down position relative to the valve cap shown in FIG. 14.

FIG. 16a is a perspective, cross-sectional view of the valve cap 122 shown in an upside-down position relative to the valve cap 122 shown in FIGS. 14 and 15. The inner surface of the valve cap 122 defines a first or lower receptacle 134, a second or upper receptacle 136, and a valve seat 138 between the first and second receptacles 134, 136. An inner shoulder 135 is formed on the inner surface of the valve cap 122 within the first receptacle 134. Otherwise, the diameter of the first receptacle or cavity 134 is generally constant. The inner shoulder 135 is formed by a counterbore of the valve cap 122 which receives the top portion 130 of the basket 128.

The inner surface 137 of the upper receptacle 136 near the valve seat 138 is sloped so that the diameter of the upper receptacle 136 is smallest near the valve seat 138 and increases toward the upper end of the receptacle 136. This sloped inner surface of the upper receptacle 136 generally has a funnel-like shape which aids in positioning the rod 124 within the housing as described below.

In the illustrated embodiment, an upper portion 139 of the second receptacle 136 is internally threaded. The threads are sized to engage the external threads of a corresponding riser 16.

Similar to the valve seat 58 shown in FIG. 7, the valve seat 138 comprises a generally annular ridge 142 interposed between the upper receptacle 136 and the lower receptacle 134 of the valve cap 122. The ridge 142 has an annular inner face which defines a valve throat 144 between the upper and lower receptacles 134, 136.

In a preferred embodiment, the valve seat 138 lies within the first portion 141 of the valve cap 122 at a point spaced from the juncture between the first portion 141 and a second portion 143. Thus, when the valve cap 122 and the fitting 140 are coupled together, the valve seat 138 is positioned within the fitting 140, as shown in FIG. 14. Advantageously, because the valve seat and stopper are within the fitting 140, the valve will continue to function even if the valve cap 122 is severed between the first portion 141 and the second portion 143.

As best seen in FIG. 16a, the valve seat 138 can include one or more slots or notches 146 formed along the inner portion of the ridge 142. The notches 146 form a plurality of telltale ports, similar to the telltale ports described above, which allow remote detection of a closed valve when the riser 16 has been broken. The cross-sectional flow areas of the telltale port is smaller than the cross-sectional flow area through the throat 144 of the valve seat 138. In the illustrated embodiment, a plurality of notches 146 are evenly spaced about the inner periphery of the ridge 142. In other embodiments, the valve seat 138 may include only one notch or may include a plurality of notches spaced at irregular intervals about the inner periphery of the ridge 142.

The ridge 142 further comprises a chamfer or facet 148 on the inlet side of the valve throat 144. The chamfer 148 forms a beveled transition between an inner face 150 and a lower face 152 of the ridge 142.

In a preferred embodiment, the valve cap 122 also includes one or more protrusions 145 (FIG. 16) projecting from the valve cap edge. These protrusions 145 cooperate with a shoulder within the fitting 140. When the valve 122 is attached to the fitting 140, the protrusions 145 depress against an inner surface rim or shoulder of the fitting, thereby creating dimples in the inner surface rim at the protrusion locations. Thus, the protrusions 145 facilitate a tight connection between the valve cap 122 and the fitting 140. This connection prevents the valve cap 122 from unintentionally separating from the fitting 140 when pipes, risers or other fixtures are removed or adjusted.

With reference to FIG. 14, the stopper 126 is positioned below the valve seat 138. Under normal flow conditions, the stopper 126 is positioned a distance away from the valve seat 138. As discussed above, the stopper 126 in the illustrated embodiment is a free-floating spherically-shaped ball. Similar to the embodiment shown in FIGS. 11–13, the stopper 126 may be less dense than the stopper 28 of the embodiment shown in FIGS. 1–10 because the rod 124 aids gravity in preventing the stopper 126 from rising under normal flow conditions including both normal steady-state and transient conditions. For example, in one mode, the specific gravity of the stopper 126 is less than 1.0.

Figure 16B:
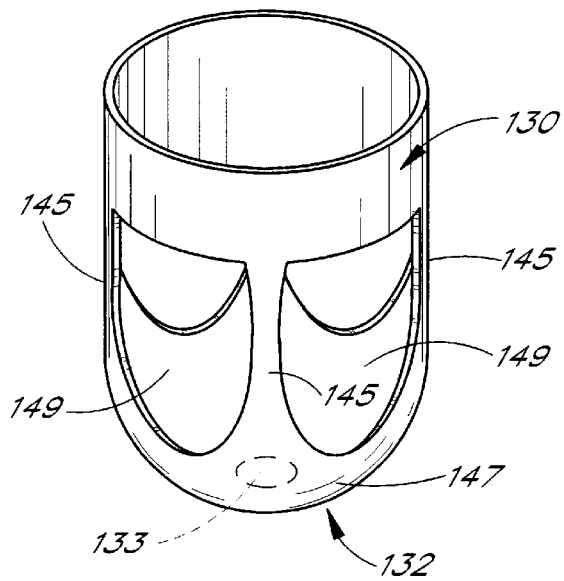
FIG. 16b is a perspective view of the basket of the fluid flow control valve of FIG. 14.

During normal fluid flow, the stopper 126 is supported by the basket 128. As best seen in FIG. 16b, the basket 128 includes an upper portion 130 and a lower portion 132. The upper portion 130 of the basket 128 is configured to cooperate with and is coupled to the first portion 139 of the valve cap 122. In the illustrated embodiment, the upper basket portion 130 is press fit against the inner surface of the valve cap 122 within the lower receptacle 134 of the valve cap. In other embodiments, the upper portion 130 may be held in place by other means, including, but not limited to, ultrasonic welding, adhesives, bonding, friction, threaded engagement, and other known methods of affixation.

In the illustrated embodiment, the upper portion 130 of the basket has an annular shape with an inner and an outer diameter. The outer diameter of the upper portion 130 can be slightly greater than the diameter of the first receptacle 134 of the valve cap 122 so that the upper basket portion 130 can be held by a press fit within the counterbore of the valve cap 122, against the shoulder 135. In other embodiments, the basket 130 can be affixed to the valve cap 122 by other means (such as bonding, friction, ultrasonic welding, etc.), and thus it the outer diameter of the upper basket portion 130 does not have to the larger than the diameter of the first receptacle 134.

The inner diameter of the upper portion 130 of the basket is desirably the same as the diameter of the first receptacle above the shoulder 135. Therefore, when the upper portion 130 of the basket 128 is positioned within the first receptacle 134, there are no appreciable ridges or shoulders between the inner surfaces of the upper portion 130 of the basket and of the first receptacle 134.

In the illustrated embodiment, the upper portion 130 and the lower portion 132 of the basket are integrally formed. The lower portion 132 of the basket 128 includes a bottom support 147 and a plurality of arms 145 between the bottom support 147 and the upper portion 130 of the basket. The arms 145 suspend the bottom support 147 at location spaced apart from the upper portion 130. Between the arms 145 are openings 149 which permit fluid to flow within the basket 128.

In the illustrated embodiment, the bottom support 147 of the basket has a bowl-like shape to generally match the contour of the stopper 126. The bottom support 147 desirably includes a small opening 133 through which fluid can flow. The opening 133 is smaller in size than the stopper 126 so that the stopper cannot pass through the opening 133. For instance, in one embodiment, the diameter of the opening 133 is approximately 0.125 inch (0.31 cm). The opening 133 allows fluid to flow within the basket 128 around the stopper 126. Fluid flow through the basket 128 serves to spin or flush the stopper 126 to prevent build up under the stopper 126 of sediment and debris from the sprinkler system.

In other embodiments, the basket 132 may be configured to provide for fluid flow within the basket in other ways, such as by a post (not shown) extending in the vertical direction from the bottom of the basket. Such a post could be similar to the post 44 shown in FIGS. 2–6, and would support the stopper 126 within the basket.

As best seen in FIG. 14, the lower portion 132 of the basket 128 and most of the stopper 126 are positioned within the primary passage 34 during normal flow conditions (FIG. 14). Placement of the basket 128 within the primary passage 34 minimizes head loss to the sprinkler 162 by acting to divert a portion of the main flow through the basket openings 149.

Figure 20:
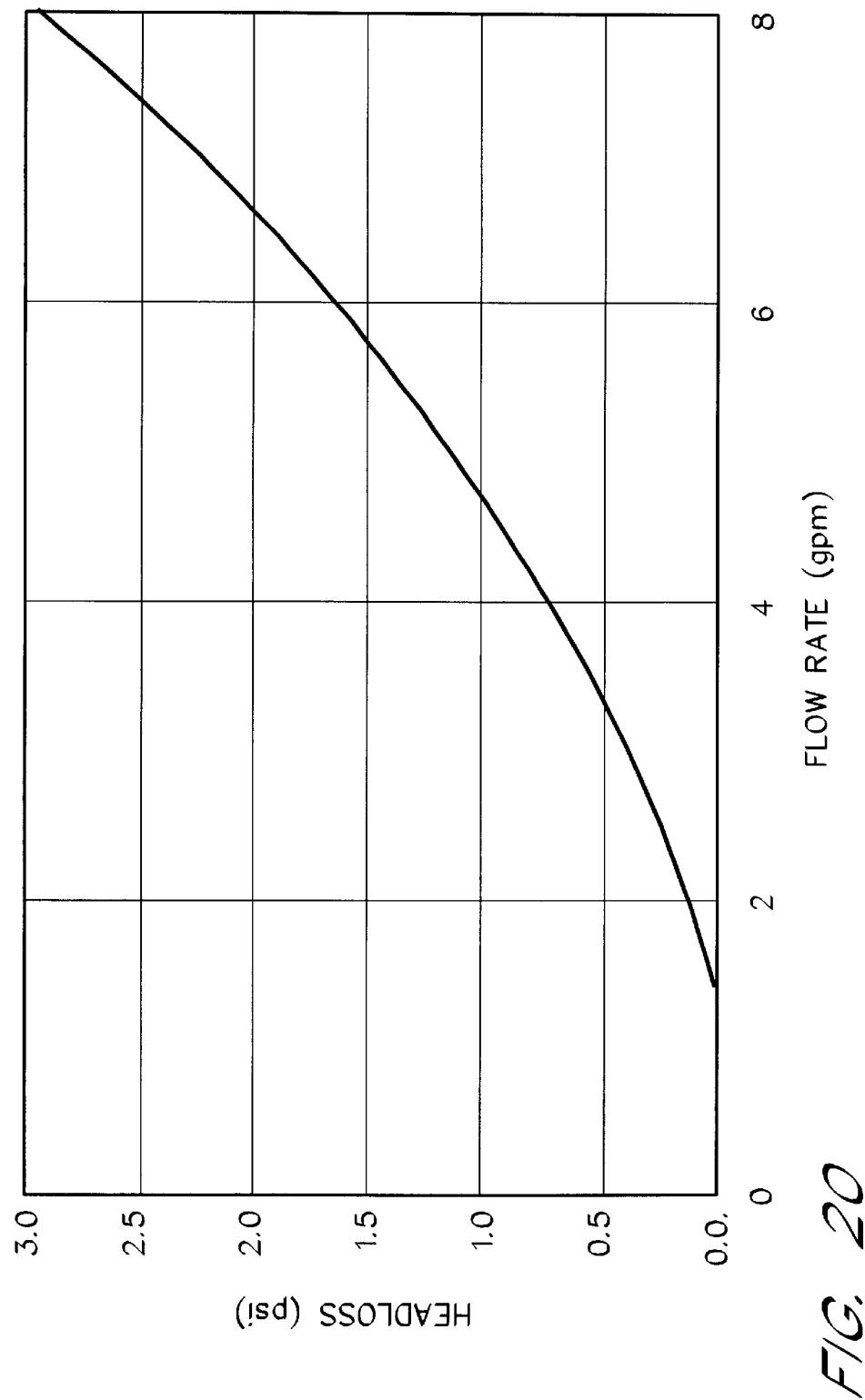
FIG. 20 is a graph illustrating head loss versus flow rate through a flow control valve configured in accordance with the embodiment shown in FIG. 14.
Figure 21:
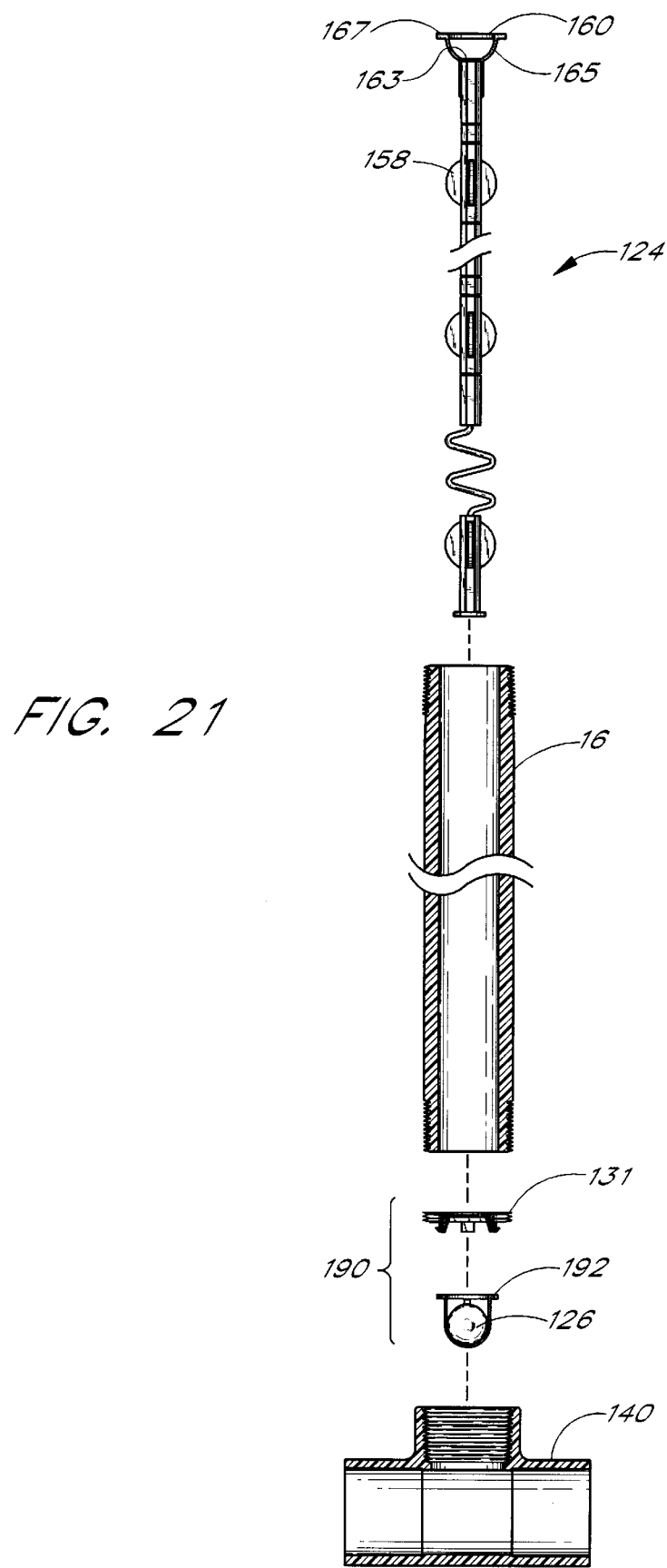
FIG. 21 is an exploded, cross-sectional view of a fluid flow control valve in accordance with another preferred embodiment.

FIG. 20 depicts a graph illustrating the amount of head loss versus flow rate through a flow control valve configured in accordance with the embodiment shown in FIG. 14. This data was obtained empirically using a flow control valve with a 12 inch (30.48 cm) riser having a width of 0.75 inch (1.91 cm). At a fluid pressure of 40 psi ($275.8 \times 10^3$ Pa), the head loss through the valve was determined at various flow rates between 1 gallon/minute (gpm) (3.8 liters/minute) and 8 gpm (30.3 liters/minute). As illustrated in FIG. 20, for flow rates between 1 gpm (3.8 liters/minute) and 6 gpm (22.7 liters/minute), the head loss through the valve was less than 2.0 psi ($13.8 \times 10^3$ Pa). The head loss of the described flow control valve is thus almost negligible, in that a head loss of less than 5 psi ($34.5 \times 10^3$ Pa) is generally acceptable within the industry for flow rates of 1 gpm (3.8 liters/minute) and 8 gpm (30.3 liters/minute).

With reference to FIGS. 14, 17 and 18a–b, the rod 124 is principally positioned within the riser 16 directly above the stopper 126. The rod 124 includes a disc-shaped foot 125 at the lower end of the rod 124. The foot 125 is positioned generally normal to the longitudinal axis of the rod 124 and has a diameter less than the diameter of the valve throat 144. During normal fluid flow, the disc foot 125 of the rod 124 is generally in contact with the stopper 126 to prevent the stopper 126 from prematurely seating against the valve seat 138. A portion of the rod 124 extends through the valve cap 122, including the valve throat 144 and the upper and lower receptacles 134, 136.

Figure 17:
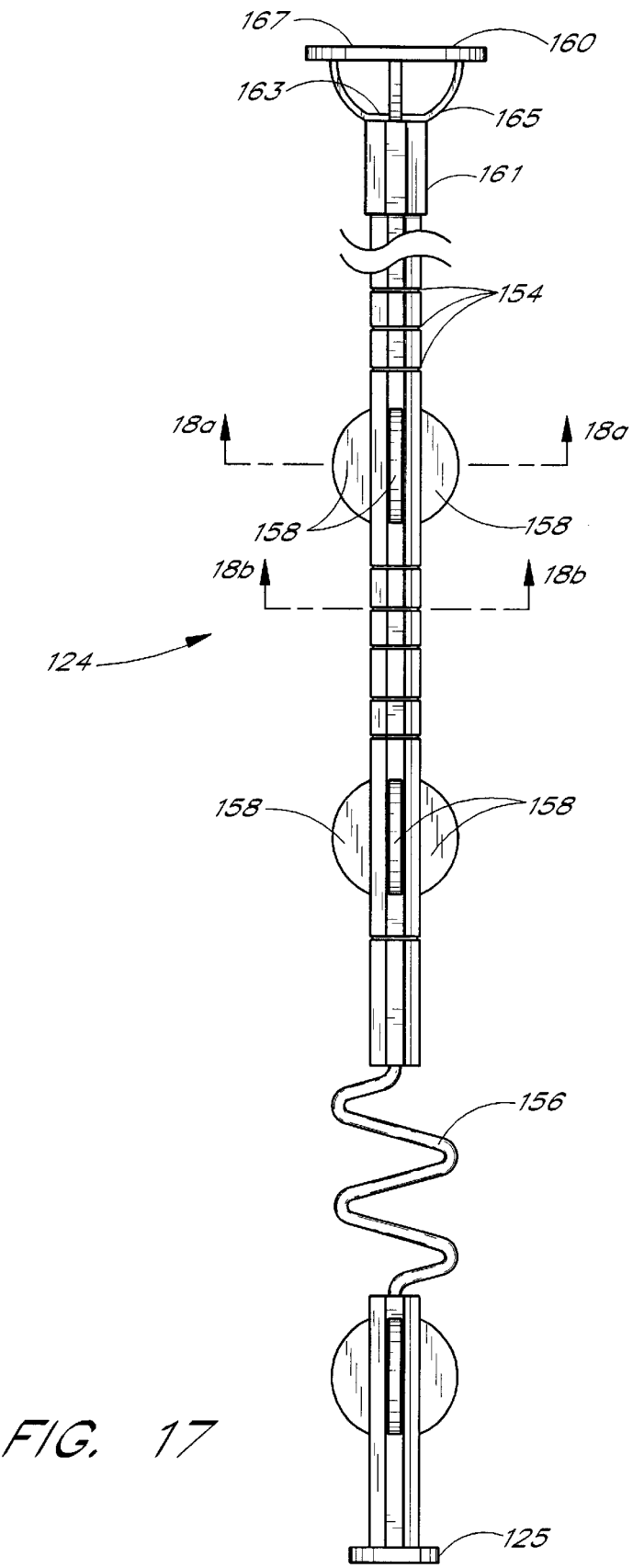
FIG. 17 is an elevational view of the rod of the fluid flow control valve of FIG. 14.
Figure 18A:
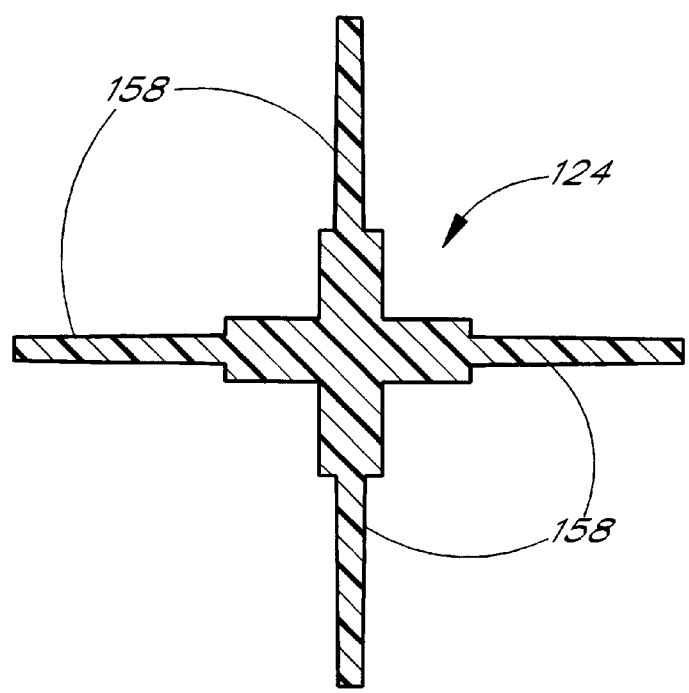
FIG. 18a is a cross-sectional view of the rod of FIG. 17 taken along line 18a—18a of FIG. 17.
Figure 18B:
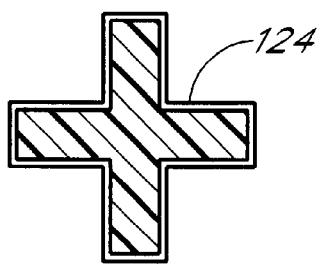
FIG. 18b is a cross-sectional view of the rod of FIG. 17 taken along line 18b—18b of FIG. 17.

The rod 124 desirably can be sized to fit within risers of varying lengths or within an assembled length of risers. While the initial length of the rod 124 may vary, the length of the rod 124 can also be easily sized to fit within a shorter-length riser 16. As illustrated in FIGS. 17 and 18b, the rod 124 desirably has one or more grooves 154 spaced apart longitudinally along the rod 124. The grooves 154 divide the rod 124 into one or more sections. In one mode, each groove 154 is 0.004 inch (1 mm) wide and 0.004 inch (1 mm) deep.

By applying a shearing stress to one of the grooves 154 on the rod, the extra length portion of the rod 124 can be easily snapped off to shorten the rod 124 to the desired length. For example, a 12 inch (30.5 cm) rod can be easily sized to fit within an 8 inch (20.32 cm) riser by measuring an 8 inch section of the rod and applying pressure to the nearest groove which would allow an approximately 4 inch (10.16 cm) section of the rod to be broken off, resulting in a rod equal to or slightly larger than the desired length.

On the other hand, if the riser 16 is greater 12 inches, one or more rods 124 may be stacked longitudinally to fit with a riser 16 or riser assembly. The rods may also be coupled or linked together within the riser or riser assembly, such as by a sleeve or other suitable coupling mechanism.

As best illustrated in FIG. 18b, which shows a cross-sectional view of the rod 124 taken along line 18b—18b of FIG. 17, the rod in the illustrated embodiment has a cross-sectional shape like a plus sign symbol (+). Other cross-sectional shapes of the rod are also possible, such as, but not limited to, circular.

The size of the rod cross-section is smaller than the inner diameter of the riser or fluid delivery section to permit the rod to fit within the riser 16. Desirably, the cross-sectional size of the rod is sufficiently small relative to the inner diameter of the riser so that fluid can flow easily over the rod 124 through the riser 16.

The rod 124 desirably further includes a compression spring 156 and a plurality of fins 158 that extend outward from the center of the rod. In one mode, the rod 124 is a single molded piece, including the spring 156 and fins 158. In other modes, however, the rod 124 may comprise multiple pieces fused, welded or interconnected together.

In the illustrated embodiment, the spring 156 is located on the lower portion of the rod 124. The spring 156 compensates for manufacturing tolerances of the length of the rod 124 and for tolerance stack-up within the sprinkler head-riser-valve assembly. For instance, when attaching the sprinkler head to the riser, the sprinkler head may be screwed onto the riser using all or only a portion of the sprinkler or riser threads. In addition, when stacking a plurality of rods 124 within a riser assembly, any inaccuracies in the length of the rods or in the assembly are compounded. The spring 156 can be compressed, if necessary, to absorb tolerance stack-up within the assembly. In this manner, the length of the rod 124 can be varied to compensate for inaccuracies in the effective length between the bottom of the sprinkler head and the stopper.

A plurality of fins 158 extend from the rod 124 at various locations along the length of the rod 124, except at the location of the spring 156. In one embodiment, each fin 158 is semi-circular in shape; however, the fins 158 may be shaped in other ways as well (e.g. rectangular). In addition, the fins 158 provide a flow straightening effect through the riser 16. The fins 158 desirably present a thin profile to the fluid flow, but have a sufficient length to straighten, at least to some degree, the fluid flow past the fins.

In the illustrated embodiment, four fins 158, which are generally normal to each other, extend from one location of the rod 124. The fins 158 extend from the outwardly extending sections of the rod 124. Additional fins 158 extend from the rod 124 at other locations.

Desirably, the fins 158 are sized to position the rod 124 generally within the center of the riser 16. In the illustrated embodiment, the width of the rod 124 and two fins 158 extending from opposite sides of the rod 124 is only slightly smaller than the inner diameter of the riser 16. In addition, by centering the rod 124 within the riser, the fins contribute to the stackability of one or more rods 124 within the riser 16. For example, if the riser 16 or a combination of risers 16 have an overall length greater than the length of one rod, additional rods can be easily stacked atop the first rod as necessary by simply dropping the rods into the riser one after another. The fins 158 thus allow for easy and convenient assembly of the rods within the risers of varying lengths.

In addition, as best seen in FIG. 14, the set of fins 158, which is located below the spring 156, assists in centering the rod 124 and the foot 125 relative to the valve throat 144 so that the rod 124 and disc foot 125 are positioned above the stopper 126. The sloped inner surface 137 of the upper cavity 136 directs the fins 158 to assume a central position within the upper cavity 136 so that the rod 124 is generally centered through the valve throat 144. As a result, the disc foot 125 is also positioned above the stopper 126 and centered below the valve throat 144.

With reference to FIG. 17, a cap 160 at the top of the rod 124 interfaces with the lower surface of the sprinkler and allows for fluid flow through the riser to the sprinkler head. The cap 160 is shaped to fit over the top end of the rod 124. Thus, in the illustrated embodiment, the cap 160 has a bottom portion 161 which is shaped to mate over the +symbol shape of the rod 124. This bottom portion 161 fits over the top end of the rod 124 after the rod 124 has been sized to fit within the riser 16. When the cap 160 is positioned over the rod 124, a platform 163 within the cap 160 contacts the top of the rod 124. The platform 163 positions the cap 160 at the end of the rod 124 and prevents the cap 160 from sliding down the rod 124.

Figures 19A, 19B:
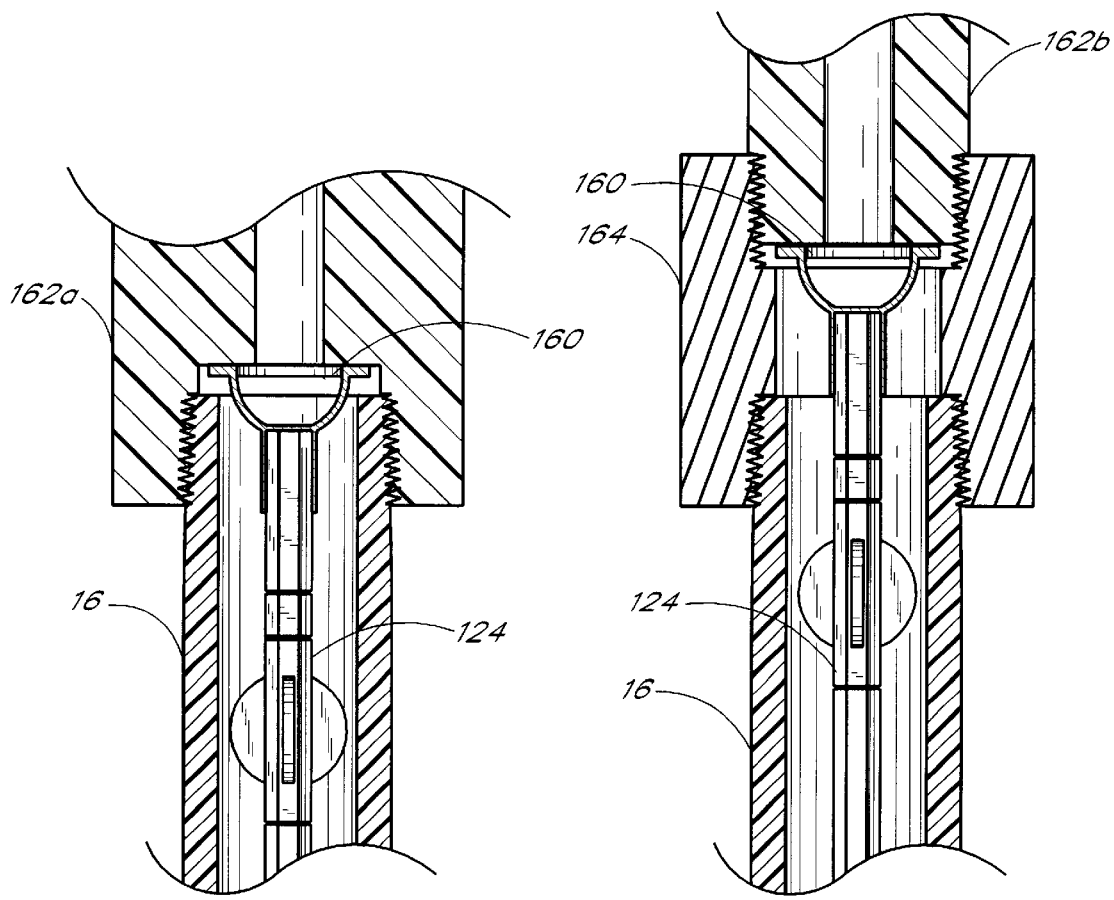
FIGS. 19a and 19b are cross-sectional views of the top portion of the rod and cap of the fluid flow control valve of FIG. 14 in combination with a first type and a second type of sprinkler head connected to a riser.

A plurality of arms 165 connect the platform 163 and bottom portion 161 of the cap 160 to an annular top portion 167 of the cap. Between the arms 165 of the cap are openings which permit fluid to flow through the cap 160. The annular top portion 167 also allows fluid to flow to the sprinkler head 162 without interference from the cap 160. When the cap 160 is positioned atop the rod, is generally normal to the rod 124. The annular top portion 167 has an outer diameter which is smaller than the outer diameter of the riser 16. Thus, the top portion 167 of the cap positions the cap 160 outside the riser 16 so that the cap 160 does not slide within the riser 16. An inner diameter of the top portion 167 is larger than an opening 169 in a sprinkler or other delivery device attached to the riser 16, as best shown in FIGS. 19a and 19b. Fluid can thus flow through the cap 160 from the riser 16 to the sprinkler 162.

In the illustrated embodiment, the cap 160 is a separate piece from the rod 124 and can be connected to the rod 124 after the rod has been sized to fit within a particular riser 16. That is, during installation of the valve 120 within an irrigation system or other fluid delivery system, the length of the rod 124 can be adjusted to fit within a riser 16 of any length, such as by breaking off a portion of the rod or stacking a plurality of rods or rod sections. The cap 160 can then be attached to the top end of the rod 124.

As shown in FIGS. 19a and 19b, during normal flow conditions, the cap 160 contacts the lower portion of the sprinkler head 162. While in the illustrated embodiment, the cap is shown gently biased against the lower portion of the sprinkler head 162, the cap 160 may also be sandwiched between the sprinkler head 162 and the top of the riser 16.

FIGS. 19a–b illustrate the connection between two types of sprinkler head 162 and the riser 16. FIG. 19a illustrates the top portion of the riser 16 connected to a sprinkler head 162a which is internally threaded. In this embodiment, a top portion of the riser 16 is threaded externally and mates with the internal threads of the lower portion of the sprinkler head 162a.

FIG. 19b illustrates the riser 16 coupled to a sprinkler head 162b, which is externally threaded, through a connector 164. The external threads of the riser 16 cooperate with the internal threads of the lower portion of the connector. In addition, the upper portion of the connector 164 is internally threaded and cooperates with the external thread of the sprinkler head 162b.

As described above, during normal operation, water flow through the branch passage 38 into the riser 16 is restricted by the sprinkler head 162. The rod 124 prevents the stopper 126 from rising in the branch passage 38 toward the valve seat 138.

When system failure occurs, such as when the riser 16 is broken or a sprinkler head 162 is removed, the rod 124 will be carried out by the fluid flow through the riser 16 because the sprinkler head 162 no longer holds the rod 124 in place. Generally, when the riser 16 breaks, the rod 124 within the riser 16 will also break. In this case, the remaining portion of the rod 124 is carried out of the riser 16 by the fluid flow. To facilitate this action, the rod 124 may be made from low density material, such as, for example, but not limited to, polyethylene.

The difference in pressure within the branch passage 38 after the riser 16 is broken causes fluid to rush through the branch passage 38 and pushes the remaining portion of the rod 124 upward so that it no longer holds the stopper 126 a distance beneath the valve seat 138. Since the rod 124 is no longer holding the stopper 126 in place, the stopper 126 can move toward the valve seat 138.

It is believed that one or more of the following factors contributes to or accounts for the stopper's movement toward the valve seat 138. Under abnormal conditions, the fluid flow through the branch passage 38 increases. This increase in fluid flow creates a pressure differential in the areas above and below stopper 126. The flow of fluid from the high pressure zone beneath the stopper 126 to the low pressure zone above the stopper 126 creates an upward force upon the stopper 126. In addition, the opening 133 in the lower portion of the basket is believed to facilitate a flow of fluid from the high pressure zone beneath the stopper 126 toward the valve seat 138. Friction, momentum and/or drag on the stopper 128 may also contribute to the stopper's movement toward the valve seat 138.

Because the diameter of the stopper 126 is larger than the diameter of the valve throat 144, the stopper 126 generally inhibits the fluid flow through the valve throat 144, thereby substantially sealing the valve seat 138.

As described in connection with the embodiments shown in FIGS. 1–13, a telltale stream of fluid desirably is allowed to bypass the stopper 126 while the stopper is seated against the valve seat 138. In the illustrated embodiment, fluid escapes through the notches 146 formed along the inner portion of the ridge 142 of the valve cap 122.

Due to the fluid pressure within the fitting 144 and the small size of the telltale ports 146, a small volume of water escapes with high velocity, such that a telltale stream, or thin fountain of water having considerable height, is produced. Other than the telltale stream, the stopper 126 seated against the valve seat 138 substantially seals the upper receptacle 136 of the valve cap 122 from fluid flow. While the volume of fluid of the telltale stream is small enough so as not to produce flooding or erosion, the telltale stream provides for remote detection of a broken riser or closed valve 120.

FIGS. 21–27 illustrate an additional embodiment of the flow control valve. This embodiment is similar to the embodiment illustrated and described in connection with FIGS. 14–19, except that the valve seat and the basket of the valve cap have been incorporated into the fitting. That is, the valve seat and the basket are placed within the fitting rather than in or attached to a valve cap that cooperates with the fitting. Like components between these embodiments are identified by like reference numeral, and the above description of these common elements is to be understood as applying equally to the present embodiment, unless indicated otherwise.

The valve 190 of this embodiment includes a valve seat member 131 instead of the valve cap 122. Similar to the embodiment shown in FIGS. 14–19, the device also includes a rod 124, a basket 192 which is attachable to the valve seat member 131, and a stopper 126 which sits within the basket 192. The basket 192 differs slightly from the basket 128 of the previous embodiment, as will be described below.

Figure 22:
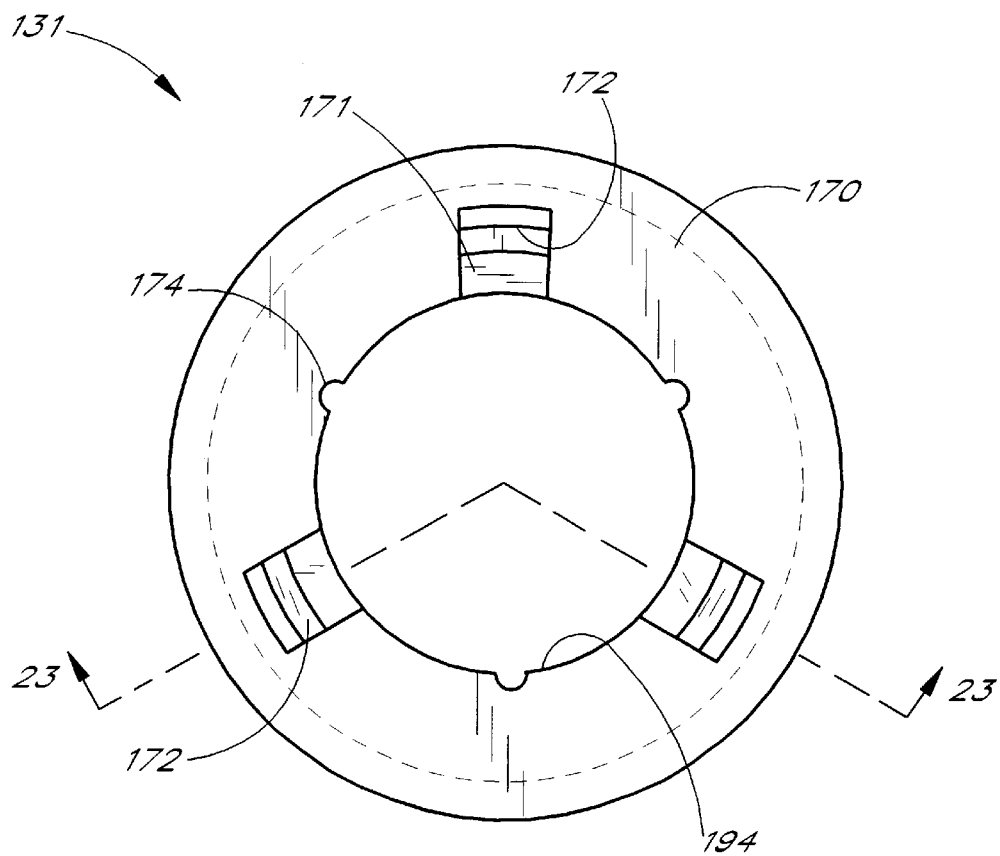
FIG. 22 is a bottom plan view of the valve seat member of the fluid flow control valve of FIG. 21.
Figure 23:
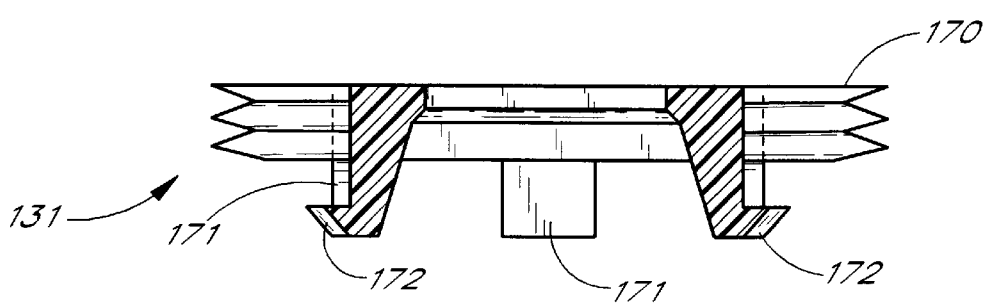
FIG. 23 is a cross-sectional view of the valve seat member of FIG. 24 taken along line 23—23 of FIG. 22.

With reference to FIGS. 22 and 23, the valve seat member 131 includes a generally annular upper portion 170 and three legs 172 which depend from the upper portion 170. In the illustrated embodiment, the upper portion 170 is externally threaded so that it can be installed or screwed within a conventional T-fitting 140 of an irrigation system. It is understood, however, that other methods of joining the valve seat member 131 to the fitting 140 (e.g. adhesive bonding, ultrasonic welding, etc.) are also possible. The outer perimeter of the valve seat member 131 needs to be sized and shaped to fit within the fitting 140.

In a conventional fluid delivery system, a riser 16 is coupled to the effluent port of a conventional T-fitting 140. Generally, there is a slight space between the riser 16 and the fitting 140 when the riser is coupled to the fitting. In one embodiment, the space is about two and one-half threads. The size of this space may vary, however, depending on the coupling between the riser 16 and the fitting 140. The valve seat member 131 of the present embodiment is desirably sized and shaped to fit within this opening beneath the riser 16. Thus, the upper portion 170 of the valve seat member sits within a conventional T-fitting without increasing height of the riser or sprinkler.

The inner surface of the upper portion 170 of the valve seat member defines the valve seat 194. The valve seat 194 is configured as described above in connection with FIGS. 14–19. The valve seat 194 has a diameter less than the diameter of the stopper 126. The diameter of the valve seat is also less than the diameter of the main passageway 34 or the branch passageway 38. The stopper 126 seats against the valve seat 194 under abnormal flow conditions to substantially arrest fluid flow.

In addition, as illustrated in FIG. 22, the inner surface of the upper portion 170 can have notches 174 which cooperate with an instrument to facilitate the rotation and insertion of the valve seat member 131 and basket 192 within the fitting 140.

Each leg 171 of the valve seat member includes a foot portion 172 which is shaped to couple the basket 192 to the valve seat member 131. Thus, in the illustrated embodiment, the foot portion 172 includes a tang that extends outward from the bottom of each leg 171.

Figure 25:
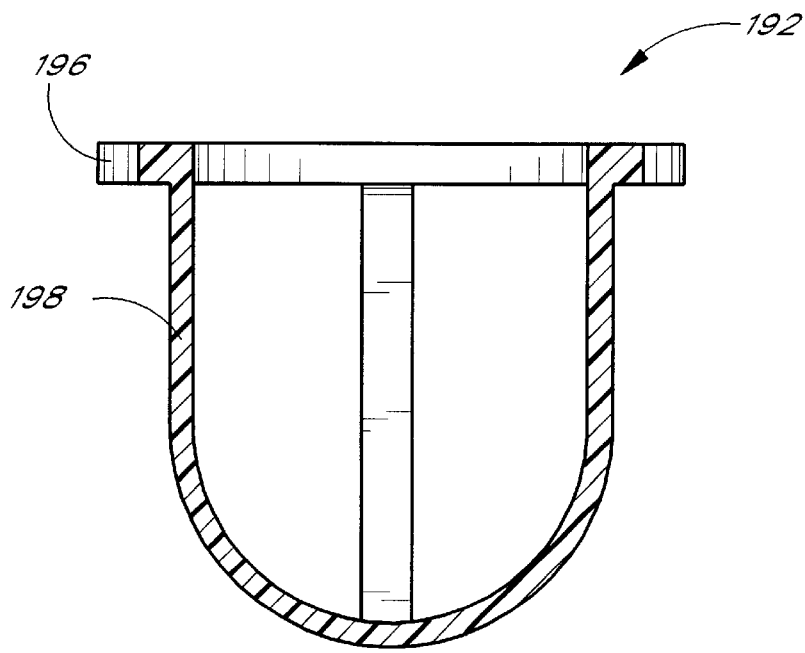
FIG. 25 is a cross-sectional view of the basket of FIG. 23 taken along line 25—25 of FIG. 24.

With reference to FIGS. 24 and 25, the basket 192 includes an upper portion 196 and a lower portion 198. The lower basket portion 198 is similar to the lower basket portion 132 as described in connection with the embodiment of FIGS. 14–19.

The upper portion 196 of the basket is configured to cooperate with and couple to the valve seat member 131. In the illustrated embodiment, the upper basket portion 196 has a generally annular shape with an inner and an outer diameter. The inner diameter is larger than the valve seat and the outer diameter is smaller than an outer diameter of the valve seat member 131.

In the illustrated embodiment, the inner diameter includes three reliefs 176. The reliefs 176 are positioned around the inner diameter to match the position of the legs 171 of the valve seat member 131. The legs 171 and foot portions 172 of the valve seat member cooperate with the reliefs 176 of the upper basket portion 196 to couple the basket 192 to the valve seat portion 131. The foot 172 includes a chamfered lower edge which allows the upper portion 196 of the basket to easily slide over the foot 172 during assembly (the legs 171 deflect inward during this process) while the foot portion 172 retains the upper basket portion 196 when assembled. The cooperation between the reliefs 176 of the upper basket portion 196 and the legs 171 prevent rotational movement of the basket 192 in relation to the valve seat member 131. In other variations, the upper basket portion 196 may be coupled to the valve seat member 131 by other means, such as adhesives, bonding, or other known methods of affixation.

Figure 26:
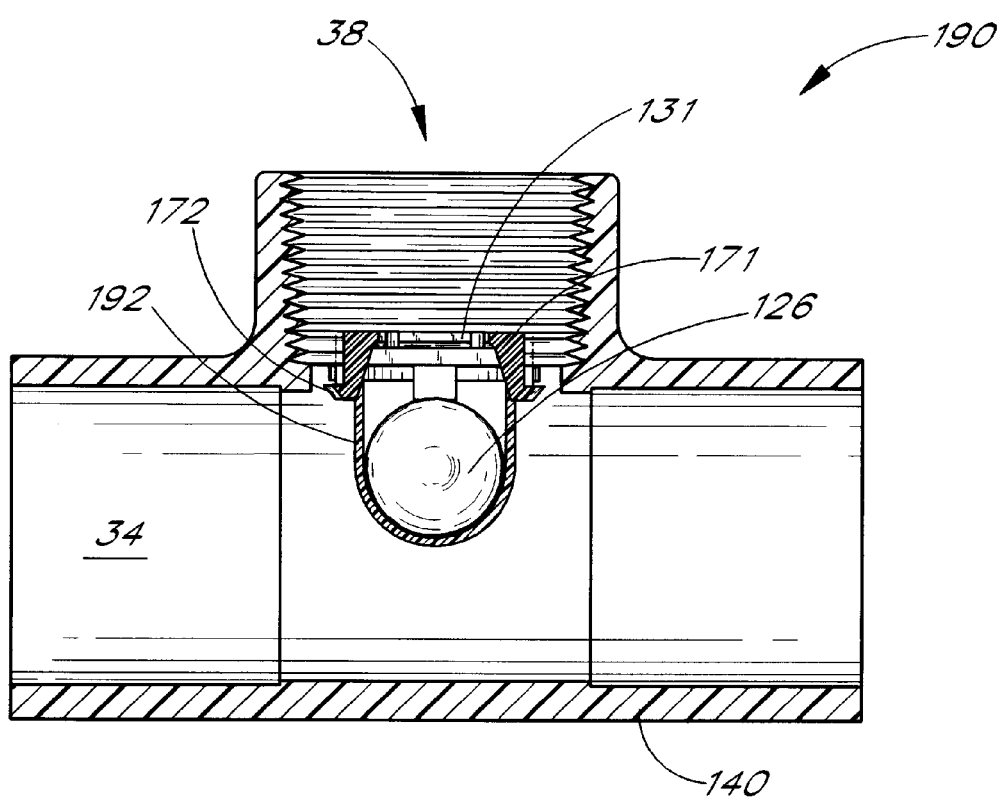
FIG. 26 is a cross-sectional view of the fluid flow control valve of FIG. 21 within a T-fitting.
Figure 27:
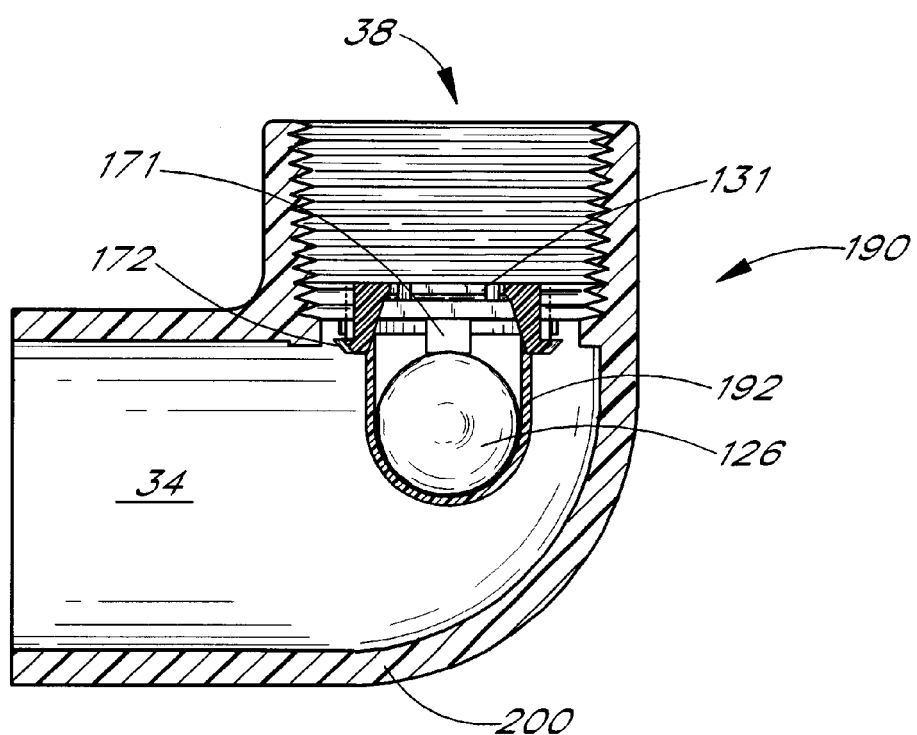
FIG. 27 is a cross-sectional view of the fluid flow control valve of FIG. 21 within an elbow fitting.

As discussed above, the valve can be integrated into any of a variety of junctures. For example, FIG. 26 illustrates the fluid flow control valve of this embodiment within a T-fitting 140 and FIG. 27 shows the fluid flow control valve of this embodiment within an elbow fitting 200.

The operation of the valve 190 of this embodiment is the same as that described above in connection with FIGS. 14–19.

The valve of the illustrated embodiment thus easily integrates into a conventional fitting of a fluid delivery line without increasing the size of the fitting or increasing the spacing between the fitting and a branch passage assembly (e.g. raising the height of a riser and sprinkler assembly). It also partakes of the above-noted advantages of minimal head loss, durability due to a design which eliminates close-fitting parts, and exhibits self-cleaning. Additional advantages of the present design are noted below.

Figure 28:
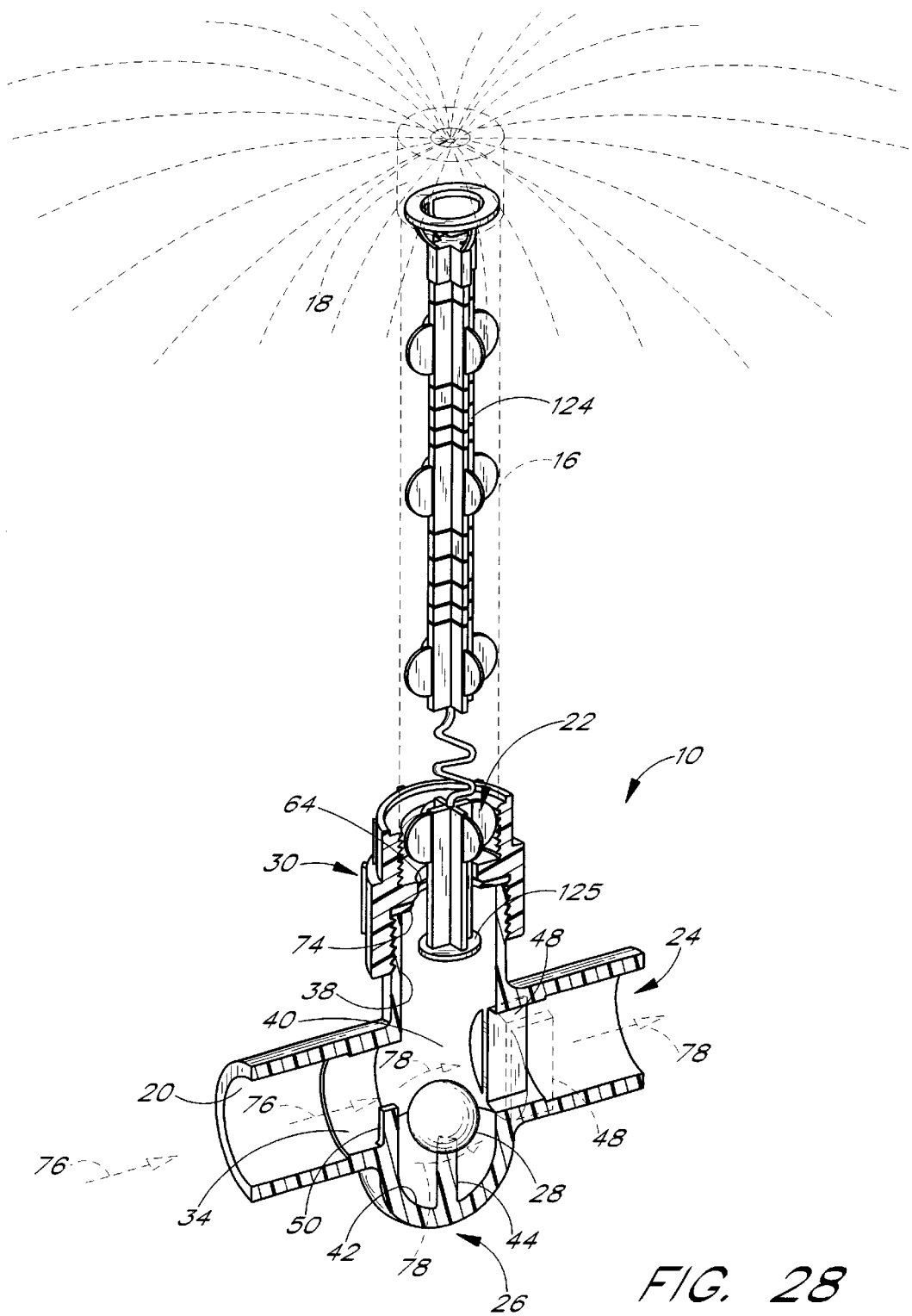
FIG. 28 is a cross-sectional view of another embodiment of a fluid flow control valve operating under normal flow conditions.
Figure 29:
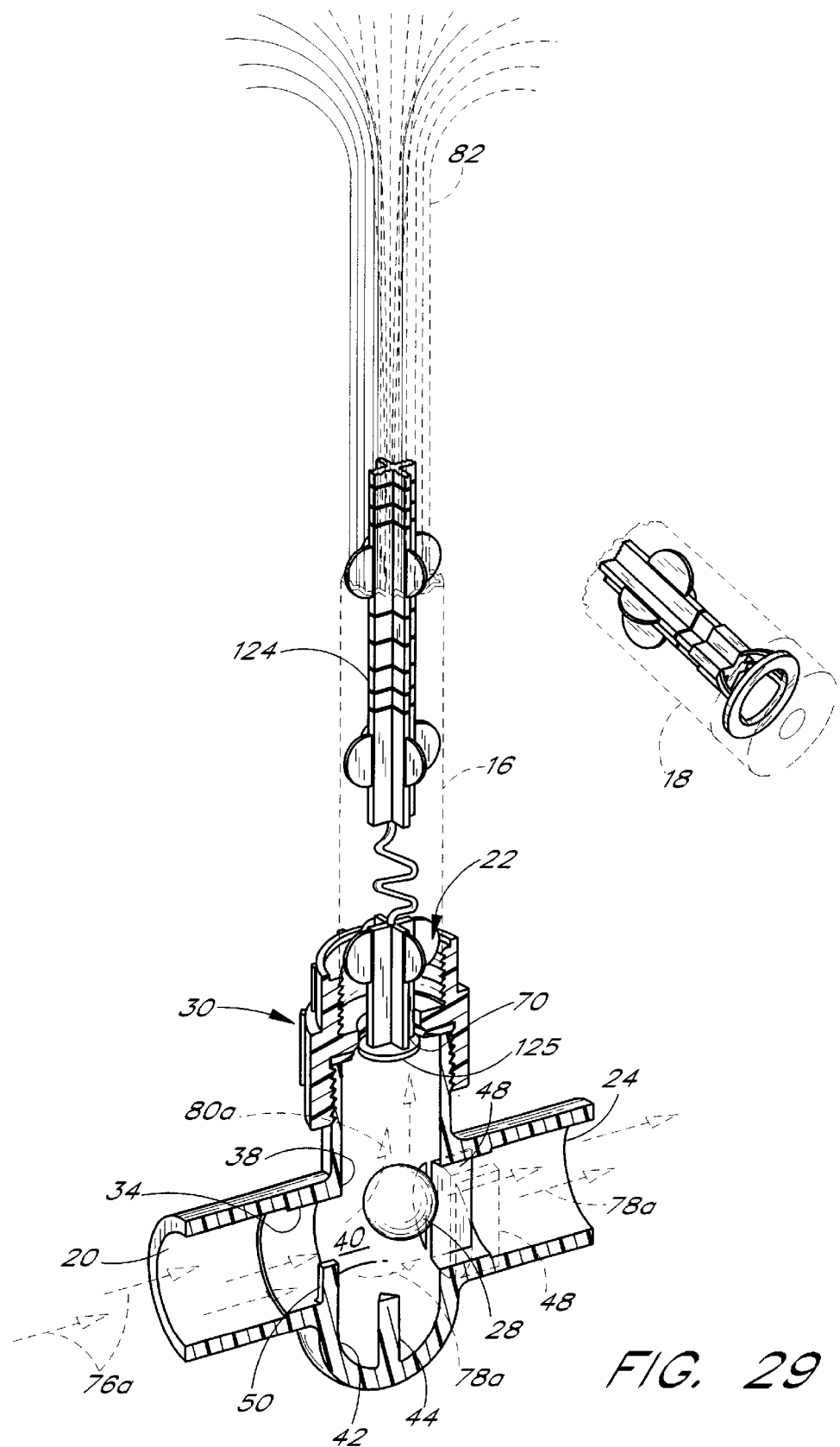
FIG. 29 is a perspective, cross-sectional view of the fluid flow control valve of FIG. 28 immediately after the riser is broken with water flowing through the fluid flow control valve under abnormal flow conditions.
Figure 30:
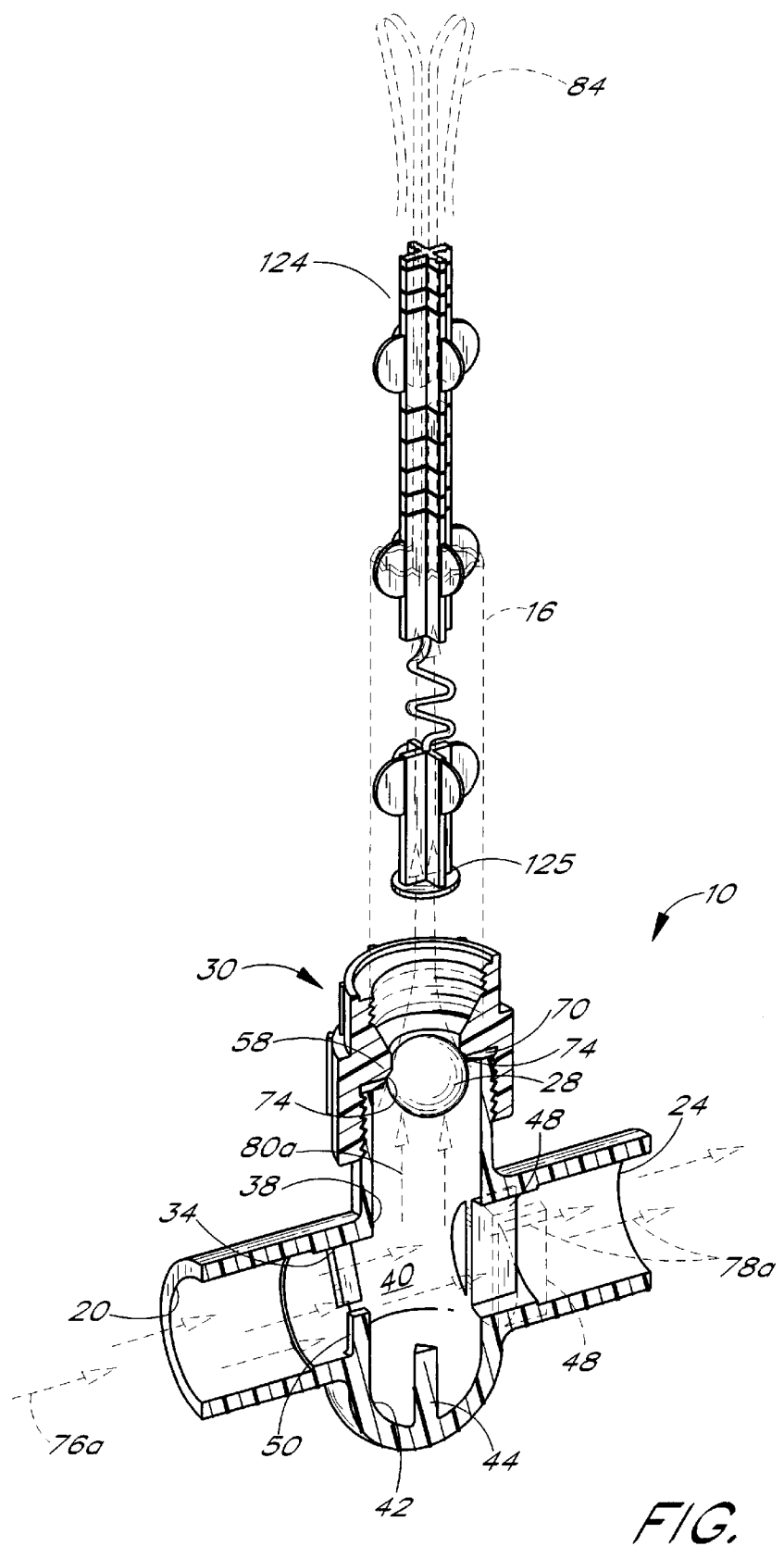
FIG. 30 is a perspective, cross-sectional view of the fluid flow control valve of FIG. 29 in a substantially closed position.

FIGS. 28–30 illustrate another embodiment of the flow control valve. This embodiment is similar to the embodiment illustrated and described in connection with FIGS. 1–10, but additionally includes the rod 124 shown and described in connection with FIGS. 14–19. The above descriptions of the elements of the valve 10 of FIGS. 1–10 and the rod 124 of FIGS. 14–19 are incorporated in the description of this embodiment. Similar reference numerals are used for corresponding elements from the above embodiments. A portion of the rod 124 is positioned through the valve throat 64 and within branch passage 38 of the fitting 26.

The operation of the valve 10 of this embodiment is described above in connection with FIGS. 1–10. In addition, a keeper or rod 124 prevents the stopper 28 from prematurely seating against the valve seat 64 under normal flow conditions. For instance, during initialization of the system, the stopper 28 may become entrained in the fluid flow and be carried toward the valve seat, even though an abnormal fluid condition does not exist. The rod 124 prevents the stopper 28 from seating against the valve seat during this initialization process.

As illustrated in FIG. 29, under abnormal fluid conditions, the rod 124 is forced out of the fitting 26, cap 30 and riser 16 by the increased fluid flow. As described above, the disc 125 at the end of the rod is small enough to fit through the valve throat 64, thereby allowing the rod 124 to completely exit the fitting 26. Once the rod 124 is completely pushed out of the fitting 26 and cap 30, the stopper 28 can seat against the valve seat 58 to substantially close the valve 10 (FIG. 30) and arrest fluid flow through the valve.

Figure 31:
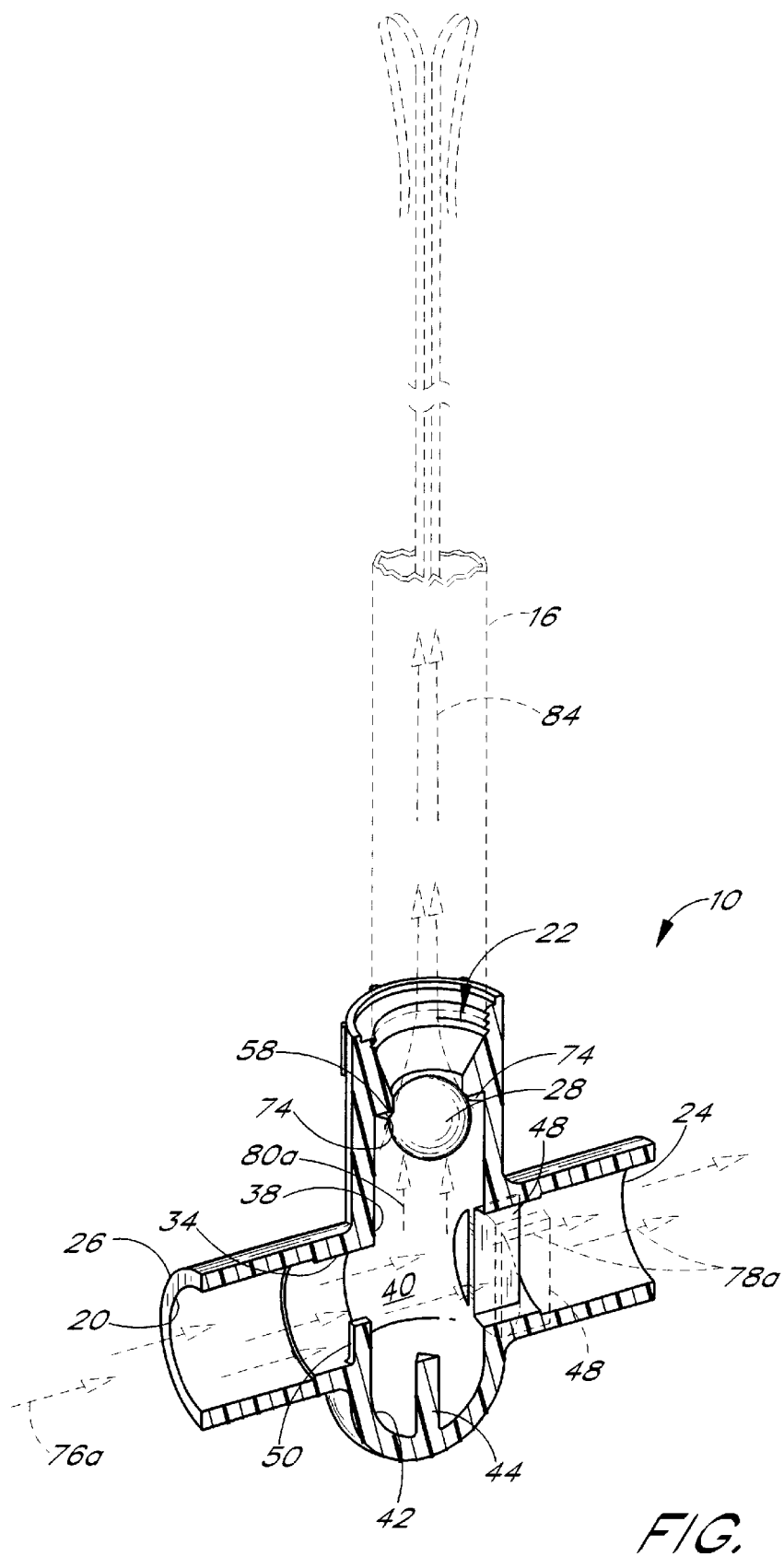
FIG. 31 is a perspective, cross-sectional view of a further embodiment of a fluid flow control valve.

As shown in FIG. 31, the fitting 26 and the cap 30 of the flow control valve shown in FIGS. 28–30 can be unitary. Using a compound molding process known to those skilled in the art, the fitting 26 is manufactured with the stopper 28 confined within the cavity 40. Although not shown in FIG.

31, a rod or keeper 124 similar to that described in the text above can be used with this embodiment to prevent premature seating of the stopper 28 against the valve seat 58.

FIGS. 32–38 illustrate a fluid flow control valve 230 in accordance with another preferred embodiment of the present invention. For ease of description, similar features are ascribed the same reference numeral used for corresponding elements from the embodiments of FIGS. 14–19. Similar to the embodiments described above, this valve 230 can be integrated into any of a variety of types of junctures. For instance, the valve 230 can be used in a preexisting T-junction, elbow junction or corner junction in an irrigation system.

Figure 32:
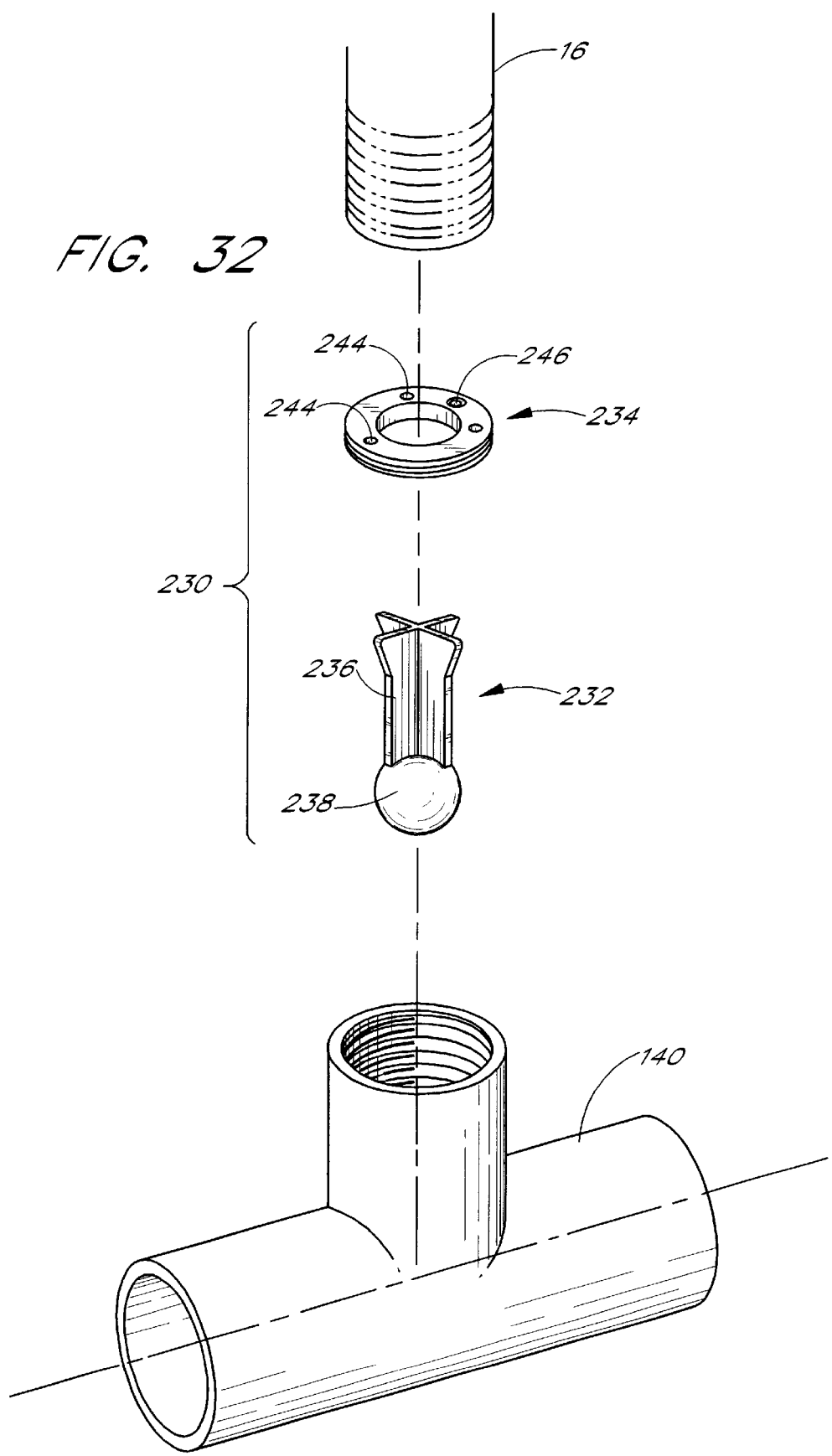
FIG. 32 is an exploded, perspective view of a fluid flow control valve in accordance with another preferred embodiment.
Figure 33:
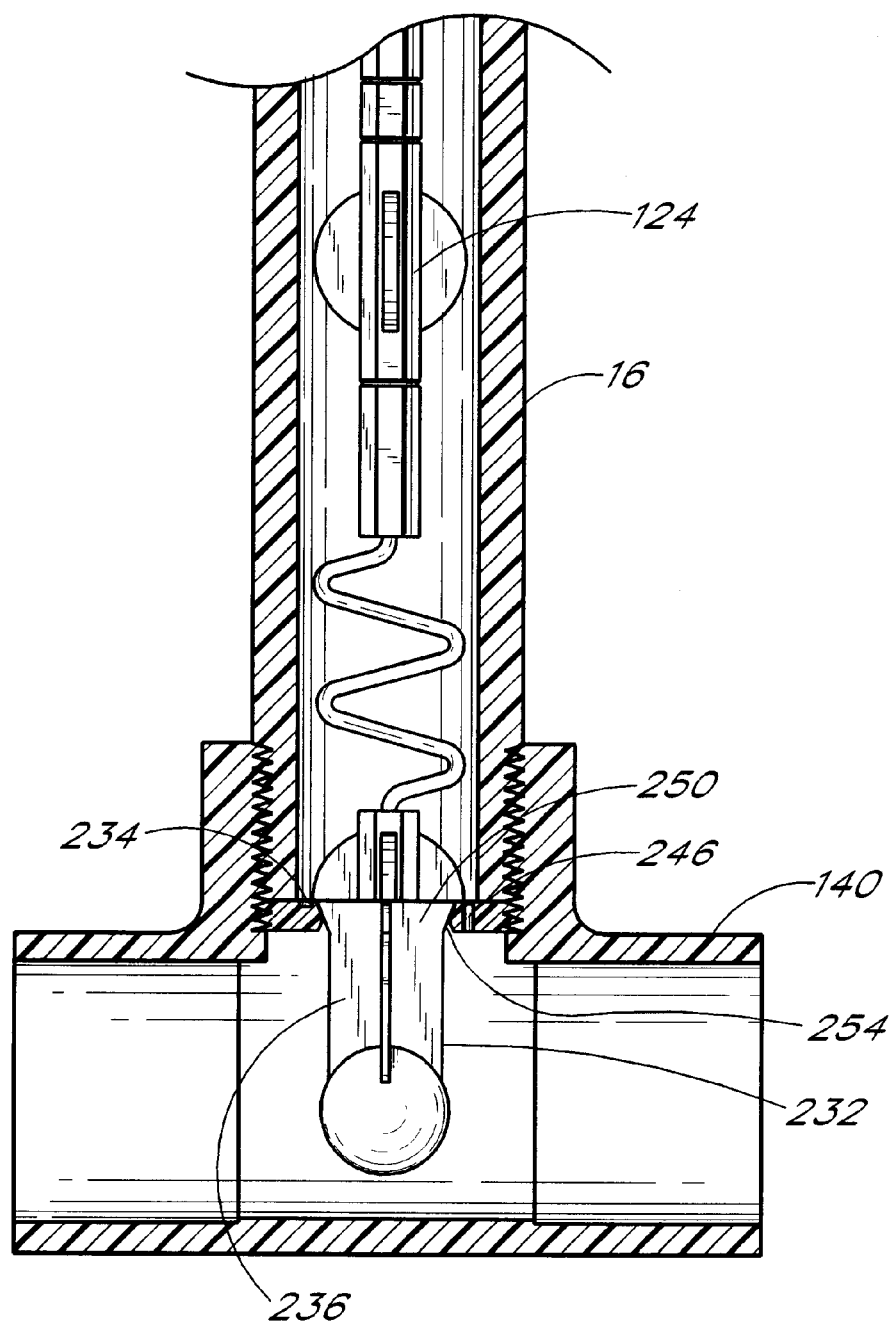
FIG. 33 is a cross-sectional view of the fluid flow control valve of FIG. 32 operating under normal flow conditions.

With initial reference to FIGS. 32 and 33, the valve 230 includes a stopper or stopper device 232 and a valve seat device 234. The valve seat device 234 has an inner diameter which defines a valve seat 256 and a valve passage 250 therethrough. A portion of the stopper 232 fits through the valve passage 250, as illustrated in FIG. 33. Similar to the embodiment shown in FIGS. 14–19, this valve 230 also includes one or more rods 124 which assist in positioning the stopper 232 to allow fluid flow through the valve passage 250 under normal flow conditions.

As shown in FIG. 34, the valve seat device 234 has an annular shape with an inner and an outer diameter. In the illustrated embodiment, the outer diameter of the valve seat device 234 is externally threaded 248 so that the valve seat device 234 can be screwed into a branch passage port of the T-fitting 140. The inner diameter of the valve seat device 234 defines a valve passage 250. The inner diameter of the valve seat device 234 further includes an upper chamfer or facet 252 and a lower chamfer or facet 256. The upper chamfer 252 is sized and shaped to receive an upper stem portion 240 of the stopper 232. The lower chamfer 256 defines the valve seat.

In the illustrated embodiment, the valve seat device 234 includes a plurality of blind holes 244 spaced along the top side of the valve seat device 234. These holes 244 are sized and positioned on the valve seat device 234 to cooperate with an assembly tool. Thus, during assembly, the tool can be inserted into these holes 244 to rotate the valve seat device 234 within the T-fitting 140 in order to position the valve seat device 234 within a branch passage of the T-fitting 140. While in the illustrated embodiment, the holes 244 do not extend through the valve seat device 234, in other embodiments these holes 244 may extend through the entire valve seat device 234.

The valve seat device 234 further includes a telltale port 246 which extends through the valve seat device 234. The diameter of this port 246 is substantially smaller than the diameter of the valve passage 250. The telltale port 246 allows some fluid flow between the influent port and the effluent port of the fitting, even when the valve is in a closed position. The port allows a fine stream of fluid to flow between the influent and effluent ports, even when the valve 230 is in a closed position. This stream of fluid provides an indication that a fault condition has occurred and also provides some irrigation to the surrounding area.

With reference to FIG. 36, the stopper 232 includes a stem 236 and a valve element or plug 238. A portion of the stem 236 has a cross-sectional size which is smaller than the diameter of the valve passageway 250. This allows the stopper 232 to pass through the valve passage 250 and also provides for relative movement between the stopper 232 and the valve seat device 234.

In addition, the stem portion 236 of the stopper 232 has an upper flared portion 240. The smallest cross-sectional size of this upper stem portion 240 is the same as the cross-sectional size of the portion of the stem which fits within the valve passageway 250. The largest cross-sectional size of the stem flared portion 240, however, is larger than the diameter of the valve passage 250.

The smallest diameter of the upper chamfer 252 of the valve seat device 234 is smaller in size than the diameter of at least a portion of the upper stem portion 240. While the upper stem portion 240 of the stopper can rest just atop the facet 252, the stopper 232 is not able to completely pass through the valve passage 250. That is, the cross-sectional size of the flared stem 240 is larger than the diameter of the valve passage 250. Thus, the upper portion of the stem 240 cannot pass through the valve passageway 250, except during manufacture or under extreme conditions. In this manner, the stem portion 236 of the stopper prevents the plug 238 from being positioned more than a maximum distance away from the valve seat device 234 or valve seat 256 under normal flow conditions.

The stem 236 of the stopper (including the upper portion 240) desirably has a cross-sectional shape like a plus sign symbol (+), as best illustrated in FIG. 37. Other cross-sectional shapes of the stem portion are also possible, such as, but not limited to, circular. The plus sign cross section allows fluid to flow between the fins 242 of the stem and through the valve passage 250 even while the upper stem portion 240 is seated atop the valve seat device 234.

In the illustrated embodiment, the stopper 238 or bottom portion of the stopper 232 is shaped generally like a spherically-shaped ball. The stopper, of course, can have other shapes, such as, for example, disc-like, conical, square, elliptical, and the like. The stem portion 236 and plug 238 of the stopper 232 can be integrally formed. While the size of the cross-section of the stem portion 236 is generally smaller than the size (e.g. diameter) of the valve passage 250, the diameter of the plug 238 is larger than the diameter of the valve passage 250. In this manner, once assembled, the plug 238 is not able to fit through the valve passage 250 of the valve seat device 234. Thus, the valve seat device 234 and the stopper 232 are interrelated, yet unaffixed or unattached to one another.

For instance, the stopper 232 is generally floating within the fitting 140 in that neither the stem 236 nor the stopper 238 is attached, fixed or mechanically secured to the fitting 140 or any other structure. In this regard, the stopper 232 is described as floating, even though during normal flow conditions, the biasing device 124 restricts movement of the stopper 232, thereby preventing the plug 238 from prematurely seating against the valve seat 256.

With reference to FIG. 33, a biasing device or rod 124 is positioned within a riser 16 directly above the stopper 232. The rod 124 is constructed in accordance with the above description, except that in this embodiment, the rod 124 does not include a disc foot. One way to achieve this is to shorten the rod 124, as described above, by breaking off a portion of the rod with the foot. In addition, in the embodiment illustrated in FIG. 33, a portion of one set of fins are also broken off from the rod 124. The fins 158 aid in positioning the rod 124 in the riser 16 so that the rod 124 is generally centered. Therefore, even if the cross-sectional shapes of the rod 124 and the stopper 232 are not exactly aligned, at least a portion of the rod 124 will contact the stopper 232 to prevent plug 238 from prematurely seating against the valve seat 256. The rod 124 can also be sized to fit with risers 16 of varying lengths.

The stopper 232 is positioned through the valve passage 250 of the valve seat device 234 during manufacture of the valve. The stopper 232 and the valve seat device 234 can be made from different types of materials. For instance, plastics of different shrinkage factors can be used to make the valve seat device 234 and the stopper 232. During manufacture of the stopper 232 and the valve seat device 234, both components are fairly pliable prior to the plastic material cooling completely. Thus, during this time, although the size of the valve passage 250 is slightly smaller than the size of the plug 238, the material comprising the plug 238 and/or valve seat device 234 will temporarily deform to allow the plug 238 to pass through the valve passage 250. Upon cooling, however, because of the different shrinkage factors of the respective material, the size of valve passage 250 shrinks to a greater degree than the size of the plug 238. Thus, the plug 238 can longer fit through the valve passage 250. In this manner, the stopper 232 is able to fit through the valve passage 250 during manufacture, but thereafter cannot pass through the valve passage 250, except under extreme conditions. Such extreme conditions do not include normal flow conditions or generally even abnormal fluid conditions, as described above. Rather, an extreme amount of force is necessary for the stopper 232 to completely pass through the valve seat device 234.

The valve 230 is designed to resist failure under a designed maximum flow rate and at a designed pressure for a given application. Preferably, the design also incorporates a safety factor. For instance, the valve 230 can be designed, by the selection of relative size and materials for the valve seat device 234 and the stopper 232, for a rating of 400 psi with a safety factor of 1.5 (i.e. the plug is not forced through the valve seat 256 when the pressure is under 600 psi). Similarly, the size and material of the valve seat device 234 and stopper 232 are such that the stopper 232 remains generally below the valve seat 256 and in the main passage while being subject to a particular design maximum flow rate. An exemplary embodiment, for instance, the valve can be designed to function within a system subject to a flow rate of 10 gallons per minute through a one inch pipe, yet will be designed to withstand flow rates up to 15 gallons per minute through such system.

The valve is easy to assemble, even within an existing fluid delivery system. The stopper 232 and valve seat device 234 assembly of the shown embodiment can be positioned within a fitting 140 of a fluid delivery system by screwing the valve seat device 234 within a branch passage of the fitting 140. A riser 16 of the fluid delivery system can then be positioned or screwed within the branch passage of the fitting 140 as well, just above the valve seat device 234. One or more rods 124 are placed within the riser 16 so that the upper stem portion 240 of the stopper seats against the upper chamfer 252 of the valve seat device 234. In this manner, in the illustrated embodiment, a portion of the plug 238 is generally within main fluid passageway of the fitting 140.

Under normal flow conditions, fluid flows through the T-fitting 140 and into the branch passage of the riser 16. The rod 124, which sits atop the stopper 232, restricts movement of the stopper 232 and prevents the plug 238 from prematurely seating against the valve seat 256. When an abnormal flow condition occurs, however, the rod 124 is carried out by the fluid flow through the riser 16. As the rod 124 no longer holds the stopper 232 in place, the plug 238 can move toward the valve seat 256. Movement of the stopper 232 is facilitated by the rush of water through the branch passage of the fitting 140 since the fluid flow through the valve passage 250 is no longer restricted by the sprinkler head 162. Because the plug 238 is larger than the valve passage 250, the plug 238 generally inhibits fluid flow through the valve passage 250, thereby substantially sealing the valve seat 256.

As described in connection with the embodiment shown in FIGS. 1–19, a telltale stream of fluid desirably is allowed to bypass the stopper 238 while the stopper 238 is seated against the valve seat 256. In the illustrated embodiment, fluid escapes through the telltale port 246 formed through the valve seat device 234.

Figure 38:
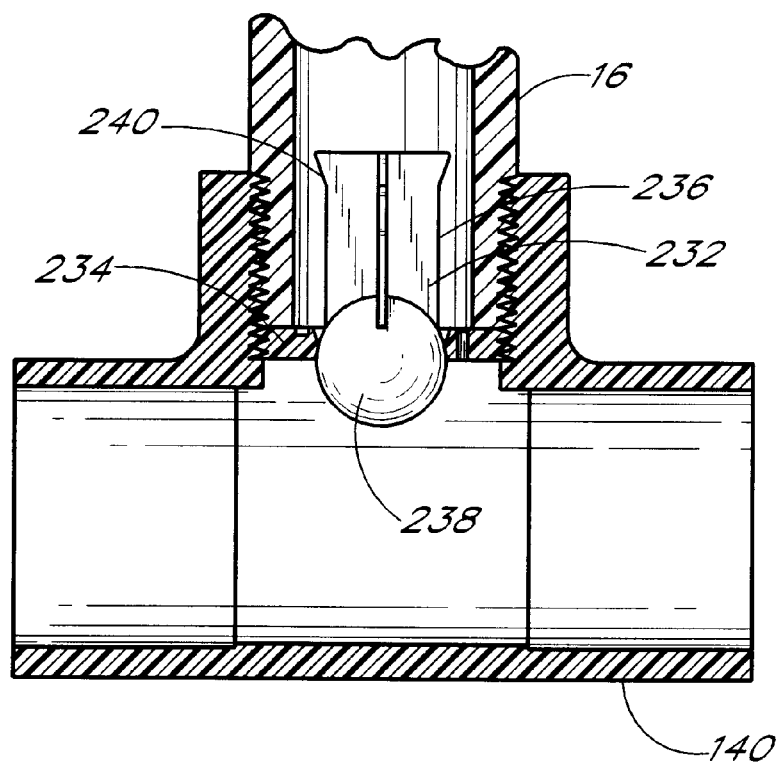
FIG. 38 is a cross-sectional view of the fluid flow control valve of FIG. 32 in a closed position.
Figure 39:
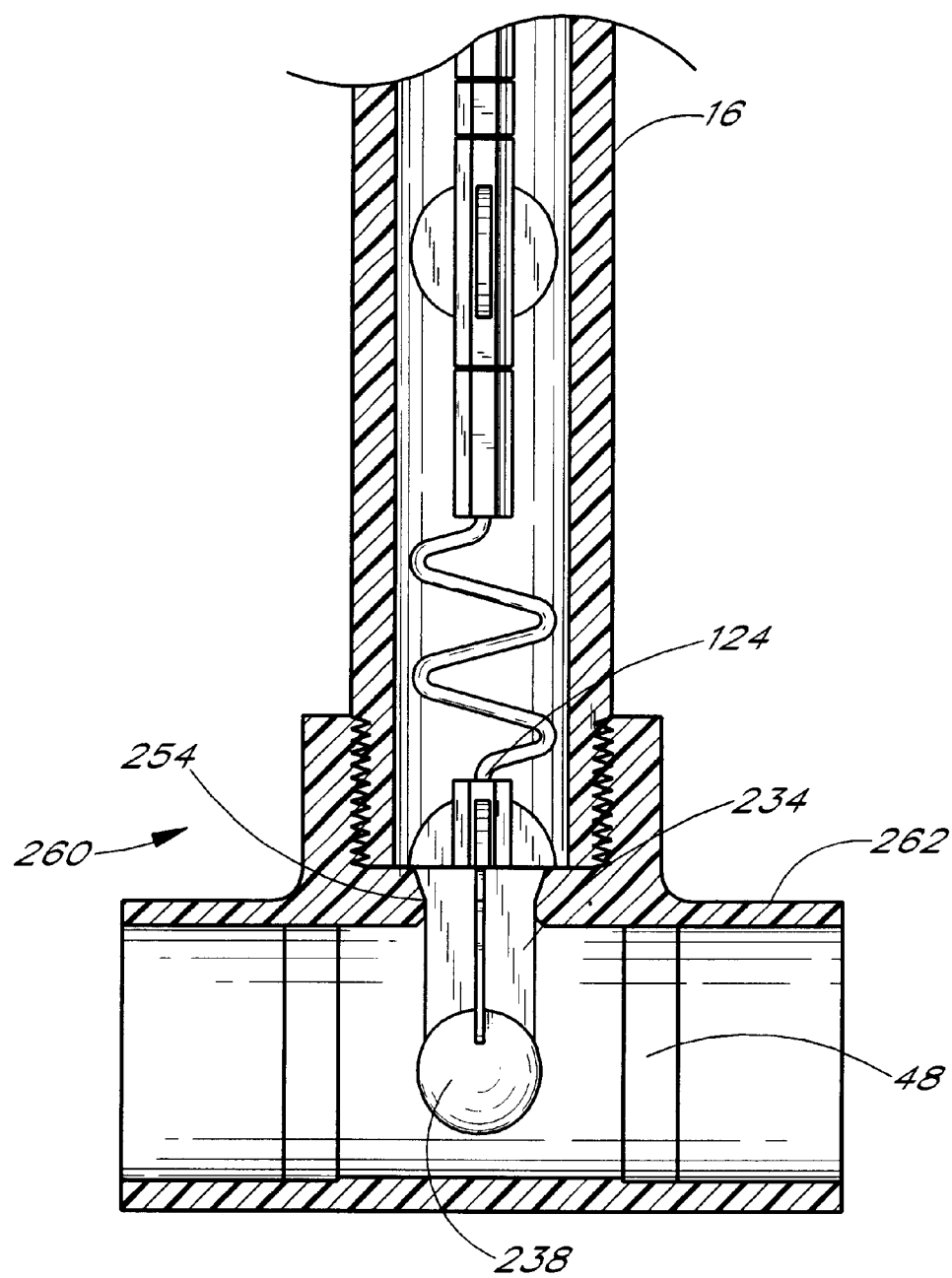
FIG. 39 is a cross-sectional view of a fluid flow control valve in accordance with an additional preferred embodiment, the valve being in an open position.

The valve seat device 234 and the fitting 140 of the flow control valve shown in FIGS. 32–38 can be unitary, as shown in FIG. 38. The above descriptions of the elements of the valves described above are incorporated in the description of this embodiment. Similar reference numerals are used for corresponding elements from the above valves. As is true with the embodiment described above in connection with FIGS. 32–38, the fitting 260 can include vanes 48, such as those described above, to aid in the laminar flow of fluid within the fitting 260. The operation of the flow control valve 260 shown in FIG. 39 is similar to that of the valve shown in FIGS. 32–38.

Figure 40:
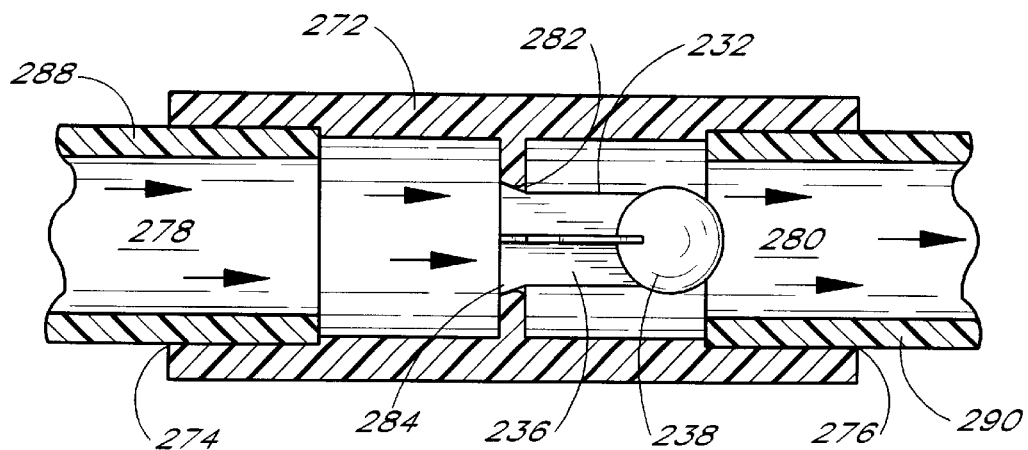
FIG. 40 is a cross-sectional view of an additional embodiment of a fluid flow control valve operating under normal flow conditions.
Figure 41:
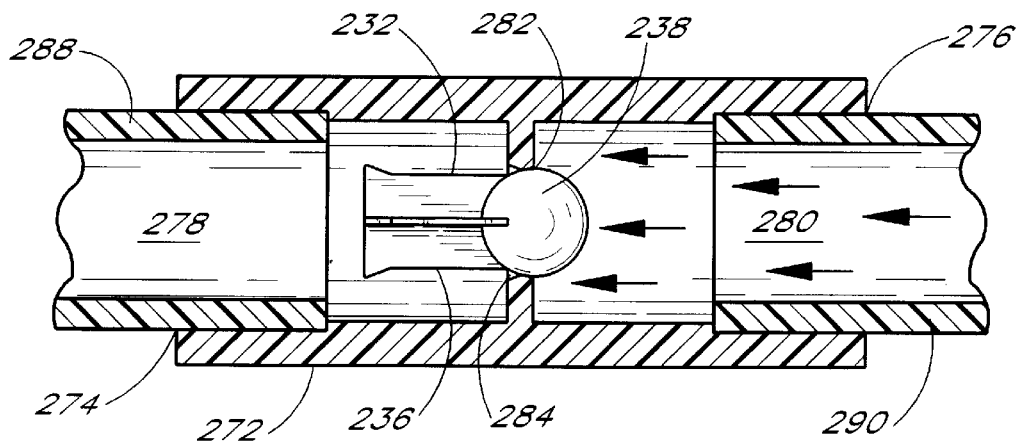
FIG. 41 is a cross-sectional view of the fluid flow control valve of FIG. 40 in a closed position.

FIGS. 40 and 41 illustrate a fluid flow control valve or check valve 270 in accordance with another preferred embodiment of the present invention. The above descriptions of the elements of the valve 230 of FIGS. 32–39 are incorporated in the description of this embodiment. For ease of description, similar features are ascribed the same reference numeral used for corresponding elements from the above embodiments. Similar to the embodiments described above, this valve 270 can be integrated into any of a variety of types of junctures or fittings. For instance, while the valve 270 is shown in FIGS. 40–41 in a generally straight pipe fitting, the valve 270 can be used in an elbow junction or comer junction in an irrigation system.

The valve 270 includes a fitting 272 having an influent port or first port 274, an effluent port or second port 276, a valve seat 282 between the influent and effluent ports 274, 276, and a stopper 232. A first passageway 278 extends from the influent port 274. A second passageway 280 extends from the effluent port 276. The first passageway 278 and the second passageway 280 are in fluidic communication with each other. In the embodiment shown in FIGS. 40 and 41, the first and second passageways are coaxial to each other, or are parallel to one another. In other embodiments, the first and second passageways 278, 280 can be oriented relative to one another at various angles, such as, but not limited to a 90° angle.

The valve seat 282, which is between the first passageway 278 and the second passageway 280, defines a valve passageway 284. The valve seat 282 is similar to the valve seat 256 described above in connection with FIGS. 32–39.

The stopper 232 is constructed in accordance with the above description of the stopper in connection with the embodiment shown in FIGS. 32–39. In addition, the positioning of the stopper 232 through the valve passageway 284 of the fitting 272 is achieved by the method of manufacture described above.

The present fluid flow control valve also provides a flow straightening effect within the fluid flow through either the primary passage or the branch passage, or both. For example, the fins of the rod 124 are shaped and sized to provide a flow straightening effect in fluid flow through the riser. Additionally, the vanes 48 provide a flow straightening effect in fluid flow through the effluent port 24.

The present fluid flow control valve also can withstand system shock, such as water hammer when the system is turned on or off. For instance, in connection with the valve design illustrated in FIGS. 14–19, system shock is absorbed and transferred by the basket to the housing and fitting. In addition, the placement of the basket within the primary passage of the irrigation system fitting minimizes head loss within the branch passage and to the sprinkler. Yet, this placement of the basket does not restrict fluid flow in the primary passage since fluid can flow through the openings of the basket. Further, the valve design illustrated in FIGS. 32–39 can withstand system shock and drag forces, as discussed above.

FIG. 40 illustrates the check valve 270 under normal operating conditions. The arrows shown in FIG. 40 indicate the direction of flow through the fitting 272 under normal operating conditions, i.e. when the direction of fluid is from the first port 274 toward the second port 276. Under normal conditions, the stopper 232 is in an open position. That is, the valve element 238 is positioned a distance away from the valve seat 282, and fluid can flow through the valve passageway 284.

The check valve 270 prevents fluid from flowing through the valve passageway 284 under closed conditions, such as after the irrigation system is turned off. For instance, in an irrigation system on a hillside or mountain, fluid flows uphill when the fluid source is turned on, i.e. when pressurized. When the fluid source is turned off, however, gravity (i.e. the fluid head) forces the fluid within the system to flow back toward the fluid source. The fluid flow control valve 270 prevents fluid within the system from flowing in a direction opposite the normal flow within the system. Thus, the valve 270 prevents an undesirable reverse flow within the irrigation system.

FIG. 41 illustrates the fluid flow control valve 270 in a closed position. The arrows in FIG. 41 indicate the direction of fluid flow within the fitting 272 from the second port 276 toward the first port 274. When fluid flows in such a direction, the stopper 232 is moved to a closed position, such that the valve element 238 seats against the valve seat 282. Thus, fluid through the valve passageway 284 is arrested.

The check valve 270 can be easily integrated into existing irrigation systems. For instance, in the illustrated embodiment, the influent port 274 and the effluent port 276 of the fitting 270 are sized to each receive an irrigation pipe 288, 290 of the existing system. The influent and effluent ports 274, 276 of the fitting 272 can also be threaded to receive a threaded portion of an irrigation pipe.

In the illustrated embodiment, the valve seat 282 is unitary with the fitting 272. In other embodiments, the valve seat 282 can be held in place within the fitting 272 by other means, including, but not limited to ultrasonic welding, adhesives, bonding, threaded engagement, and other known methods of affixation.

FIGS. 42–44 illustrate a fluid flow control valve 300 in accordance with another embodiment of the present invention. This embodiment is substantially similar to the embodiment illustrated and described in connection with FIG. 40–41, except that the stopper 302 includes a valve sealing device 308 around the valve element 306 and the valve seat 282 includes a stopper positioning device 308. In addition, in the embodiment shown in FIG. 42, the valve seat 282 is not unitary with the fitting 272. For ease of description, similar features are ascribed the same reference numeral used for corresponding elements from the embodiment of FIGS. 40–41, with the understanding that the above description of the similar feature is to apply equally to the present embodiment, unless otherwise indicated.

Similar to FIG. 41, FIG. 42 illustrates the fluid flow control valve 300 in a substantially closed position. The stopper 302 includes a stem 304, a valve element 306, and a valve sealing device 308. The valve element 306 has a recess 312 into which the valve sealing device 308 fits snugly. The outer shape of the valve sealing device 308 desirably complements the shape of the valve element 306, i.e., in the illustrated embodiment, the valve element 306 with the valve sealing device 308 fitted thereon has a spherical shape. In a preferred embodiment, the valve sealing device 308 is made from rubber, although other materials can also be used. The stopper 302 of the embodiment shown in FIGS. 42–44 can be used in any of the valves described above or below.

In the illustrated embodiment, the stopper positioning device 310 is unitary with the valve seat 282. The stopper positioning device 310, which is cylindrical in shape, extends away from the valve seat in an opposite direction from the valve element of the stopper and serves as a guide to center the stopper 302 within the valve passageway 284. Thus, the diameter of the stopper positioning device 310 is slightly greater than the diameter of the stem 304 of the stopper. When fluid flows within the fitting 272 in a direction from the second port 276 toward the first port 274, the stopper 302 is moved to a closed position, as illustrated in FIG. 42. Because the stem 304 is centered within the stopper positioning device 310, the valve element 306 is likewise centered within the valve passageway 284. The valve element 306 seats against the valve seat 282 and the softer material of the valve sealing device 308 forms a tight seal with the valve seat 282, thereby preventing or substantially restricting fluid flow through the valve passageway 284.

During manufacture of the valve 300, the valve element 306 of the stopper 302 is pushed through the valve passage 284 of the valve seat 282. This may be done in accordance with the method of construction described above. The valve sealing device is passed over the valve element 306 to fit within the recess 312 of the valve element 306. The valve 300 is then ready for positioning within and for securing to the fitting 272, such as, for example, but without limitation, by ultrasonic welding, adhesives, bonding, threaded engagement, or other methods of affixation. The assembly of the fluid flow control valve is eased by assembling the stopper 302 and the valve seat 282 before positioning and attaching the valve seat 282 at a location within the fitting 272. It is understood though that the valve seat 282 can be unitarily formed within the fitting 272 or can be positioned and attached to the fitting before inserting the valve element 306 of the stopper 302 through the valve seat 282.

FIGS. 45–51 show a fluid flow control valve within a pop-up sprinkler 411. The fluid flow control valve 400 within the pop-up sprinkler 411 substantially arrests the flow of fluid through the sprinkler head 429 when the riser 415 is broken or the sprinkler head 429 is removed.

Figures 45, 47:
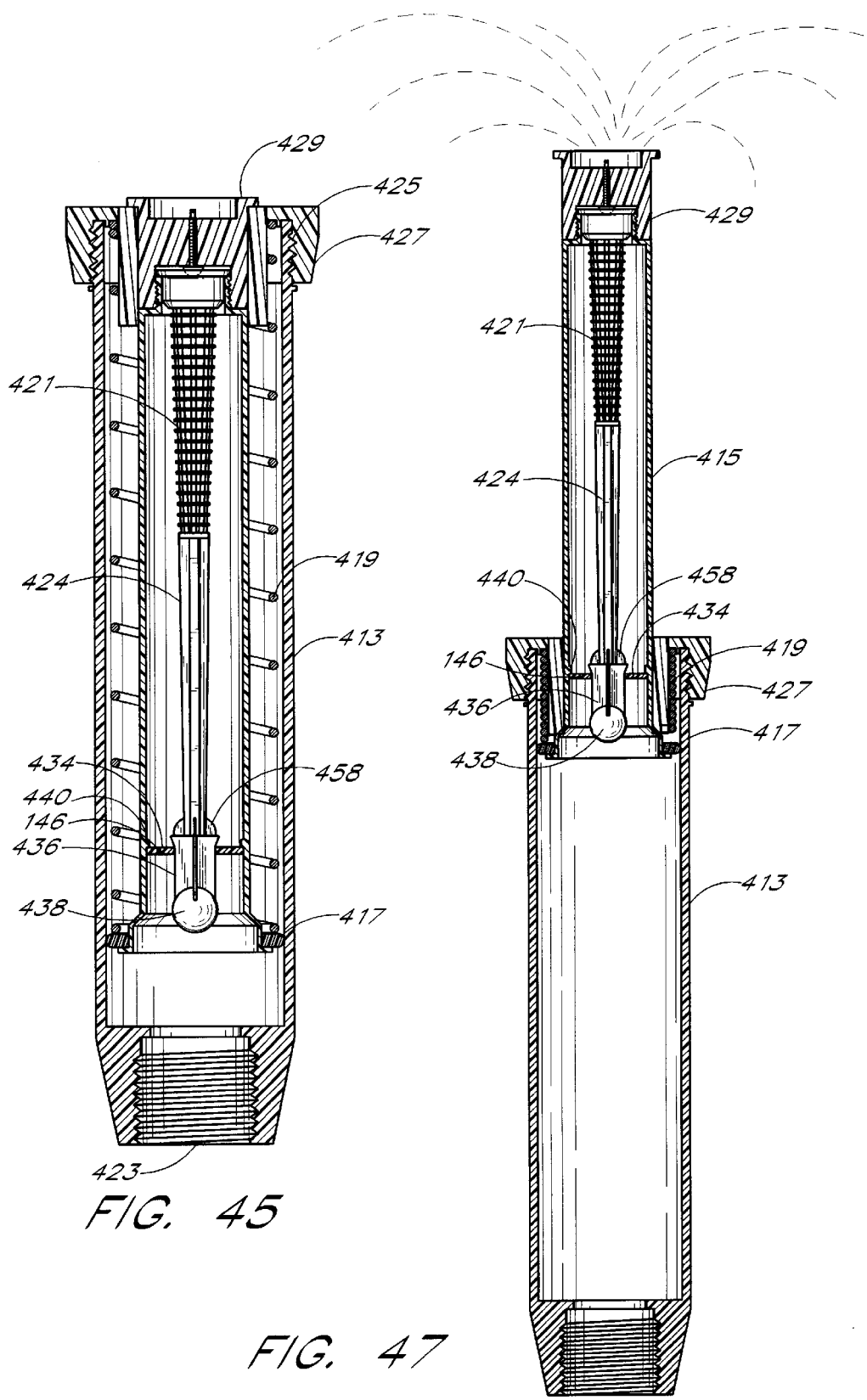
FIG. 45 is a cross-sectional view of a further embodiment of a fluid flow control valve in a pop-up sprinkler.
FIG. 47 is a slightly reduced, cross-sectional view of the pop-up sprinkler with the fluid flow control valve of FIG. 45 under normal flow conditions when the sprinkler is in use.

The pop-up sprinkler 411 generally includes a housing 413, a movable riser 415, a positioning ring 417, a spring 419, a filter 421, a housing cap 427, and a sprinkler head 429. As illustrated in FIG. 45, the riser 415, positioning ring 417, spring 419, and filter 421 are situated within the housing 413 when the system is not in use. The upper end of the housing 413 is attached to the cap 427 by threads 425, thereby closing the upper end of the housing. The lower end of the housing 413 has an inlet 423 coupled to a supply conduit (not shown) of the irrigation system via a conventional fitting and nipple.

As best seen in FIG. 46, the riser 415 is a tube having an inner wall 433 defining an axially extending, cylindrical passage 435 which extends completely through the riser 415. An integral flange 437 is provided at the lower end of the riser 415. The upper end of the riser 415 is attached to the sprinkler head 429. In an exemplary embodiment, both the housing 413 and the riser 415 are molded from suitable polymeric materials; however, these components can be formed of a wide variety of other materials, as will be appreciated by those skilled in the art.

In the illustrated embodiment, the riser 415 includes an annular ring 440 which is unitary with the riser 415. The ring 440 provides an abutment against which a valve seat device 434 is positioned. In other variations, however, the valve seat device 434 can be secured within the riser 415 by known methods of affixation, or can be integrally formed (i.e., unitary) with the riser tube 415.

The filter 421 is positioned just below the sprinkler head 429. The filter 421 has a plurality of small openings to allow fluid to flow through it from the riser 415 to the sprinkler head 429, while substantially preventing dirt or other debris from being carried to the sprinkler head 429. Because the sprinkler head 429 has only a small opening through which fluid from the irrigation system is dispensed, even a small amount of debris from the irrigation system can easily clog the sprinkler head 429 and alter its spray pattern (both radially and circumferentially) and/or affect or reduce the flow rate through the sprinkler.

In the illustrated embodiment, the filter 421 includes a flange 441 at its upper end. The flange 441, which is integrally formed with the filter 421, sits atop a threaded portion 439 of the riser 415 and below the sprinkler head 429, when the pop-up sprinkler is assembled. Thus, the flange 441 is wedged between the sprinkler head 429 and the riser 415, thereby assisting in positioning the filter 421 within the riser 415. In other variations, however, the filter 421 can fit loosely within the riser 415. The filter 421 can be positioned within the riser 415 in other ways, including but not limited to, being positioned within the riser by the rod 424, which is sized to fit between the filter 421 and the stopper 432.

In the illustrated embodiment, the lower end of the filter 421 is unitary with the rod 424. The rod 424 is similar to the rod 124 shown and described above in connection with the embodiment of FIGS. 14–19; however, the rod 424 shown in this embodiment is slightly tapered from the point where it is attached to the filter 421 to the positioning fins 458 at its lower end. Unlike the rod 124 described above in connection with other embodiments, the rod 424 is presized to extend to the stopper 432 when assembled (as shown in FIG. 45) to prevent closure of the valve. The rod 424 thus need not include one or more grooves 154 which would provide a break point in the rod. The fins 458 assist in positioning the rod 424 so that the rod 424 is generally centered relative to a stem 436 of a stopper 432.

The riser 415 is movable from a retracted position, in which the riser is closely adjacent the inlet 423 and the sprinkler head 429 is flush with the upper end of the cap 427 (shown in FIG. 46), to an extended position, in which the riser 415 extends from the housing 413 so that the sprinkler head 429 is a distance away from the upper end of the cap 427 (shown in FIG. 47) in response to water pressure built within the housing when the irrigation system is in use. When the sprinkler is in use, fluid under pressure is supplied by the supply conduit of the irrigation system through the housing inlet 423. Although the spring 417 acts to bias the riser 415 toward the retracted position, the water pressure within the housing 413 acts on the riser to move the riser 415 against the biasing action of the spring 417 from the retracted position to the extended position. This enables the sprinkler head 429 to rise to a predetermined heighth to broadcast water to the surrounding area.

The fluid flow control valve 400 is similar to the embodiment shown in FIGS. 32–38. The valve 400 comprises a stopper 432, a valve seat member 434, and a rod 424. The above description of similar elements is to be understood to apply equally to the present embodiment, unless otherwise indicated. In the illustrated embodiment, however, the valve seat member 434 is not externally threaded, and instead is held in place within the riser 415 by adhesives, ultrasonic welding, bonding, or other known methods of affixation. Similar to the valve seat member shown in FIG. 37, the valve seat device 434 can also be threaded and situated within an internally threaded riser 415 by threaded engagement.

The operation of the valve 400 of this embodiment is similar to that described above in connection with FIGS. 32–38. When the riser 415 is broken or the sprinkler head 429 is removed, the sprinkler head 429 no longer holds the filter 421 and rod 424 in place, and the filter 421 and rod 424 are carried out of the riser 415 by the water flow. Because the rod 424 no longer holds the stopper 232 in place, the valve element 438 can move toward the valve seat 256, thereby substantially sealing the valve seat 256.

Figure 48:
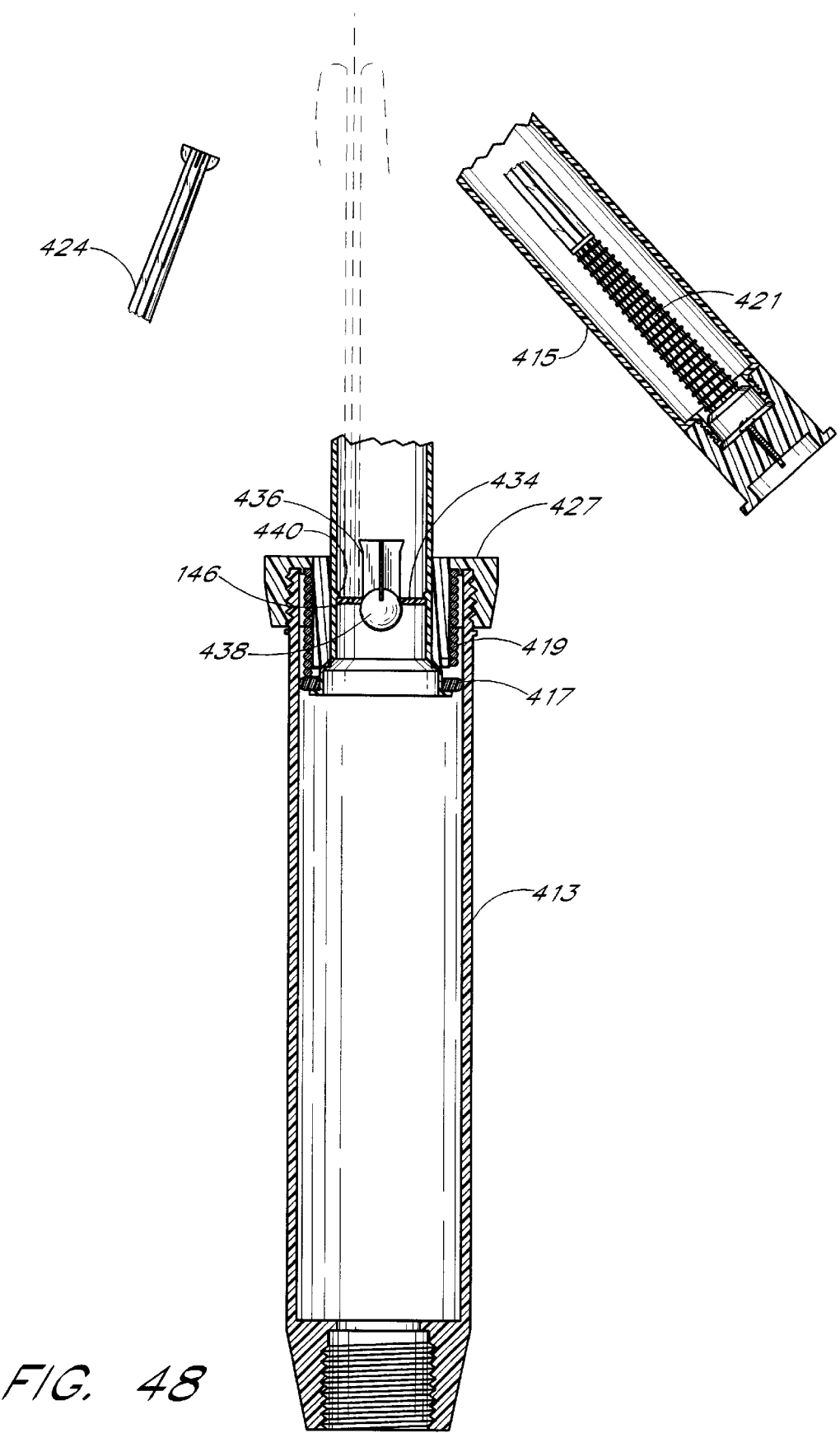
FIG. 48 is a cross-sectional view of the pop-up sprinkler and the fluid flow control valve of FIG. 45 with the valve in a substantially closed position under an abnormal flow condition.

As described in connection with the embodiment shown in FIGS. 1–19, a telltale stream of water desirably is allowed to bypass the stopper 432 when the valve element 438 is seated against the valve seat 256. As illustrated in FIG. 48, a small amount of water escapes through the telltale port 146 formed through the valve seat device 434.

As illustrated in FIGS. 45, 47 and 48, the valve seat member 434 is positioned within the housing when the riser is in both the retracted and expanded positions. Therefore, if the riser is broken at a location above the housing cap 427, the stopper 432 and valve seat member 434 remain intact and the valve 400 can substantially close to prevent fluid flow through the riser 415.

Figures 49, 50:
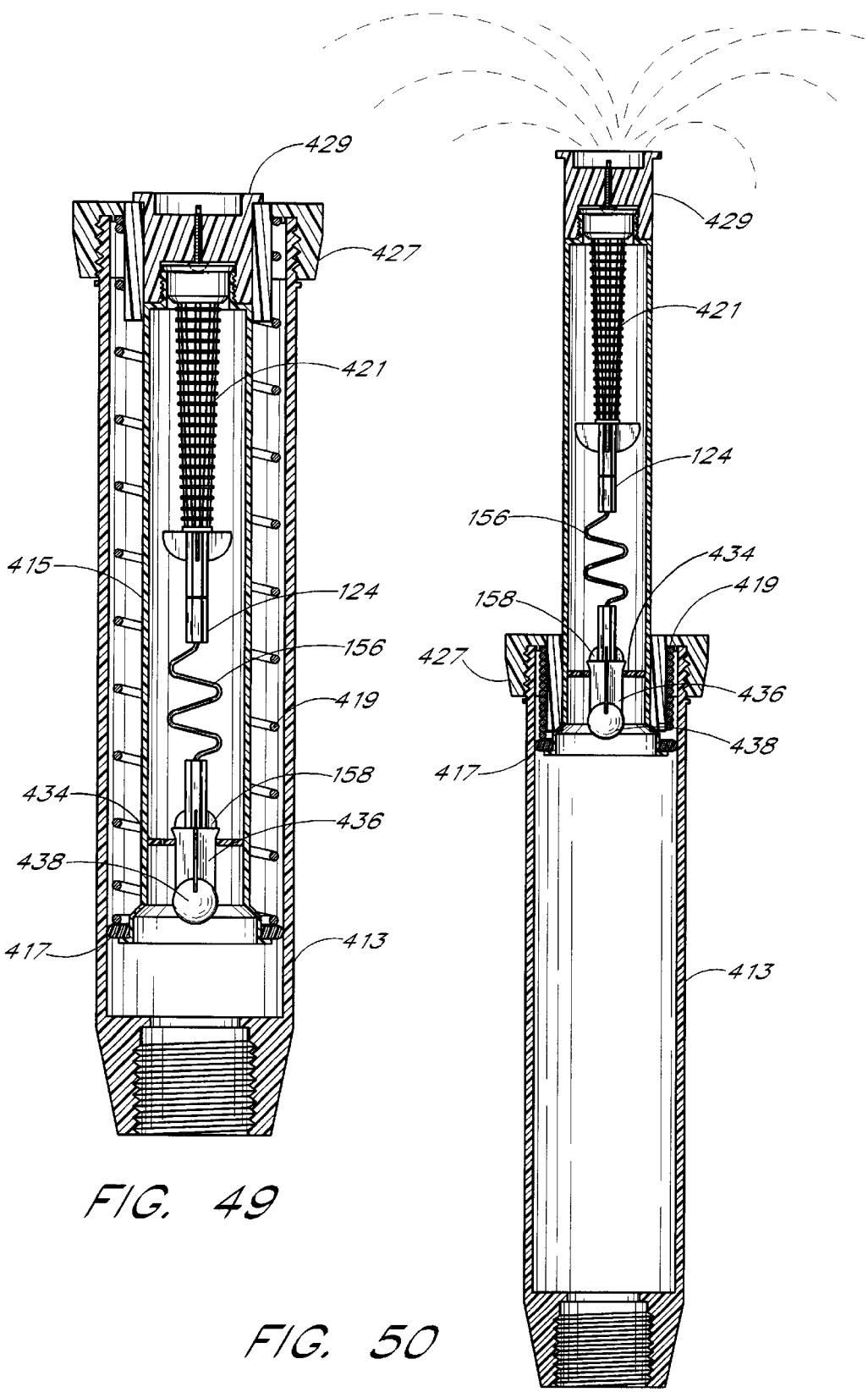
FIG. 49 a cross-sectional view of an additional embodiment of a fluid flow control valve in a pop-up sprinkler when the sprinkler is not in use.
FIG. 50 is a cross-sectional view of the fluid flow control valve of FIG. 49 under normal flow conditions when the sprinkler is in use.
Figure 51:
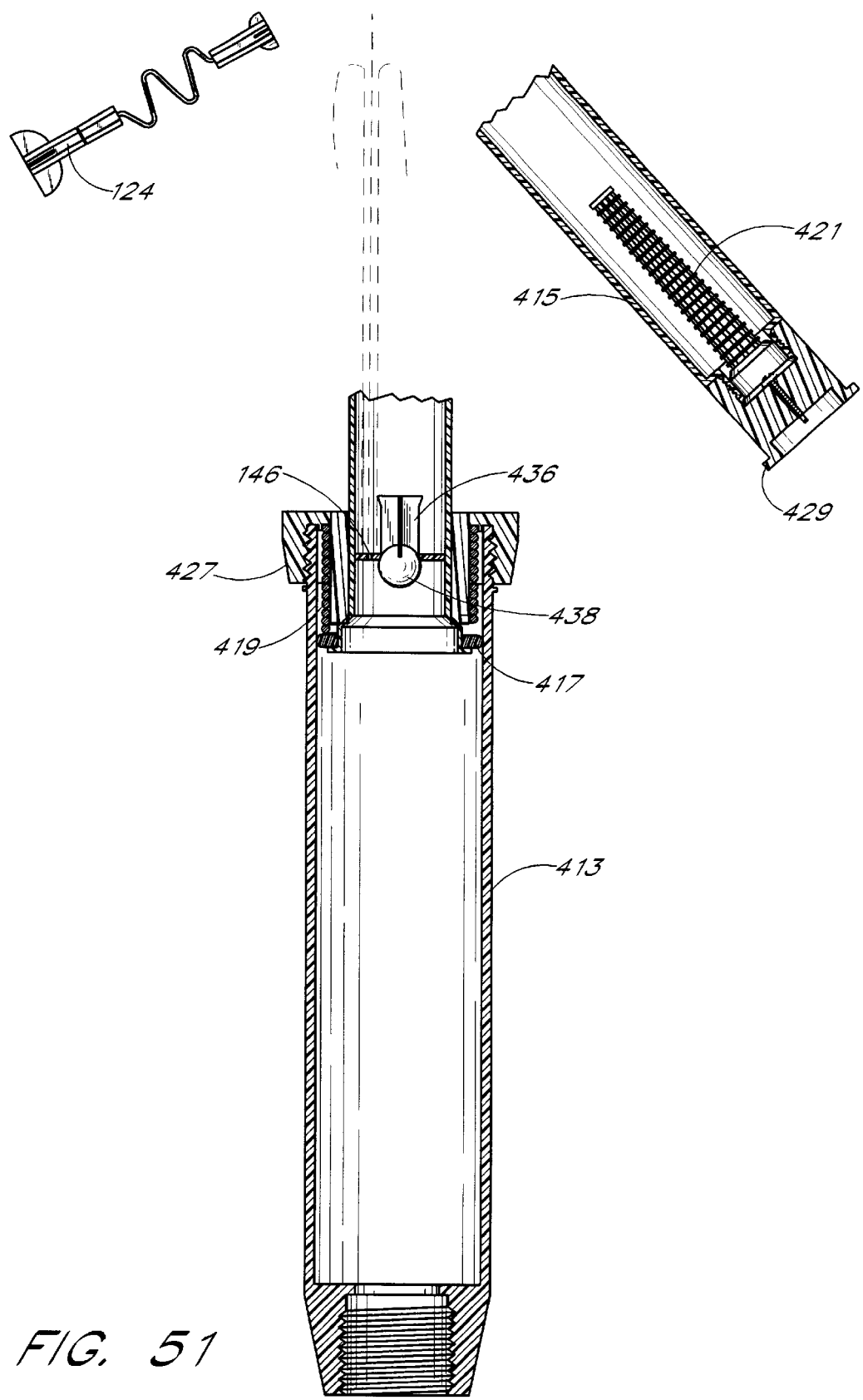
FIG. 51 is a cross-sectional view of the fluid flow control valve of FIG. 49 in a substantially closed position under an abnormal flow condition.
Figure 52:
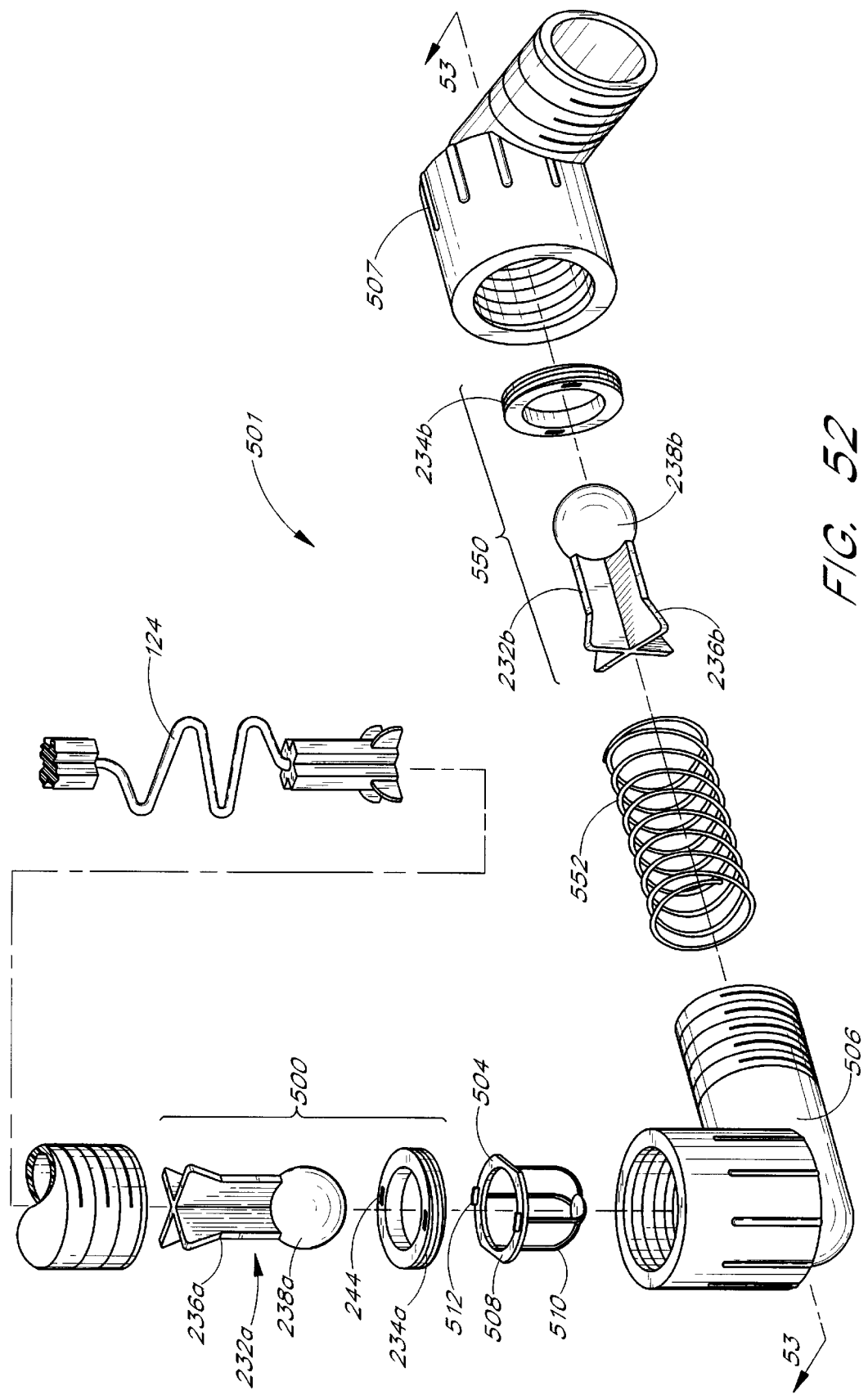
FIG. 52 is an exploded, perspective view of another variation of a fluid flow control valve assembly integrated into a swing joint of an irrigation system.

As illustrated in FIGS. 49–51, in other variations, the rod 124 can be formed separately from the filter 421, such as but not limited to, a valve retrofit within an existing pop-up sprinkler. The rod 124, which is constructed in accordance with the description of the rod in connection with FIG. 33, is positioned between the filter 421 and the stopper 432. The rod 124 can be sized to fit within the riser 415 in a variety of ways, including, but not limited to those discussed above. While grooves 154 along the rod 124 enable a portion of the rod 124 to be easily snapped off, and the spring 156 compensates for manufacturing tolerances of the length of the rod 124, in other variations, the rod 124 can be formed without the grooves 154 and/or the spring 156. For instance, the rod 124 can be presized to fit within a riser of a predetermined length.

The fluid flow control valve 400 can be provided, such as in a kit, to be retrofit within an existing pop-up sprinkler. Such a kit includes the stopper 432, the valve seat member 434, and one or more rods 124. The kit can designate a pop-up sprinkler of a particular size into which the valve is to be integrated. A presized rod 124 can be provided in the kit, or the kit can include a plurality of rods which can be sized or used together to fit between the filter 421 and the stopper 432.

At the end of the rod 124 nearest the filter 421, or the upper end of the rod 124, are a plurality of fins 158 which assist in positioning the rod 124 so that it is generally centered relative to the bottom of the filter 421. The fins 158 can be integrally molded with the rod 124 or can be attached to the rod 124, such as by positioning a cap (not shown) over the upper end of the rod 124. The cap does not have to include fins 158, but instead can be formed to include a platform or other positioning device against which the filter 421 sits.

FIGS. 52–55 illustrate a first valve 500 and a second valve 550 within a swing joint 501 of an irrigation system or other fluid delivery system. The swing joint 501 includes a first fitting 506 in which the first valve 500 is positioned and a second fitting 507 in which the second valve 550 is positioned.

Figure 53:
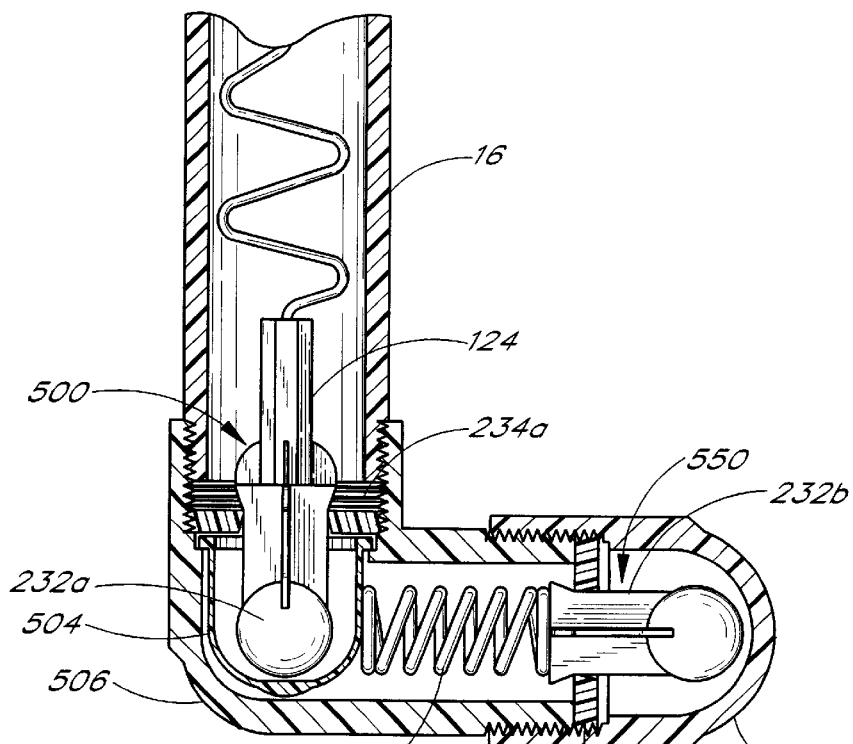
FIG. 53 is a cross-sectional view of the fluid flow control valve assembly of FIG. 52 under normal flow conditions.

In FIG. 53, both valves 500, 550 are shown in an open position. The elements of the first and second valves are substantially similar to one another, except that the biasing device in the first valve 500 is a rod 124 while the biasing device in the second valve 550 is a spring 552.

The first valve 500 of this embodiment is similar to the valve 230 shown and described in connection with the embodiment of FIGS. 33–38. The second valve 550 is also similar to the valve 230 shown and described in connection with the embodiment of FIGS. 33–38, except that a spring 552 is used in place of the rod 124, and a basket or support 504 abuts the spring 552 to prevent the spring 552 from contacting the stopper 232 of the first valve. In this manner the basket 504 assists in positioning the spring 552 within the fitting, in contact with the stopper 232 of the second valve 550, just as the sprinkler head assists in positioning the rod 124 in contact with the stopper 232 of the first valve 500. Like components between the embodiment shown and described in connection with FIGS. 33–38 and the present embodiment are identified by like reference numeral, and the description of these common elements is to be understood as applying equally to the present embodiment, unless indicated otherwise. Similar reference numbers with the suffix designation "a" and "b" are used to refer to similar elements of the first valve 500 and the second valve 550, respectively.

The first valve 500 of this embodiment includes a valve seat member 234a, a rod 124, a basket 504 which cooperates with the valve seat member 234a, and a stopper 232a. The valve seat member 234a is positioned within the first fitting 506 of the swing joint 501 of the irrigation system.

Along the top and bottom of the valve seat member 234a are a plurality of blind holes or notches 244 which are sized and positioned on the valve seat member 234a to cooperate with an assembly tool. The notches 244 on the bottom side can be used to position the basket 504 such that at least part of its lower portion 510 is positioned between the spring 552 and the valve element of the stopper 232a to prevent the spring 552 from contacting the stopper 232a.

The basket 504 includes an upper portion 508 and a lower portion 510. The lower basket portion 510 is similar to the lower basket portion 198 as described in connection with the embodiment of FIGS. 24–25, and that description should be understood to apply equally to the present embodiment. The upper basket portion 508 is configured to cooperate with and couple to the valve seat member 234a. In the illustrated embodiment, the upper basket portion 508 has a generally annular shape with a plurality of extensions 512. The extensions 512 are shaped and positioned around the upper portion 508 to fit within the notches 244 in the bottom side of the valve seat device 234a to couple the basket 504 to the valve seat device 234a. Thus, the basket 504 and the valve seat device 234a cooperate to rotate the basket to allow one or more arcs of the lower portion 510 of the basket to be positioned between the spring 552 and the stopper 232a.

Although the valve element 238a of the stopper 232a of the first valve 500 of this embodiment is positioned within the basket 504, the basket need not provide support for the stopper 232a. Instead, the basket 504 principally acts to prevent the spring 552 of the second valve 550 from resting against the stopper 232a. Of course, any of a variety of other structures can be used to interact with the end of the biasing device so as to prevent the biasing device from contacting the valve element of the stopper. For instance, the first fitting can include one or more vanes 48, such as those shown in FIGS. 11–13, which extend from one side of the fitting to the opposite side, or any type of extension (e.g., a post) within the fitting 506 which prevents the spring 552 from pressing against the stopper 232a.

Figure 54:
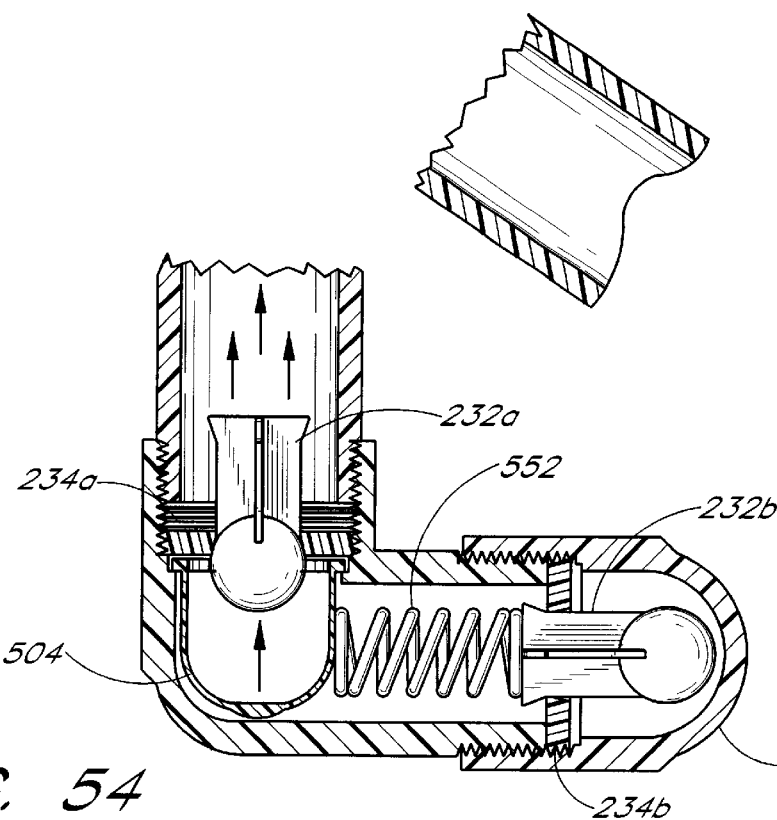
FIG. 54 is a cross-sectional view of the fluid flow control valve assembly with a first valve in a substantially closed position.

The first valve 500 operates similar to the valve 230 described in connection with FIGS. 32–38. The rod 124 prevents the stopper 232a from prematurely seating against the valve seat. As illustrated in FIG. 54, after the riser 16 is broken, fluid flow moves the rod 124 away from the stopper 232a, thereby allowing the stopper 232a to seat against the valve seat of the valve seat member 234.

The second valve 550 includes a spring 552, a stopper 232b, and a valve seat device 234b positioned within the second fitting 507 of the swing joint 501. The spring 552, which is positioned between the basket 508 of the first valve and the stopper 232b of the second valve, prevents the stopper 232b from seating against the valve seat 234b under normal flow conditions.

Figure 55:
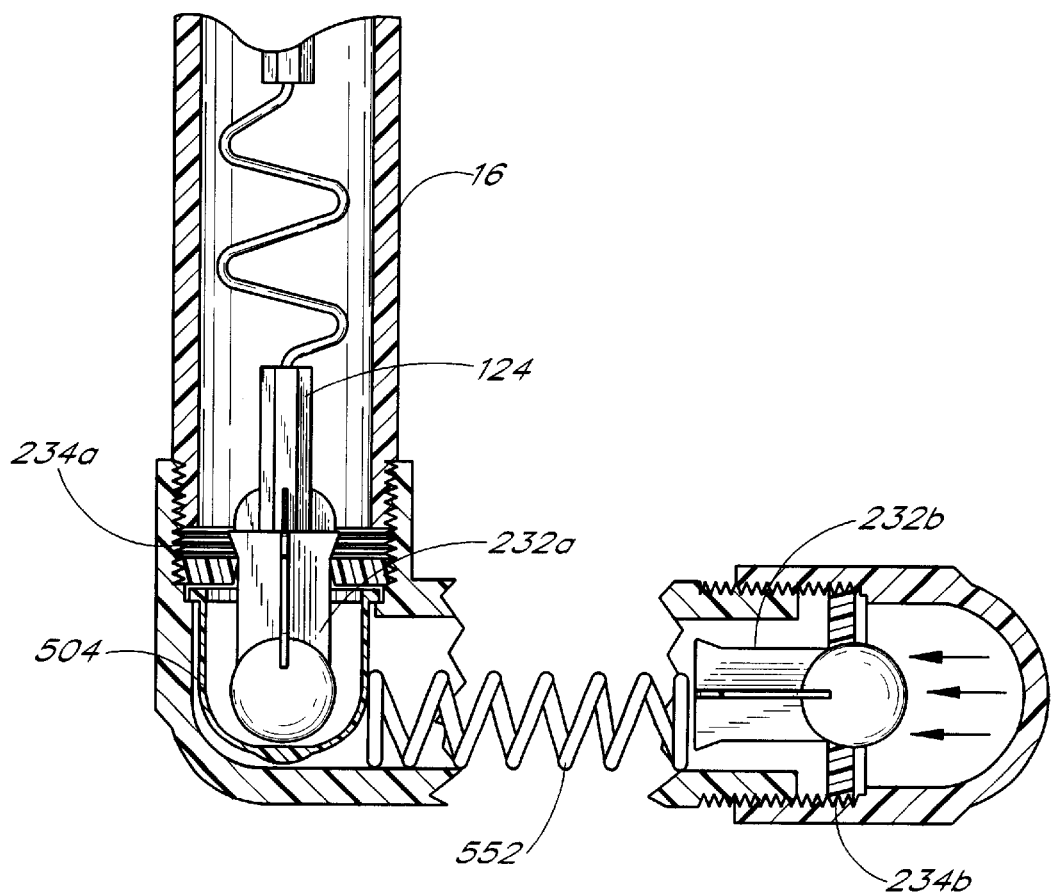
FIG. 55 is a cross-sectional view of the fluid flow control valve assembly with a second valve in a substantially closed position.

The second valve 550 operates in a manner similar to the first valve 500. When the fitting 506 is severed between the first valve 500 and the second valve 550, the spring 552 expands and the valve element 238b of the stopper 232b seats against the valve seat to substantially arrest the flow of fluid through the valve passageway, as illustrated in FIG. 55.

Rotation of the first and second fittings 501, 507 of the swing joint 501 relative to one another does not affect the operation of the first and second valves 500, 550, because the positioning of the biasing device 552 between the valves is not affected by such movement.

In addition, as common to all of the flow control valves described above, the valve can function even if catastrophic failure occurs. For instance, because the valve seat and stopper are located within the fitting or the riser, the valve will continue to function, even if the riser breaks off completely from the fitting or the housing containing the valve seat is severed. For example, even if the valve cap shown in FIG. 14 were severed between first portion 139 and the second portion 141, the valve would continue to function since the valve seat 138 and the stopper 126 are undamaged. Further, in the embodiments illustrated in FIGS. 32–39, the valve seat 256 is positioned directly within the branch passage of the fitting.

The flow control valve is also easy to assemble and integrate with standard irrigation systems. For instance, the T-fitting 26 can be coupled to the pipes of irrigation system. Further, because the basket, which contains the stopper, is affixed to the valve cap in the design shown in FIGS. 14–19, the cap-basket-stopper assembly can be easily integrated into an existing irrigation system by positioning the housing between the fitting and riser. Similarly, the embodiment shown in FIGS. 32–38 is easy to integrate into an existing irrigation system in that only the valve seat device 234 and stopper 232 assembly needs to be positioned within an existing fitting 140, which can be accomplished by simply screwing the valve seat device 234 within the fitting 140. Likewise, the embodiment shown in FIGS. 45–51 can easily be integrated into a pop-up sprinkler by affixing the valve seat device 434 and stopper 432 within the riser 415 and positioning a rod 424 just below the filter 421. Thus, the flow control valves described above can be used with a standard available fitting dimensioned and manufactured for use in commonly used irrigation systems or commonly used pop-up sprinklers.

In addition, the rod or rods 124 are easily sized to fit within riser assemblies of various lengths, including those riser assemblies that extend several feet or more above the fitting as well as those that form part of a pop-up sprinkler. If a riser has a length greater than the length of one rod, a plurality of rods can be stacked atop one another so that the rods extend from the stopper, through the riser, and to the sprinkler head. The grooves on the rod allow the rod to be snapped or broken when a certain amount of force is applied to the groove. Therefore, special tools are not required to size the rod within the riser assembly. Further, the rods do not have to be precisely sized to fit within the riser assembly because the spring of each rod can be compressed to absorb tolerance stack-up within the assembly.

Although the foregoing invention has been described in terms of certain preferred embodiments, other embodiments will become apparent to those of ordinary skill in the art in view of the disclosure herein. Furthermore, the skilled artisan will recognize the interchangeability of various features of one embodiment to another embodiment. Accordingly, the present invention is not intended to be limited by the recitation of preferred embodiments, but is intended to be defined solely by reference to the appended claims.

What is claimed is:

1. A pop-up sprinkler comprising a housing, a pop-up riser at least partially disposed within the housing and movable relative to the housing, a valve seat disposed within the riser, a stopper cooperating with the valve seat and having a valve element, the stopper being movable between a first position in which the valve element is located a distance away from the valve seat, and a second position in which the valve element sits against the valve seat, and a biasing device which prevents the valve element from seating against the valve seat under normal flow conditions, the biasing device including an integral spring configured to allow the effective length of the biasing device to vary.

2. The pop-up sprinkler of claim 1, wherein the biasing device comprises a rod.

3. The pop-up sprinkler of claim 2 additionally comprising a sprinkler head attached to the riser and a filter between the sprinkler head and the valve seat, the rod being unitary with the filter.

4. The pop-up sprinkler of claim 2, wherein the rod includes a plurality of grooves spaced longitudinally along the rod, whereby the grooves facilitate in breaking off a portion of the rod to size the rod to fit within the pop-up riser.

5. The pop-up sprinkler of claim 2, wherein the riser includes an annular ring against which the valve seat device is positioned.

6. The pop-up sprinkler of claim 1, wherein the valve seat is positioned within the housing.

7. A fluid flow control valve for a pop-up sprinkler having a housing and a riser disposed at least partially within the housing and movable relative to the housing, the fluid flow control device comprising a valve seat device defining a valve passageway the valve seat device sized and shaped to fit within the riser, a stopper positioned within the valve passageway, the stopper being movable between an open position and a closed position, and a biasing device which biases the stopper toward the open position and prevents the stopper from seating against the valve seat under normal flow conditions, the biasing device including an integral spring configured to allow the effective length of the rod to vary.

8. The fluid flow control device of claim 7, wherein the biasing device comprises a rod.

9. The fluid flow control device of claim 8, wherein the rod comprises a plurality of grooves spaced longitudinally along the rod, whereby the grooves facilitate in breaking off a portion of the rod to size the rod to fit within the riser.

10. The fluid flow control device of claim 7, wherein the stopper includes a compressible sealing member positioned around a portion of the stopper to seat against the valve seat when the stopper is in the closed position.

11. The fluid flow control device of claim 10, wherein the stopper additionally includes a valve element, the valve element being located away from the valve seat when the stopper is in the open position and seated against the valve seat when the stopper is in the closed position, and the sealing member is located around a portion of the valve element.

12. The fluid flow control device of claim 11, wherein the stopper additionally includes a stem portion.

13. The fluid flow control device of claim 1, wherein the valve seat is unitary with the riser.

14. The fluid flow control device of claim 7, wherein the stopper includes a valve element and a stem, the stem having a flared portion, the stopper located relative to the valve seat device such that the flared portion of the stem is located on one side of the valve seat and the valve element is located on the other side of the valve seat.

15. The fluid flow control device of claim 14, wherein the stopper positioning device is cylindrical in shape and extends away from the valve seat in an opposite direction from the valve element of the stopper.

16. The fluid flow control device of claim 14, wherein the diameter of the flared portion of the valve stem is larger than the diameter of a valve passageway defined by the valve seat.

17. The fluid flow control device of claim 16, wherein the diameter of the stopper positioning device is slightly greater than the diameter of the flared portion of the valve stem.

18. The fluid flow control device of claim 7, wherein the biasing device is attached to a filter of the pop-up sprinkler, the filter being positioned within the riser.

19. A fluid flow control valve assembly comprising a first fitting and a second fitting, the first and second fittings cooperating with and movable relative to one another, each fitting having a valve within the fitting, the valve including a valve seat positioned within the fitting and a stopper positioned within a valve passageway defined by the valve seat, the stopper being movable between an open position and a closed position, and a biasing device positioned between the stopper of the first fitting and the stopper of the second fitting, the biasing device biasing at least one of the stoppers in an open position under normal flow conditions.

20. The fluid flow control valve assembly of claim 19, wherein the first fitting is an elbow fitting.

21. The fluid flow control valve assembly of claim 20, wherein the second fitting is an elbow fitting.

22. The fluid flow control valve assembly of claim 19, wherein the biasing device is a spring.

23. The fluid flow control valve assembly of claim 19, wherein the biasing device biases the stopper of the second valve in the open position under normal flow conditions, and additionally comprising a support which prevents the biasing device from contacting the stopper of the first valve.

24. The fluid flow control valve assembly of claim 23, wherein the support comprises a basket.

25. The fluid flow control valve assembly of claim 23, wherein the support comprises a post.

26. A fluid flow control valve within a swing joint of an irrigation system comprising a first valve seat device and a second valve seat device, each valve seat device having a valve seat, a first stopper and a second stopper, the first stopper cooperating with the first valve seat and the second stopper cooperating with the second valve seat, each stopper having a valve element and a stem, the stem having a flared portion, the first stopper being located relative to the first valve seat device such that the flared portion of the stem is located on one side of the valve seat and the first valve element is located on the other side of the valve seat, and the second stopper being located relative to the second valve seat device such that the flared portion of the stem is located on one side of the valve seat and the second valve element is located on the other side of the valve seat, a first biasing device which prevents the first valve element from seating against the first valve seat under normal flow conditions, and a second biasing device which prevents the second valve element from seating against the second valve seat under normal flow conditions.

27. The fluid flow control valve of claim 26 additionally comprising a support which prevents the second biasing device from contacting the first valve element.

28. The fluid flow control valve of claim 27, wherein the support comprises a basket.

29. The fluid flow control valve of claim 26, wherein the first biasing device comprises a rod.

30. The fluid flow control valve of claim 26, wherein the second biasing device comprises a spring.

31. The pop-up sprinkler of claim 1, wherein the stopper includes a valve element and a stem, the stem having a flared portion, the stopper located relative to the valve seat device such that the flared portion of the stem is located on one side of the valve seat and the valve element is located on the other side of the valve seat.

32. The pop-up sprinkler of claim 31, wherein the stopper further includes a compressible sealing member positioned around a portion of the valve element to seat against the valve seat when the stopper is in the closed position.

* * * * *